(12) United States Patent
Akama

(10) Patent No.: US 11,588,419 B2
(45) Date of Patent: Feb. 21, 2023

(54) ROTARY MECHANISM

(71) Applicant: RAMROCK TECHNOLOGY Co., Ltd., Fukuoka (JP)

(72) Inventor: Toshikazu Akama, Fukuoka (JP)

(73) Assignee: RAMROCK TECHNOLOGY Co., Ltd., Fukuoka (JP)

( * ) Notice: Subject to any disclaimer, the term of this patent is extended or adjusted under 35 U.S.C. 154(b) by 312 days.

(21) Appl. No.: 17/257,253

(22) PCT Filed: Jul. 6, 2018

(86) PCT No.: PCT/JP2018/025771
§ 371 (c)(1),
(2) Date: Dec. 30, 2020

(87) PCT Pub. No.: WO2020/008641
PCT Pub. Date: Jan. 9, 2020

(65) Prior Publication Data
US 2021/0242812 A1 Aug. 5, 2021

(51) Int. Cl.
*H02N 11/00* (2006.01)
*F03G 3/00* (2006.01)

(52) U.S. Cl.
CPC ............. *H02N 11/002* (2013.01); *F03G 3/00* (2013.01); *H02N 11/006* (2013.01); *H02N 11/008* (2013.01)

(58) Field of Classification Search
CPC .. H02N 11/002; H02N 11/006; H02N 11/008; F03G 3/00
See application file for complete search history.

(56) References Cited

U.S. PATENT DOCUMENTS

| | | | |
|---|---|---|---|
| 8,004,103 B2* | 8/2011 | Brantingham | F03B 13/1845 290/53 |
| 2011/0285145 A1* | 11/2011 | Gonzalez | F03G 3/00 74/DIG. 9 |
| 2013/0057101 A1 | 3/2013 | Miller | |
| 2014/0054901 A1* | 2/2014 | Fay | H02N 11/008 290/1 R |

FOREIGN PATENT DOCUMENTS

| | | |
|---|---|---|
| JP | 55-43255 A | 3/1980 |
| JP | 2001-248537 A | 9/2001 |
| JP | 2002-81368 A | 3/2002 |
| JP | 2008-208766 A | 9/2008 |
| JP | 2011-149341 A | 8/2011 |

* cited by examiner

Primary Examiner — Joseph Ortega
(74) Attorney, Agent, or Firm — Heedong Chae; Lucem, PC

(57) ABSTRACT

A rotating mechanism which includes a rail of a helical shape formed to be of uniform diameter, a column member disposed at an inner side of the rail, a rotating shaft inserted through and fixed at a center of the column member, a moving body attachable to the rail, and a magnet body disposed slightly separated from the column member.

30 Claims, 32 Drawing Sheets

FIG. 3A
FIG. 3B
FIG. 3C
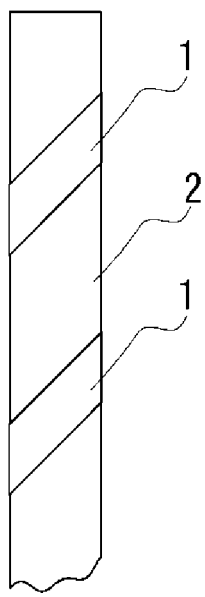
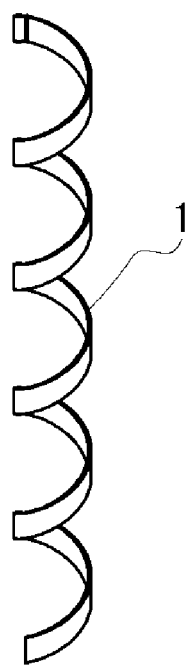
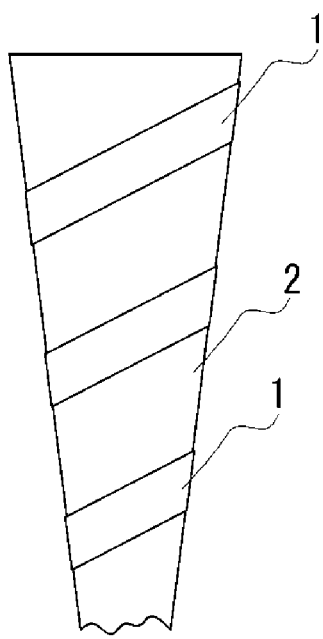

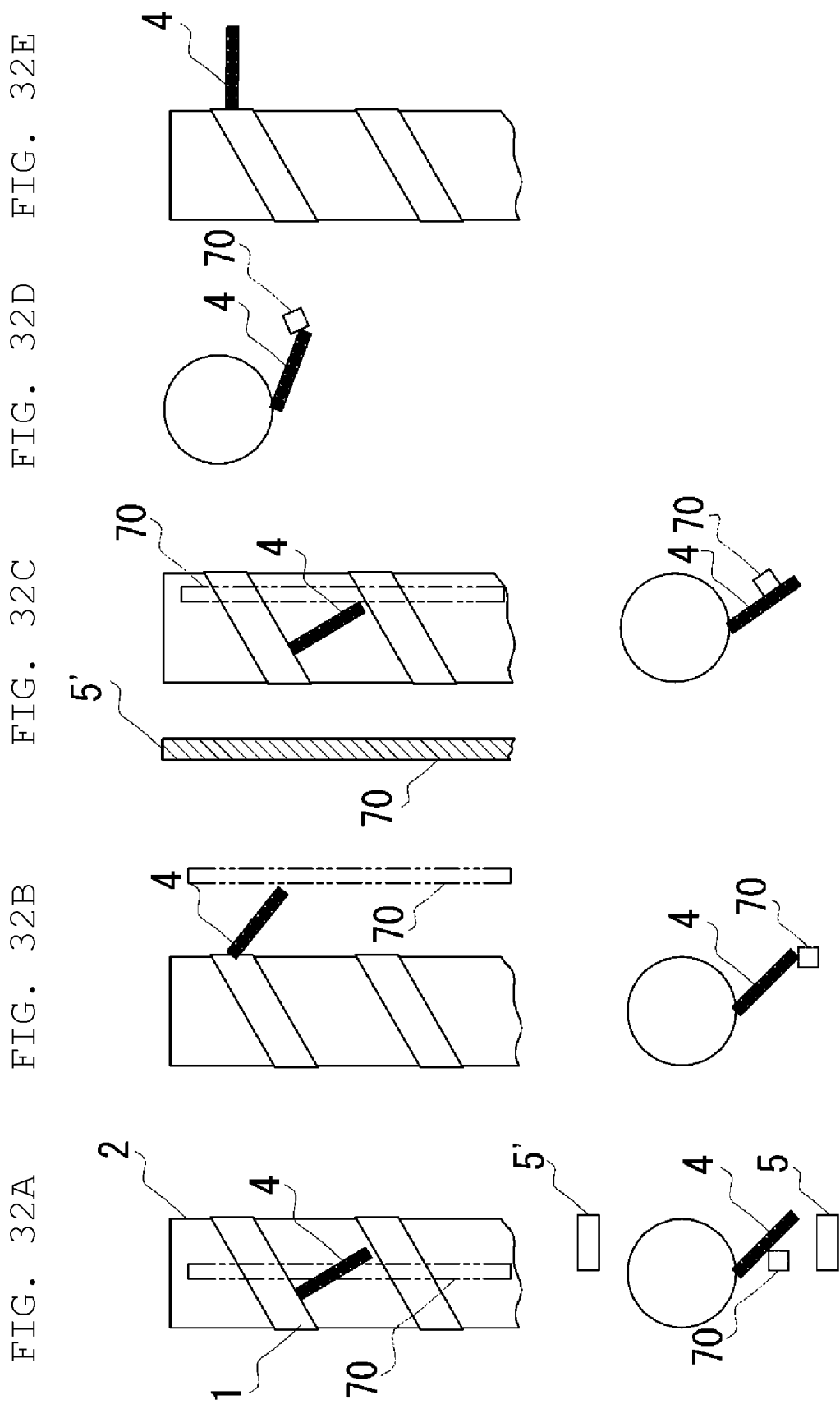

ROTARY MECHANISM

TECHNICAL FIELD

The present invention relates to a rotating mechanism. Specifically, the present invention relates to a rotating mechanism that is simple in arrangement, low in energy loss, and capable of generating rotational kinetic energy efficiently.

BACKGROUND ART

Rotating mechanisms that input various types of energy such as fluid, electric power, combustion energy, etc., into an object arranged to be capable of rotational motion and recover rotational kinetic energy or electric energy have been used from before.

Various measures are taken to increase energy conversion efficiency in such a rotating mechanism to improve an amount of energy recoverable with respect to the input energy in recovering the rotational kinetic energy or the electrical energy, etc., from the rotating mechanism.

For example, with a rotating mechanism described in Patent Literature 1, a structure is arranged where a rotor is disposed in an eccentric state in an interior of a casing and a fluid entering from an inlet and a fluid exiting from an outlet are isolated by vane provided on the rotor.

Also, the rotor is rotated by applying a pressure difference between the inlet side and the outlet side of the casing to the vane. Also, the vane is provided with a magnet and the casing is provided with a coil and a ferrite core. A turbine that converts fluid energy to rotational energy and a power generator that converts the rotational energy to electric energy is thereby integrated.

A power generation device including this rotating mechanism described in Patent Literature 1 integrates the rotating mechanism that converts the energy of the fluid to mechanical energy and a power generating mechanism that converts the mechanical energy to electric energy. Also, by forming an alternating magnetic field by the vane positioned at an outermost peripheral portion of an interior of an outer cylinder member, a speed at which magnetic charges of the vane move is maximized.

CITATION LIST

Patent Literature

Patent Literature 1: Japanese Published Unexamined Patent Application No. 2008-208766

SUMMARY OF INVENTION

Technical Problem

However, with the rotating mechanism described in Patent Literature 1, the flow of the fluid is required as the energy that is input and therefore a flow passage for making the fluid flow and a partition wall for generating the pressure difference must be formed, making the structure of the rotating mechanism complex.

Also, there is a need to take the fluid into the rotating mechanism and there is therefore an inconvenience in that a position at which the rotating mechanism is installed is limited.

Also, with a conventional rotating mechanism that accompanies consumption of electric power or consumption of a raw material of a combustion gas as the energy that is input, a separate energy generation source must be used in combination and therefore it is difficult to foresee a significant improvement in terms of energy conversion efficiency.

Further, it is being demanded in conventional rotating mechanisms to provide an auxiliary mechanism to be combined with an existing driving source and take measures to further increase efficiency of rotational motion and energy conversion efficiency.

The present invention has been made in view of the above points and an object thereof is to provide a rotating mechanism that is simple in arrangement, low in energy loss, and capable of recovering rotational kinetic energy efficiently.

Solution to Problem

To achieve the above object, a rotating mechanism according to the present invention includes a first rail portion formed to a helical shape and arranged to be rotatable around an axial center, a moving portion arranged to be attachable to the first rail portion and movable along the first rail portion, a rail rotating force imparting means imparting, to a first region of the moving portion, a first force in a direction of rotating the first rail portion in a first direction, and a moving force imparting means imparting, to a second region of the moving portion that includes a region different from the first region, a second force in a direction of moving the moving portion from one side toward another side of the first rail portion and is arranged such that a movement of the moving portion relative to the first rail portion and a motion of rotating the first rail portion in the first direction are repeated by the first force and the second force to move the moving portion to the other side of the first rail portion.

Here, by the first rail portion being formed to the helical shape and arranged to be rotatable around the axial center, it is made possible to impart the first force to the first region of the moving portion and rotate the entire first rail portion. That is, for example, a rotational kinetic energy can be obtained from the motion of rotating the first rail portion. Also, it is made possible to convert and output the rotational kinetic energy of the first rail portion as a motive power or an electric power energy that moves an object.

Furthermore, the first force as stated here refers to a force in a tangential direction to an outer shape (circular shape) of a helix of the first rail portion in a plan view of viewing the first rail portion from an axial center direction. Also, the force in the tangential direction includes a force of a certain direction with which when the force is decomposed, a direction of a force resulting from the decomposition is substantially parallel to the tangential direction.

Also, by the first rail portion being arranged to be rotatable around the axial center and the moving portion being arranged to be attachable to the first rail portion, it is made possible, in a state where the moving portion is attached to the first rail portion, to rotate the first rail portion and move the moving portion along the first rail portion. Furthermore, attachable as stated here does not mean just a state where the moving portion is in direct contact with respect to the first rail portion. For example, a state where a magnetic force acts between the first rail portion and the moving portion and the two components are attracted to a position at which the moving portion is movable along an outer diameter of the first rail portion even without being in direct contact (even with another member being sandwiched or a space being provided in between) is also included.

Also, by the moving portion being arranged to be attachable to the first rail portion and movable along the first rail portion, a force can be exerted on the first rail portion via the moving portion. That is, for example, it is possible to apply a force based on a magnetic force or an elastic force to the moving portion and transmit the force received by the moving portion to the first rail portion. Also, a force can be exerted on the moving portion to move the moving portion along the first rail portion.

Also, by the first rail portion being arranged to be rotatable around the axial center and the moving portion being arranged to be attachable to the first rail portion and movable along the first rail portion, the first rail portion can be rotated based on a force received by the moving portion and further by the moving portion transmitting the force to the first rail portion. Or, a rotational motion of the first rail portion that is rotating can be accelerated even further by the force that the moving portion transmits to the first rail portion. Furthermore, in the motion of rotating the first rail portion by the force that the moving portion transmits to the first rail portion as stated here, the moving portion attached to the first rail portion moves together with the first rail portion when the first rail portion rotates in the first direction. Furthermore, the "first direction" as stated here means a direction in which the first rail portion is intended to be rotated around its axial center.

Also, by the rail rotating force imparting means imparting, to the first region of the moving portion, the first force in the direction of rotating the first rail portion in the first direction, the first rail portion can be rotated. Or, the rotational motion of the first rail portion that is rotating can be accelerated even further. Furthermore, the first region of the moving portion as stated here may, for example, be an end portion or a central portion of the moving portion and is not limited in its region as long as it includes a region different from the second region to be described below.

Also, by the moving force imparting means imparting, to the second region of the moving portion that includes the region different from the first region, the second force in the direction of moving the moving portion from one side toward the other side of the first rail portion, the moving portion can be moved along the first rail portion. Furthermore, the movement of the moving portion as stated here includes a relative change of a position of the moving portion on the first rail portion upon rotation of the first rail portion. Also, the movement of the moving portion includes a motion of the moving portion moving along the first rail portion while it itself rotates. Also, the second region of the moving portion as stated here may, for example, be an end portion or a central portion of the moving portion and is not limited in its region as long as it includes a region different from the first region.

Also, by repeating the movement of the moving portion relative to the first rail portion and the motion of rotating the first rail portion in the first direction by the first force and the second force, it is made possible to rotate the first rail portion in the first direction continuously while moving the moving portion along the first rail portion. That is, by imparting the first force to the first region and the second force to the second region respectively of the moving portion to exert forces of different purposes to the two regions of the moving portion, the rotating force can be transmitted to the first rail portion or the rotational motion of the first rail portion that is rotating can be accelerated even further continuously.

Also, by the first force and the second force repeating the movement of the moving portion relative to the first rail portion and the motion of rotating the first rail portion in the first direction to move the moving portion to the other side of the first rail portion, the force that rotates the first rail portion in the first direction continuously can be imparted until the moving portion reaches an end portion at the other side of the first rail portion.

Also, to achieve the above object, a rotating mechanism according to the present invention includes a first rail portion formed to an annular shape and arranged to be rotatable around an axial center, a moving portion arranged to be attachable to the first rail portion and movable along the first rail portion, a rail rotating force imparting means imparting, to a first region of the moving portion, a first force in a direction of rotating the first rail portion to one side, and a moving force imparting means imparting, to a second region of the moving portion that includes a region different from the first region, a second force in a direction of moving the moving portion in a direction opposite to the one side along the first rail portion and is arranged such that the first rail portion is restricted in rotation in a second direction that is a direction opposite to the first direction and/or the moving portion is restricted in movement toward the one side along the first rail portion and a movement of the moving portion relative to the first rail portion and a motion of rotating the first rail portion in the first direction are enabled to be repeated by the first force and the second force.

Here, by the first rail portion being formed to the annular shape and arranged to be rotatable around the axial center and by the moving portion being arranged to be attachable to the first rail portion and movable along the first rail portion, the structure of the rotating mechanism can be made compact. That is, in comparison to a structure where the first rail portion is formed to a helical shape, a volume of the first rail portion is decreased and since the structure is such that the moving portion is made to move with respect to the first rail portion, it is made possible to make the rotating mechanism more compact.

Also, by the first rail portion being restricted in rotation in the second direction that is the direction opposite to the first direction and/or the moving portion being restricted in movement toward the one side along the first rail portion, the first rail portion can be made to rotate easily in the first direction. That is, if the first rail portion is restricted in rotation in the second direction, even if when the second force is imparted to the moving portion, a force tending to rotate the first rail portion in the second direction is generated in accompaniment with the movement of the moving portion in the direction opposite to the one side along the first rail portion, it is possible to deter this rotation. Also, if the moving portion is restricted in movement toward the one side along the first rail portion, it is made possible to deter, when a force is imparted to the moving portion, a motion of the moving portion moving in the first direction along the first rail portion without giving rise to the first force with respect to the first rail portion. Consequently, the first force can be generated easily and the first rail portion can be rotated easily in the first direction.

Also, if the moving portion is arranged to have, at least at a portion thereof, a region receiving magnetic force, a force based on a magnetic force can be exerted on the first rail portion via the moving portion. That is, for example, if the region of the moving portion receiving magnetic force receives an attractive force or a repulsive force from another magnet, etc., the force received by the moving portion can be transmitted to the first rail portion. Also, a magnetic force can be exerted on the magnetic force portion to move the moving portion along the first rail portion. Furthermore, the "region receiving magnetic force" in the present invention includes not just a region constituted of a magnet but also a region constituted of a metal, etc., that receives influence of an attractive force or a repulsive force of a magnetic force. Also, the terms "magnet portion" and "magnet" in the present invention mean those that include not just a permanent magnet but also an electromagnet.

Also, if the moving portion is arranged to have, at least at a portion thereof, a region receiving magnetic force and the first force is generated based on a magnetic force acting on the region receiving magnetic force, then the first force is generated based on an attractive force or a repulsive force that the region of the moving portion receiving magnetic force receives from another magnet, etc., and the first rail portion can be rotated by this first force. Or, the rotational motion of the first rail portion that is rotating can be accelerated even further. Also, the first force is excellent in energy conversion efficiency since it is based on the magnetic force and is not consumed like electric power or a combustion gas, etc.

Also, if the second force is generated based on a gravitational force acting on the moving portion, the second force can be generated from the gravitational force that is in accordance with a mass of the moving portion itself. That is, the second force can be generated using the moving portion itself and the arrangement can be made simple. Also, the gravitational force applied to the moving portion is excellent in energy conversion efficiency since it is not consumed like electric power or a combustion gas, etc.

Also, if the moving portion is arranged to have, at least at a portion thereof, a region receiving magnetic force and the second force is generated based on a magnetic force acting on the region receiving magnetic force, the second force can be generated from the magnetic force exerted on the region receiving magnetic force. That is, the second force can be generated by just providing a magnet body that exerts the magnetic force on the region of the moving portion receiving magnetic force and the arrangement can be made simple. Also, the magnetic force due to the magnet body is excellent in energy conversion efficiency since it is not consumed like electric power or a combustion gas, etc.

Also, if the moving portion is arranged to have, at least at a portion thereof, a region receiving magnetic force and the second force is generated based on at least one of either a gravitational force acting on the moving portion or a magnetic force acting on the region receiving magnetic force, the second force can be generated from the gravitational force that is in accordance with a mass of the moving portion itself, the magnetic force exerted on the region of the moving portion receiving magnetic force, or both the gravitational force and the magnetic force. That is, the second force can be generated by using the moving portion itself or by just providing a magnet body that exerts the magnetic force on the region of the moving portion receiving magnetic force and the arrangement can be made simple. Also, the gravitational force applied to the moving portion and the magnetic force due to the magnet body are excellent in energy conversion efficiency since these are not consumed like electric power or a combustion gas, etc. Further, it is also made possible to generate the second force efficiently by using both the magnetic force and the gravitational force.

In this case, if, for example, the second force is constituted of just the gravitational force applied to the moving portion and the movement of the moving portion along the first rail portion is gradual, it is made possible to accelerate the movement of the moving portion by adding a force based on the magnetic force to increase the second force. Also, even if the second force is constituted of just the gravitational force applied to the moving portion and the moving portion does not move along the first rail portion, it is made possible to make the moving portion move along the first rail portion by adding a force based on the magnetic force to increase the second force.

Also, if the first force is generated based on an elastic force acting on the moving portion, for example, an elastic body can be coupled to the moving portion to generate the first force from an elastic force generated from the elastic body. That is, the first force can be generated using the elastic body and the arrangement can be made simple. Also, the elastic force acting on the moving portion is excellent in energy conversion efficiency since it is not consumed like electric power or a combustion gas, etc.

Also, if the second force is generated based on an elastic force acting on the moving portion, for example, an elastic body can be coupled to the moving portion to generate the second force from an elastic force generated from the elastic body. That is, the second force can be generated using the elastic body and the arrangement can be made simple. Also, the elastic force acting on the moving portion is excellent in energy conversion efficiency since it is not consumed like electric power or a combustion gas, etc.

Also, if the moving portion is arranged to have, at least at a portion thereof, a region receiving magnetic force and the first force is generated based on at least one of either a magnetic force acting on the region receiving magnetic force or an elastic force acting on the moving portion, the first force can be generated from the magnetic force exerted on the region of the moving portion receiving magnetic force, the elastic force generated from an elastic body, or both the magnetic force and the elastic force. Also, by this first force, the first rail portion can be rotated. Or, the rotational motion of the first rail portion that is rotating can be accelerated even further.

Also, if the second force is generated based on at least one of either a gravitational force acting on the moving portion or an elastic force acting on the moving portion, the second force can be generated from the gravitational force that is in accordance with a mass of the moving portion itself, the elastic force exerted on the moving portion, or both the gravitational force and the elastic force. That is, the second force can be generated by using the moving portion itself or by just coupling an elastic body to the moving portion and the arrangement can be made simple. Also, the gravitational force applied to the moving portion and the elastic force exerted on the moving portion are excellent in energy conversion efficiency since these are not consumed like electric power or a combustion gas, etc. Further, it is also made possible to generate the second force efficiently by using both the elastic force and the gravitational force.

In this case, if, for example, the second force is constituted of just the gravitational force applied to the moving portion and the movement of the moving portion along the first rail portion is gradual, it is made possible to accelerate the movement of the moving portion by adding a force based on the elastic force to increase the second force. Also, even if the second force is constituted of just the gravitational force applied to the moving portion and the moving portion does not move along the first rail portion, it is made possible to make the moving portion move along the first rail portion by adding a force based on the elastic force to increase the second force.

Also, if the rail rotating force imparting means and the moving force imparting means are constituted of magnetic force means that each exert a magnetic force on the region receiving magnetic force and at least a portion of generation sources of the magnetic forces of the magnetic force means of the rail rotating force imparting means and the magnetic force means of the moving force imparting means is a magnet body in common, both the first force and the second force can be generated from the same magnet body. Thereby, the first rail portion can be rotated while moving the moving portion along first rail portion by just the magnetic force of the magnet body being exerted on the moving portion attached to the first rail portion. Or, the rotational motion of the first rail portion that is rotating can be accelerated even further. Further, since the structure is just that with which the magnet body for generating the first force and the second force is disposed, the rotating mechanism can be made simple in structure and easily made compact.

Also, if the rail rotating force imparting means is constituted of a columnar magnet body that is a substantially columnar body, is formed with a first surface and a second surface that are substantially parallel in a length direction, and has different magnetic poles at the first surface and the second surface, a magnetic force can be exerted on the region of the moving portion receiving magnetic force by a magnetic force generated from the first surface or the second surface of the columnar magnet body. The magnetic force can thereby be exerted over a fixed range with a single columnar magnet body.

If the rail rotating force imparting means is constituted of a magnet body having a curved shape, the magnet body can easily be disposed closer or further away in accordance with a curving condition, etc., of the first rail portion. Consequently, a magnetic force exerted on the moving portion can be strengthened easily. Also, the magnetic force exerted on the moving portion can be adjusted easily.

Also, if the rail rotating force imparting means is constituted of a columnar magnet body that is a substantially columnar body, is formed with a first surface and a second surface that are substantially parallel in a length direction, and has different magnetic poles at the first surface and the second surface and if, with the columnar magnet body, the first surface or the second surface having the magnetic pole that mutually attracts, within the region of the moving portion receiving magnetic force, a magnetic pole belonging to a region contacting the first rail portion or a magnetic pole belonging to a region at a side closer to the first rail portion is disposed in an orientation of opposing the first rail portion and the length direction is tilted in accordance with a direction in which the helix of the first rail portion is inclined, a repulsive force of the columnar magnet body can be exerted on a region, within the region of the moving portion receiving magnetic force, at a far side from the first rail portion and the first force can be imparted to the moving portion based on this repulsive force.

Also, if the rail rotating force imparting means is constituted of a columnar magnet body that is a substantially columnar body, is formed with a first surface and a second surface that are substantially parallel in a length direction, and has different magnetic poles at the first surface and the second surface and if, with the columnar magnet body, the first surface or the second surface having the magnetic pole that mutually attracts, within the region of the moving portion receiving magnetic force, a magnetic pole belonging to a region contacting the first rail portion or a magnetic pole belonging to a region at a side closer to the first rail portion is disposed in an orientation of opposing the rail portion, the length direction is tilted in accordance with a direction in which the helix of the first rail portion is inclined, and an end portion at one side positioned in a direction of the end portion at the other side of the first rail portion is tilted in a direction of approaching the first rail portion, an attractive force of the columnar magnet body can be exerted, within the region of the moving portion receiving magnetic force, on the region contacting the first rail portion or the region at the side closer to the first rail portion and the second force can be imparted to the moving portion based on this attractive force. Also, by the attractive force and the repulsive force due to the magnetic force of the columnar magnet body, the first rail portion can be rotated while moving the moving portion from one side toward the other side along the first rail portion. Or, the rotational motion of the first rail portion that is rotating can be accelerated even further. Here, even if an angle formed by the axial center of the first rail portion and a vertical direction is not less than 90 degrees and a gravitational force applied to the moving portion cannot be used as the moving force imparting means, it is made possible to impart the first force and the second force to the moving portion by the columnar magnet body.

Also, if the rail rotating force imparting means is constituted of a columnar magnet body that is a substantially columnar body, is formed with a first surface and a second surface that are substantially parallel in a length direction, and has different magnetic poles at the first surface and the second surface and if, with the columnar magnet body, the first surface or the second surface having the magnetic pole that repels, within the region of the moving portion receiving magnetic force, a magnetic pole belonging to a region contacting the first rail portion or a magnetic pole belonging to a region at a side closer to the first rail portion is disposed in an orientation of opposing the first rail portion, a repulsive force of the columnar magnet body can be exerted, within the region of the moving portion receiving magnetic force, on the region contacting the first rail portion or the region at the side closer to the first rail portion. Also, an attractive force of the columnar magnet body can be exerted on a region, within the region of the moving portion receiving magnetic force, at a far side from the first rail portion.

Also, if a plurality of columnar magnet bodies are disposed, it is made possible to exert a strong magnetic force on the moving portion moving along the first rail portion at each of positions at which the respective columnar magnet bodies are disposed. Consequently, an efficiency of rotation of the first rail portion can be increased.

Also, if the moving portion itself is constituted of a magnet and the first rail portion is formed of a magnetic substance to which the magnet is attachable, the moving portion can be attached to the first rail portion via a magnetic force. It is also made possible to generate the first force and the second force by exerting the magnetic force on the entire moving portion. Further, since the moving portion can be constituted of the magnet, the structure can be simplified. Furthermore, the magnetic substance as stated here means, for example, not just a metal to which the magnet is attachable but also that which includes a solid other than a metal, a liquid, or a gas as long as the magnet is attachable.

Also, if the first rail portion is arranged to have a magnet and the moving portion is formed of a magnetic substance to which the magnet is attachable, the moving portion can be attached to the first rail portion via a magnetic force. It is also made possible to generate the first force and the second force by exerting the magnetic force on the entire moving portion.

Also, if the moving portion itself is constituted of a magnet and the first rail portion is arranged to have a magnet, the moving portion can be attached to the first rail portion via a magnetic force. It is also made possible to generate the first force and the second force by exerting the magnetic force on the entire moving portion.

Also, if the moving portion is constituted of an attaching portion capable of being fitted to the first rail portion and a magnet portion coupled to the attaching portion, it is made possible to dispose the magnet portion at a position different from the attaching portion. That is, for example, the attaching portion can be formed of a member of annular shape through an inner side of which the first rail portion is passed and can be moved along the first rail portion. Also, it is made possible to couple the magnet portion to the attaching portion with a string or other member and exert a magnetic force on this position of the magnet portion to generate the first force or the second force.

Also, if a plurality of moving portions are provided, the first forces acting on the respective moving portions combine to enable the first rail portion to be rotated even more strongly in the first direction in comparison to an arrangement where there is a single moving portion.

Also, if the moving portion has a wheel portion that is rotatingly movable along the first rail portion, a frictional force generated between the first rail portion and the moving portion can be decreased easily and a relative movement of the moving portion along the first rail portion can be made smooth. Furthermore, as the wheel portion as stated here, there is a mode where the wheel portion is placeable on the first rail portion and advances while rotating on the first rail portion. Also, for example, there is a mode where a wheel made rotatable upon being attached to a rail in the same manner as a hanging pulley type runner attached to a curtain rail is used.

Also, if a first movement restricting means that restricts a movement of the moving portion from the other side toward the one side of the first rail portion is provided, the first force can be imparted even more easily to the first rail portion and efficiency of a motion of the first rail portion rotating can be increased. That is, if the moving portion moves easily in a direction of the end portion at the one side of the first rail portion, just the moving portion will move in a direction of climbing the inclination of the helix of the first rail portion (just the moving portion will move without the first rail portion moving) when a magnetic force or an elastic force is exerted on the moving portion. Consequently, a motion of the moving portion and the first rail portion rotating integrally in the first direction is made unlikely to occur. Thus, by restricting the movement of the moving portion from the end portion at the other side toward the end portion at the one side of the first rail portion by the first movement restricting means, it can be made easy to generate the first force based on a magnetic force or an elastic force exerted on the moving portion.

Furthermore, examples of the first movement restricting means as stated here include the following. (1) There is a mode where a shape of a path of the first rail portion along which the moving portion moves is made a shape of a gearwheel of a ratchet mechanism or a shape of corrugations that enables smooth movement of the moving portion just in the direction in which the moving portion heads from the one side toward the other side and hinders the movement in which the moving portion heads from the other side toward the one side. (2) Also, there is also a mode where similarly, minute raised hairs are provided on the path of the first rail along which the moving portion moves. (3) Also, if a wheel portion is to be responsible for the movement of the moving portion, there is a mode where a wheel portion with which the wheel portion is enabled to rotate on the first rail portion in just the direction from the one side to the other side thereof (direction of heading toward the end portion at the other side of the first rail portion) and rotation in a reverse direction is deterred is used.

Also, if the first rail portion is restricted in rotation in the second direction that is the direction opposite to the first direction, the first rail portion can be made to rotate easily in the first direction. That is, even if, when the second force is imparted to the moving portion, a force tending to rotate the first rail portion in the second direction is generated in accompaniment with the movement of the moving portion in the direction opposite to the one side along the first rail portion, it is possible to deter this rotation. Consequently, the first force can be generated easily and the first rail portion can be rotated easily in the first direction.

Also, if a weight portion fixed to the first rail portion and arranged to be rotatable together with the first rail portion is provided, the weight portion can rotate together with the first rail portion such that the motion of the first rail portion rotating is assisted by a centrifugal force due to a weight of the weight portion.

Also, if an angle formed by the axial center of the first rail portion and a vertical direction is within a range of not less than 0 degrees but less than 90 degrees, it is made easy to use a gravitational force acting on the moving portion as the moving force imparting means. That is, a force having the same direction as the direction of heading from the one side to the other side of the first rail portion (direction of the inclination direction of the rail) can be generated from a force resulting from decomposition of the gravitational force applied to the moving portion (or a force resulting from decomposition of the gravitational force based on the angle formed by the axial center and the vertical direction) based on an inclination angle of the helix of the first rail portion.

Also, if the angle formed by the axial center of the first rail portion and the vertical direction is not less than 90 degrees, the first rail portion can be disposed to be in an orientation where the end portion at one side and the end portion at the other side are the same in height position in the vertical direction (when the angle formed is 90 degrees) or the position of the end portion at the one side is lower than the position of the end portion at the other side (when the angle formed exceeds 90 degrees). A degree of freedom of a disposed position at which the rotating mechanism is disposed can thereby be increased.

Also, if a second rail portion disposed at an inner side of the first rail portion, formed to a helical shape of an opposite direction as the helix of the first rail portion, and arranged to be rotatable around an axial center together with and in the same direction as the first rail portion is included, then, by moving the moving portion along the first rail portion and rotating the first rail portion in the first direction, the second rail portion can be rotated in the same direction. Furthermore, the helical shape of the opposite direction as the helix of the first rail portion as stated here means, for example, that if when the first rail portion and the second rail portion are viewed from front, the inclination of the helix of the first rail portion is in a direction of rising from left to right, an inclination of the helix of the second rail portion is in a direction of rising from right to left. Further, it suffices that the directions of the helices of the first rail portion and the second rail portion are opposite and an arrangement where inclination angles of the helices differ may also be adopted.

Also, if the second rail portion is disposed at the inner side of the first rail portion, is formed to the helical shape of the opposite direction as the helix of the first rail portion, and is arranged such that the moving portion is movable between an end portion at one side thereof and the end portion at the other side of the first rail portion and between an end portion at another side thereof and the end portion at the one side of the first rail portion and the moving portion is arranged to be attachable to the second rail portion, it is made possible to transfer the moving portion that has moved along the first rail portion from one side toward the other side thereof to the end portion at the one side of the second rail portion. Also, likewise, the moving portion that is positioned at the end portion at the other side of the second rail portion can be transferred to the end portion at the one side of the first rail portion.

Also, if, by the motion of rotating the first rail portion in the first direction, the second rail portion is rotated and the moving portion is moved to the end portion at the other side of the second rail portion, then, based on the motion of rotating the first rail portion, the moving portion can be made to reach the other side of the second rail portion and then moved to the first rail portion again to make the moving portion cycle between the first rail portion and the second rail portion. Consequently, the first rail portion and the second rail portion can be rotated continuously.

Also, if a cycling rail rotating force imparting means imparts, to a third region of the moving portion, a third force in a direction of rotating the second rail portion in the first direction or the second direction that is the direction opposite to the first direction, the second rail portion can be rotated. Or, a rotational motion of the second rail portion that is rotating can be accelerated even further. Furthermore, the rotation of the second rail portion as stated here includes the motion of rotating the first rail portion in the first direction since the first rail portion and the second rail portion are connected. Also, the third region of the moving portion may, for example, be an end portion or the central portion of the moving portion and is not limited in its region as long as it includes a region different from a fourth region to be described below. Also, the third region may be overlapped with the first region or the second region of the moving portion described above.

Also, by a cycling moving force imparting means imparting, to the fourth region of the moving portion that includes a region different from the third region, a fourth force in a direction of moving the moving portion from the one side toward the other side of the second rail portion, the moving portion can be moved along the second rail portion. Furthermore, the movement of the moving portion as stated here includes a relative change of a position of the moving portion on the second rail portion upon rotation of the second rail portion. Also, the movement of the moving portion includes a motion of the moving portion moving along the second rail portion while it itself rotates. Also, the fourth region of the moving portion as stated here may, for example, be an end portion or the central portion of the moving portion and is not limited in its region as long as it includes a region different from the third region. Also, the fourth region may be overlapped with the first region or the second region of the moving portion described above.

Also, by repeating the movement of the moving portion relative to the second rail portion and the motion of rotating the second rail portion in the first direction by the third force and the fourth force, it is made possible to rotate the second rail portion in the first direction continuously while moving the moving portion along the second rail portion. Or, the rotational motion of the second rail portion that is rotating can be accelerated even further continuously. Furthermore, the rotation of the second rail portion stated here also includes the rotation of the first rail portion.

Also, by the third force and the fourth force repeating the movement of the moving portion relative to the second rail portion and the motion of rotating the second rail portion in the first direction to move the moving portion to the end portion at the other side of the second rail portion, the force that rotates the second rail portion in the first direction continuously can be imparted until the moving portion reaches the end portion at the other side of the second rail portion.

Also, if a second rail portion disposed at a predetermined interval from the first rail portion, formed to a predetermined helical shape, and arranged to be rotatable around an axial center and a rotating force transmitting means transmitting the rotation of the first rail portion to the second rail portion to rotate the second rail portion are included, and if the second rail portion is arranged to be rotatable in the same direction as the first rail portion when the predetermined helical shape is formed to be of the opposite direction as the helix of the first rail portion or the second rail portion is arranged to be rotatable in the opposite direction as the first rail portion when the predetermined helical shape is formed to be of the same direction as the helix of the first rail portion, then, by moving the moving portion along the first rail portion and rotating the first rail portion in the first direction, the second rail portion can be rotated in the same direction or be rotated in a reverse direction to the rotation of the first rail portion. Also, by the second rail portion being disposed at the predetermined interval from the first rail portion, degrees of freedom of size and shape of the second rail portion are widened. Further, the degree of freedom of position of disposing a structural body for exerting a magnetic force or an elastic force on the moving portion that is moving along the second rail portion is widened.

Also, if, by the motion of rotating the first rail portion in the first direction, the second rail portion is rotated and the moving portion is moved to the end portion at the other side of the second rail portion, then, based on the motion of rotating the first rail portion, the moving portion can be made to reach the other side of the second rail portion and then moved to the first rail portion again to make the moving portion cycle between the first rail portion and the second rail portion. Consequently, the first rail portion and the second rail portion can be rotated continuously.

Also, if a cycling rail rotating force imparting means imparts, to a third region of the moving portion, a third force in a direction of rotating the second rail portion in the first direction or the second direction that is the direction opposite to the first direction, the second rail portion can be rotated. Or, the rotational motion of the second rail portion that is rotating can be accelerated even further. Furthermore, the rotation of the second rail portion as stated here includes the motion of rotating the first rail portion in the first direction since the first rail portion and the second rail portion are connected. Also, the third region of the moving portion may, for example, be an end portion or the central portion of the moving portion and is not limited in its region as long as it includes a region different from the second region to be described below. Also, the third region may be overlapped with the first region or the second region of the moving portion described above.

Also, by a cycling moving force imparting means imparting, to a fourth region of the moving portion that includes a region different from the third region, a fourth force in a direction of moving the moving portion from the one side toward the other side of the second rail portion, the moving portion can be moved along the second rail portion. Furthermore, the movement of the moving portion as stated here includes a relative change of a position of the moving portion on the second rail portion upon rotation of the second rail portion. Also, the movement of the moving portion includes a motion of the moving portion moving along the second rail portion while it itself rotates. Also, the fourth region of the moving portion as stated here may, for example, be an end portion or the central portion of the moving portion and is not limited in its region as long as it includes a region different from the third region. Also, the fourth region may be overlapped with the first region or the second region of the moving portion described above.

Also, if a pressing means defining an attaching angle of the moving portion to the first rail portion is included, a state where the moving portion is kept fixed in a state of being attached to the first rail portion and the movement of the moving portion along the first rail portion stops can be deterred easily. That is, for example, if when a magnetic force is exerted on the moving portion to move it along the first rail portion, the moving portion is completely attracted by the magnetic force of a magnet body, the moving portion may become immobile. Therefore, by providing the pressing means and defining the attaching angle of the moving portion to the first rail portion, it is made possible to maintain an inclination of the moving portion such that the moving portion is not put in an orientation of becoming completely attracted by the magnetic force of the magnet body. Consequently, it is made possible to ensure the movement of the moving portion along the first rail portion.

Also, if a power conversion portion connected directly or indirectly to the first rail portion and converting the motion of the first rail portion rotating to power is included, it is made possible to recover a rotational kinetic energy obtained by rotation of the first rail portion as power that, for example, moves another object.

Also, if an electric power conversion portion connected directly or indirectly to the first rail portion and converting the motion of the first rail portion rotating to electric power is included, it is made possible to recover a rotational kinetic energy obtained by the first rail portion rotating as electric power energy.

Advantageous Effects of Invention

The rotating mechanism according to the present invention is simple in arrangement and is arranged to be low in energy loss and capable of recovering rotational kinetic energy efficiently.

BRIEF DESCRIPTION OF DRAWINGS

FIG. 3 shows diagrams showing an example of variations of a rail or the column member;

FIG. 32 shows diagrams of an example of variations of a presser member for the moving body.

DESCRIPTION OF EMBODIMENTS

Modes for implementing the present invention (each hereinafter referred to as an "embodiment") shall now be described with reference to the drawings.

First Embodiment

Figure 1A:
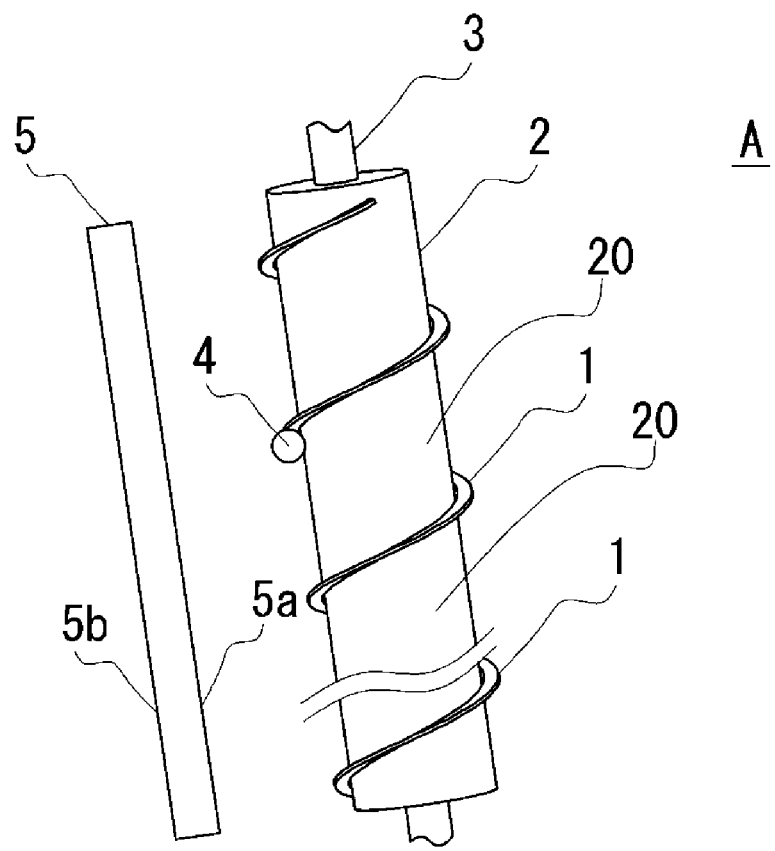
FIG. 1A is a schematic view showing a first embodiment of the present invention and FIG. 1B is a partially enlarged view of FIG. 1A.

A rotating mechanism A according to the present invention includes a rail 1 of a helical shape formed to be of uniform diameter, a column member 2 disposed at an inner side of the rail 1, a rotating shaft 3 inserted through and fixed at a center of the column member 2, a moving body 4 attachable to the rail 1, and a magnet body 5 disposed slightly separated from the column member 2 (see FIG. 1A).

Furthermore, the rail 1 as stated here corresponds to a first rail portion in the claims of the present application. Also, the moving body 4 as stated here corresponds to a moving portion in the claims of the present application and the magnet body 5 as stated here corresponds to a rail rotating force imparting means in the claims of the present application. Also, the magnet body 5 also corresponds, together with a gravitational force that acts on the moving body 4 to be described below, to a moving force imparting means in the claims of the present application.

Also, in the following description, on the basis of FIG. 6A, a right side as viewed in FIG. 6A shall be referred to as the "right side" or "rightward side" and a left side as viewed in FIG. 6A shall be referred to as the "left side" or "leftward side." Also, on the basis of FIG. 6A, an upper side as viewed in FIG. 6A shall be referred to as the "rear side" or "rearward side" and a lower side as viewed in FIG. 6A shall be referred to as the "front side" or "forward side."

Figure 6A:
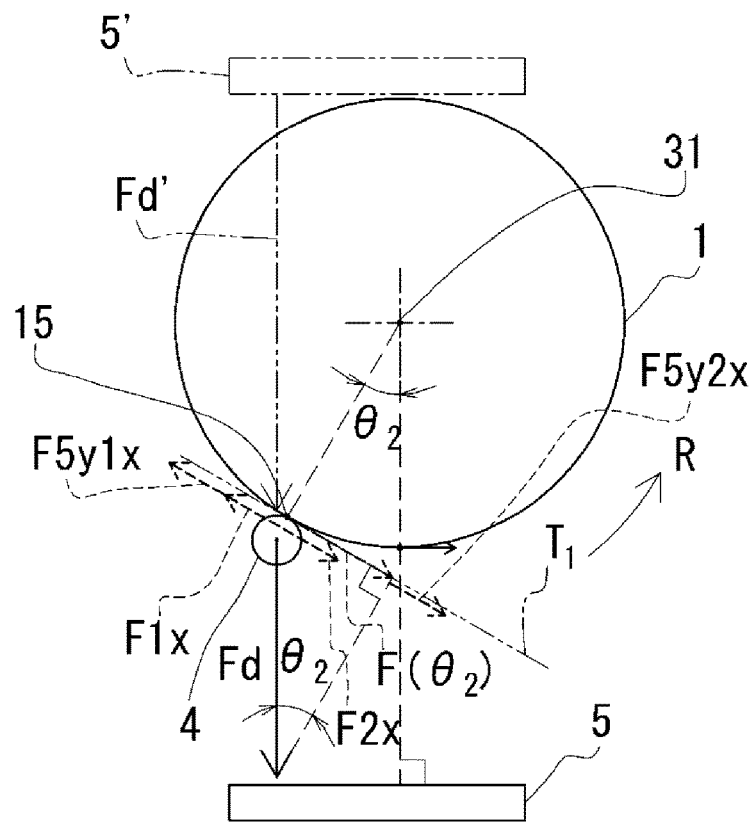
FIG. 6 shows conceptual diagrams showing forces acting on the moving body.

Furthermore, FIG. 6A is a conceptual diagram showing, in regard to the rotating mechanism A shown in FIG. 1, forces acting on the moving body in a state of viewing the rail 1 and the column member 2 from thereabove along an axial center direction.

Also, in the following description, a direction substantially orthogonal to a front/rear direction as viewed in FIG. 6A shall be referred to as the right/left direction. Further, a direction substantially parallel to the front/rear direction and the right/left direction as viewed in FIG. 6A shall be referred to as the horizontal direction. Also, on the basis of FIG. 1A, a direction along the helical shape of the rail 1 shall be referred to as the "rail inclination direction."

Also, when the column member 2 and the rotating shaft 3 are disposed to be tilted with respect to a vertical direction, depending on an angle of tilt thereof, there are cases where a region at a lower side of an inclination of the rail 1 is at a higher side than a region, connected thereto, at an upper side of the inclination.

Also, in the following description, an end portion (at a side closer to the rail 1) of the moving body 4 (or a magnet constituting the moving body 4) at a side attached to the rail 1 shall be referred to as the "tip end (of the moving body 4)" and an end portion opposite thereto (at a far side from the rail 1) shall be referred to as the "terminal end (of the moving body 4)." For example, a side of an S pole of the moving body 4 in FIG. 7 is the tip end and a side of an N pole is the terminal end.

The rail 1 is a member that serves as a path along which the moving body 4 moves. It is also a member that rotates in one direction (see arrow indicated by a symbol R in FIG. 1B) upon receiving a rotating force via the moving body 4 that receives a first force (magnetic force) from the rail rotating force imparting means to be described below. In the following description, a direction in which the rail 1 is intended to be rotated to obtain a rotational kinetic energy from the rail 1 shall be referred to as the "ideal direction." Further, rotation in the one direction in which the rail 1 rotates shall be referred to as the "rotation in the ideal direction" and rotation in another direction in which the rail 1 rotates shall be referred to as the "rotation in reverse to the ideal direction." Also, the "ideal direction" as stated here corresponds to a "first direction" in the claims of the present application and a "direction opposite (in reverse) to the ideal direction" corresponds to a "second direction" in the claims of the present application.

Also, the rotational kinetic energy that is generated by the rail 1 rotating is transmitted to an unillustrated motor attached to an end portion of the rotating shaft 3 to enable generation of electric power energy. That is, the rail 1 is a member for generating the rotational kinetic energy.

Also, the rail 1 is formed to the helical shape that extends along a length direction of the rotating shaft 3 and the helix is of uniform diameter (see FIG. 1A). Also, the rail 1 is formed of iron, which is a ferromagnetic substance.

Figure 1B:
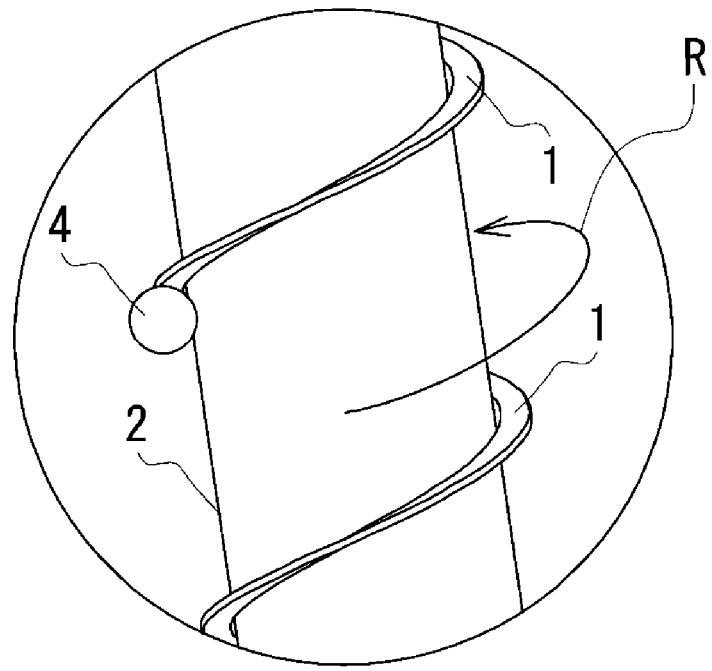
Figure 2:
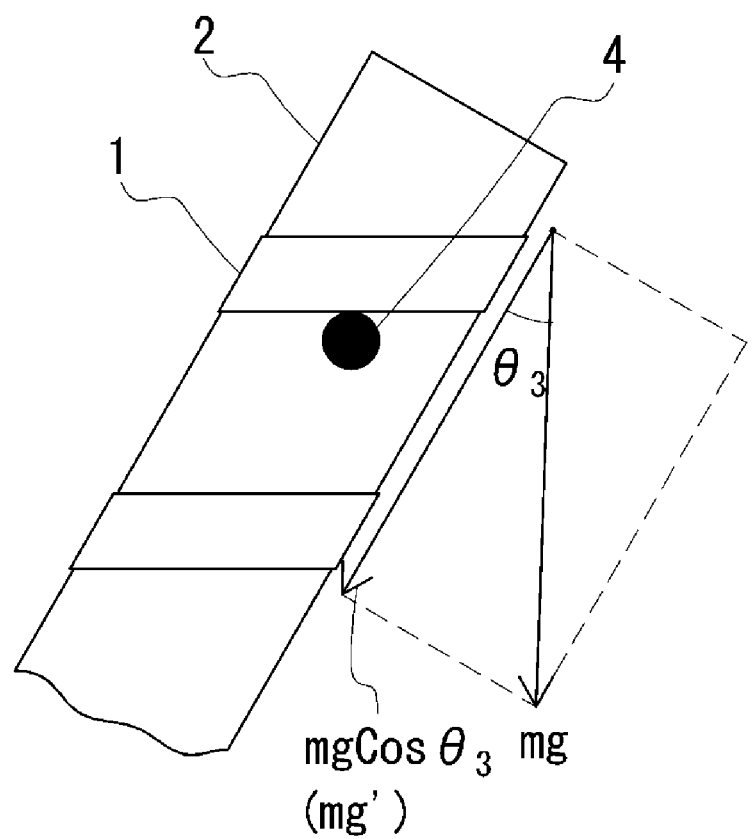
FIG. 2 is a diagram describing an inclination of a column member with respect to a vertical direction.

Furthermore, although in FIG. 1, the shape of the rail 1 that is formed to be rather thin in width is shown, as the shape of the rail 1, a structure that is wide in width and is such that is wound around an outer peripheral surface of the column member 2 may be adopted (see FIG. 2 and FIG. 3A). Also, as another structure, the rail 1 may have a wire-like shape that is thin in width. Therefore, in drawings besides FIG. 1, the symbol 1 shall be attached for indication even for rails of different shapes.

The column member 2 is a member of substantially circular columnar shape that is longer than a length in a length direction of the rail 1 and is a member, to which one end side and another end side of the rail 1 is fixed (not shown), that supports the rail 1 (see FIG. 1A). Also, a portion of the rail 1 besides the one end side and the other end side that are fixed to the column member 2 does not contact the outer peripheral surface of the column member 2 and is of a structure having a gap with respect to the column member 2. Also, the rotating shaft 3 is fixedly provided in an interior of the column member 2.

From the structures such as described above, the rail 1, the column member 2, and the rotating shaft 3 form a structural body that rotates integrally. That is, the rail 1, the column member 2, and the rotating shaft 3 are made integrally rotatable by a force acting to rotate the rail 1 in the ideal direction.

Also, the column member 2 and the rotating shaft 3 are disposed to be tilted at a predetermined angle from the vertical direction (for example, with an angle formed with the vertical direction being 10 degrees) (see FIG. 1 and FIG. 2; furthermore, in FIG. 2, an angle that the column member 2 and the rotating shaft 3 form with vertical direction is indicated as θ3). Furthermore, this angle is changeable and details of a structure with which the angle is changed shall be described below.

Also, by the column member 2 and the rotating shaft 3 being disposed to be tilted at the predetermined angle from the vertical direction, a region that, in an orientation of being directed toward a lower side in the rail inclination direction, is directed from a lower side toward an upper side in the vertical direction is made present within the rail 1 (hereinafter referred to as the "ascending region").

Also, the moving body 4 is formed of a spherical magnet capable of being attached via a magnetic force to the rail 1. Furthermore, although in FIG. 1A and FIG. 1B, the moving body 4 is indicated as a single magnet of spherical shape for convenience, the moving body 4 may be formed of a plurality of magnets instead. Also, a shape of the moving body 4 is not limited to a spherical shape and that which is formed of a magnet of rod shape or rectangular shape may be adopted instead. In drawings besides FIG. 1, the symbol 4 shall be attached for indication even for arrangements where the shape of the moving body 4 or a shape of the magnet that the moving body 4 has differs.

Also, the moving body 4 is arranged to be movable along the rail 1 to the lower side in the inclination direction of the helix or to the upper side in the inclination direction. Also, the moving body 4 is arranged to be movable from an upper end toward a lower end of the rail 1 along the rail 1 that rotates.

Furthermore, in the present embodiment, a movement of the moving body 4 that is necessary for rotating the rail 1 is realized by a rotation of the rail 1 and a movement of the moving body 4 toward the lower side of the inclination of the rail 1 being combined.

That is, for example, the movement of the moving body 4 is mainly a motion of the moving body 4 moving along an outer peripheral surface of the rail 1 that rotates. Also, in this process, the moving body 4 may be performing a motion where it itself rotates.

As shown in FIG. 1A, the magnet body 5 of substantially rectangular parallelepiped shape is disposed slightly separated from the column member 2. The magnet body 5 is a member that applies, to the moving body 4, magnetic forces in directions of attracting the terminal end of the moving body 4 in a direction of the magnet body 5 and repelling the tip end of the moving body 4 in a direction opposite the magnet body 5 side. This magnet body 5 constitutes the rail rotating force imparting means to be described below.

Also, this magnet body 5 also acts as the moving force imparting means. A length in a length direction of the magnet body 5 is formed to be of substantially the same length as a length in a length direction of the column member 2.

Also, the magnet body 5 is arranged to have different magnetic poles at a surface 5a at one side and a surface 5b at another side (see FIG. 1A). In the present embodiment, the surface 5a has an S pole and the surface 5b has an N pole.

Also, the magnet body 5 is disposed such that its length direction is substantially parallel to the length direction of the column member 2 and the rotating shaft 3.

Here, a structure with which the rail 1 is supported by the column member 2 is not necessarily required and it suffices that the rail 1 is arranged to be rotatable. For example, a mode can be adopted where the rail 1 is formed of a material of high rigidity and can maintain shape even without the column member 2 and with just the rail 1 (see FIG. 3B). However, from a point of the rotation of the rail 1 being stabilized and durability being improved by the column member 2 and the rail 1 rotating integrally, it is preferable for the rail 1 to be supported by the column member 2.

Also, the one end side and the other end side of the rail 1 are not necessarily required to be fixed to the column member 2 and, for example, a structure where the one end side and the other end side of the rail 1 are fixed to the rotating shaft 3 is also allowable. Further, it suffices that a structure enabling a force of rotation of the rail 1 to be transmitted to the rotating shaft 3 is arranged and it suffices that a motion of rotation of the rail 1 and a motion of rotation of the rotating shaft 3 are linked directly or indirectly.

Also, a structure where the rail 1, the column member 2, and the rotating shaft 3 rotate integrally is not necessarily required and it suffices that a structure with which a rotational kinetic energy is generated upon rotation of the rail 1 is arranged. For example, a structure with which the rail 1 and the rotating shaft 3 are rotatably attached to the column member 2 is also allowable. Further, as long as arrangements are made such that the rail 1 is rotatable and the kinetic energy of its rotation can be transmitted to another mechanism, the column member 2 and the rotating shaft 3 are not necessarily required to be provided.

Also, a gap is not necessarily required to be formed between the rail 1 and the column member 2 and it is also possible to arrange a structure where the rail 1 is contactingly wound around the outer peripheral surface of the column member 2 (see FIG. 2 and FIG. 3A). However, by forming the gap between the rail 1 and the column member 2, the moving body 4 is made unlikely to contact the column member 2 and friction between the moving body 4 and the column member 2 is made suppressible when the moving body 4 that is adhered to the rail 1 moves to the lower end of the rail 1 along the rail 1 that rotates. Consequently, efficiency of rotational motion of the rail 1 can be improved.

Also, from a standpoint of improving the efficiency of the rotational motion of the rail 1, outer peripheral surfaces of regions 20 of the column member 2 between (respective) turns of the rail 1 (see FIG. 1A) may be hollowed partially to arrange a structure where the moving body 4 and the outer peripheral surface of the column member 2 are unlikely to be in contact. With this structure, friction due to contact of the moving body 4 and the outer peripheral surface of the column member 2 is made unlikely to occur when the moving body 4 moves from the upper end toward the lower end of the rail 1 along the rail 1 that rotates and the efficiency of the rotational motion of the rail 1 can be improved.

Further, from the standpoint of improving the efficiency of the rotational motion of the rail 1, an arrangement where an oil or a detergent, etc., is coated as a lubricant on the rail 1 or the moving body 4 to reduce friction between the rail 1 and the moving body 4 can also be adopted. A frictional force that hinders the motion of the rail 1 rotating can thereby be reduced to improve the efficiency of the rotational motion of the rail 1.

Also, the motor is not necessarily required to be attached to the end portion of the rotating shaft 3. For example, a mechanism where a freely rotatable belt is attached to the rotating shaft 3 and the motor is rotated with the motor being connected to this belt is also allowable. Further, a structure where the rotating shaft 3 is not provided but a protrusion or a hook, etc; is provided on any position on the rail 1 and the rotational kinetic energy of the rail 1 is transmitted to another gearwheel mechanism, etc., is also allowable. That is, a structure which rotates a motor disposed at a separate position via a known transmission mechanism (for example, a mechanism arranged by combining members such as a cam, a shaft, a belt, etc.) capable of transmitting the rotational kinetic energy of the rail 1 is also allowable.

Also, the electric power energy that is generated by the motor may be consumed as it is as electric power or may be stored in a storage battery, etc.

Also, the rotational kinetic energy generated by the rail 1 is not necessarily required to be converted to electric power energy by the motor. For example, a structure where the rotating shaft 3 is connected to a known crankshaft mechanism or piston mechanism and the rotational kinetic energy is converted to and used as a driving energy that moves another object is also allowable. Further, as long as it is possible to take out the rotational kinetic energy of the rail 1 in some form, a method for taking it out is not limited in particular.

Also, the shape of the helix of the rail 1 is not necessarily required to be formed to be of uniform diameter and the shape is not limited as long as a structure where the rail 1 rotates based on forces of the rail rotating force imparting means and the moving force imparting means to be described below is arranged. For example, besides the helical shape of uniform diameter (see FIG. 1A and FIG. 3A), a rail that includes helix diameters of different magnitudes (see FIG. 3C) is also allowable. Further, although not illustrated, a structure where the rail 1, by being wound around an outer peripheral surface of a column member of gourd shape, takes on a shape with which diameters of circumferential circles formed thereby differ in magnitude to impart a variation in strength to a force of magnetic force received from the magnet body 5 can also be adopted. Further, in consideration of the magnetic force exerted on the rail, it may also be considered to make the magnet body 5 be of a curved shape such as to have a curved surface.

Also, it is not necessarily required that the rail 1 be formed of iron, which is a ferromagnetic substance, and the moving body 4 be formed of a magnet. It suffices that the moving body 4 is of an arrangement that is movable along the rail 1 that rotates and has a magnetic force portion that receives the magnetic forces from the rail rotating force imparting means.

From the above standpoint, for example, a combination where the rail 1 is formed of a magnet and the moving body 4 is formed of a ferromagnetic substance (for example, iron, cobalt, nickel, and also including other substances that exhibit ferromagnetism with temperature change, etc.) is also allowable.

Also, for example, a structure where the rail 1 is formed of a magnet and the moving body 4 is formed of iron or other ferromagnetic substance can also be adopted. Even in this case, it is possible to attach the moving body 4 to the rail 1 and move the moving body 4 along the rail 1. Further, a structure where both the rail 1 and the moving body 4 are constituted of magnet portions is also allowable.

Further, a structure can be arranged where the moving body 4 is formed of a balloon and a liquid or a gas containing a magnetic substance is placed in an interior of the balloon. The balloon can be adhered to the rail 1, for example, by forming the rail 1 of a member that includes a magnet.

Also, it may also be considered to adopt, in place of the rail 1, a tube with a penetrating hole formed in an interior. By making a liquid or a gas containing a magnetic substance flow in the interior of this tube, it is made possible for the moving body 4 and the tube to be adhered when, for example, the moving body 4 is formed of a magnet.

Figure 4A:
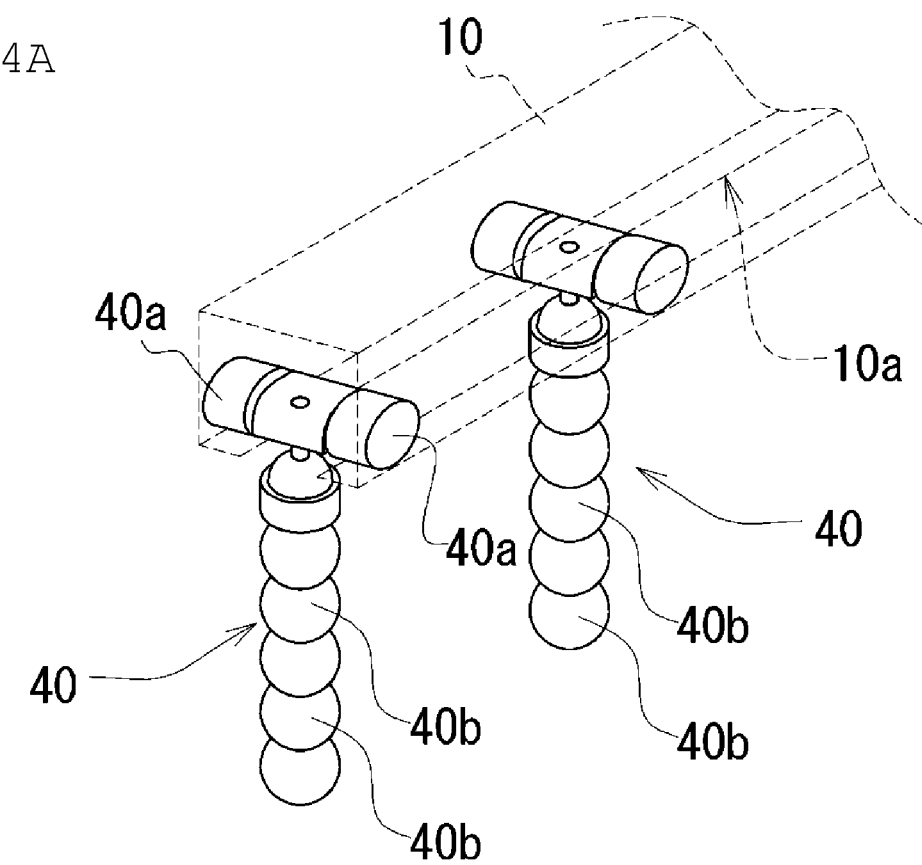
FIG. 4 shows diagrams showing an example of variations of the rail or a moving body.

Also, in relation to the above, for example, a structure where a substantially U-shaped groove portion 10a is formed in a portion of a rail 10 and a moving body 40 is provided with a roller portion 40a that fits in this groove portion 10a and rotates can also be adopted (see FIG. 4A). Also, the moving body 40 has a magnet portion 40b.

In this case, it is made unnecessary to use a magnetic force to attach the moving body 40 to the rail 10. Also, the moving body 40 can be moved smoothly along the rail 10 because it moves by rotation of the roller portion 40a. Also, in this case, a forming position of the groove portion 10a and a forming position of the roller portion 40a are not limited and can be selected as appropriate.

Furthermore, although with the moving body 40 described above, a structure where the moving body 40 is attached to a lower portion of the rail 10 is indicated, an orientation of the rail 10 and a method for attaching the moving body 40 are not limited thereto. For example, it is also possible to tilt an angle of the rail 10 and attach the roller portion 40a of the moving body 40 in the groove portion 10a thereof. Further, as long as the moving body 40 is movable, a structure with which the groove portion 10a is open upward is also allowable.

Figure 4B:
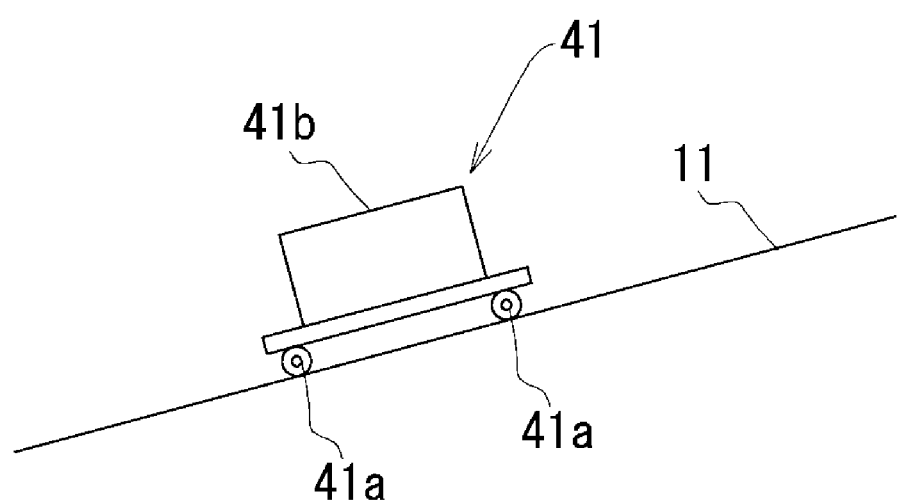

Also, for example, a moving body 41 can be provided with tires 41a to arrange a car type moving body 41 that moves along an upper surface of a rail 11 as a movement path (see FIG. 4B). Here, with the moving body 41, the tires 41a are provided on a base on which a magnet portion 41b is disposed and the moving body 41 is enabled to move along the rail 11 by the tires 41a rotating.

Figure 31:
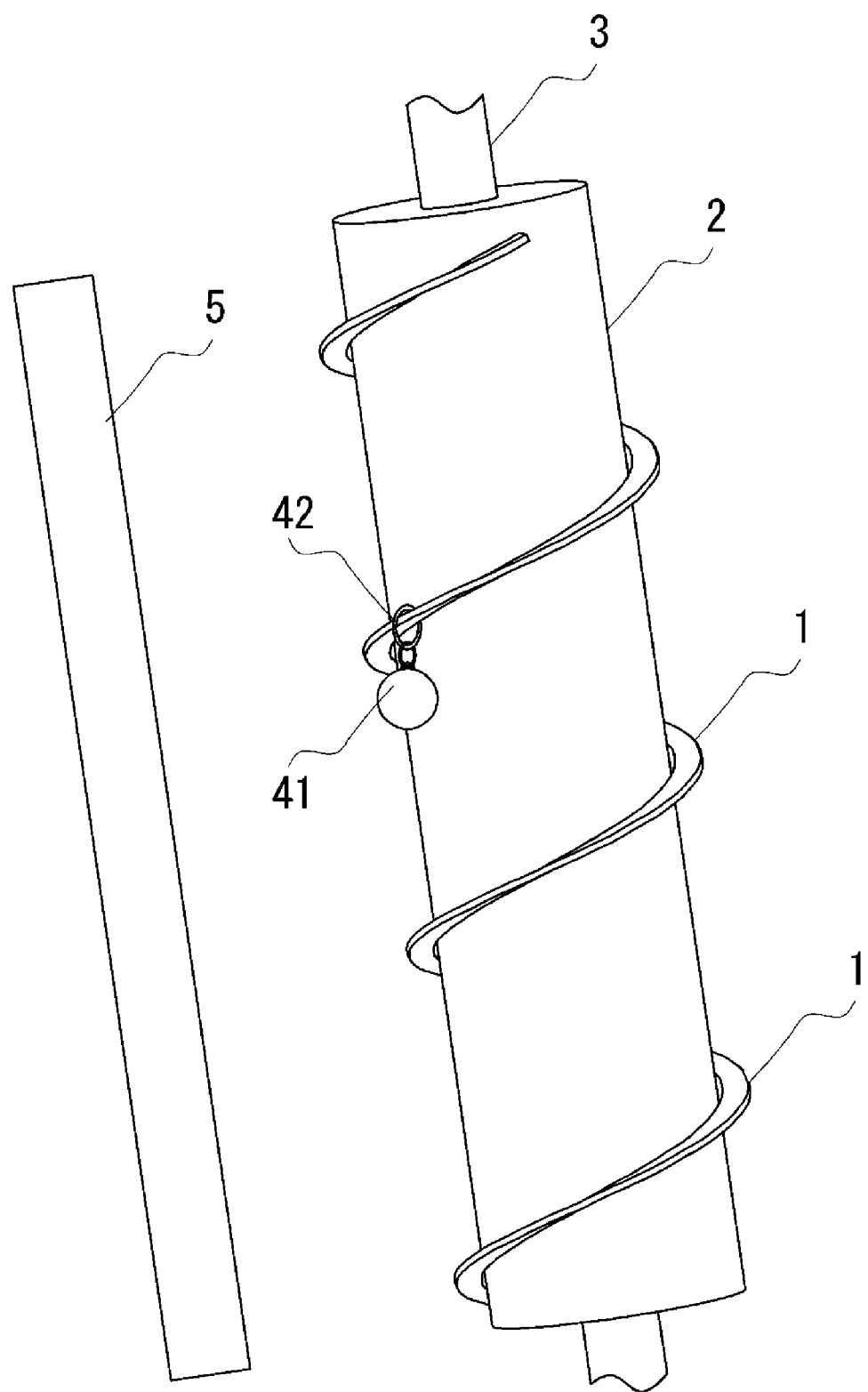
FIG. 31 is a diagram showing an example of a variation of an attaching structure of the moving body to the rail.

Further, as a structure of the rail and the moving body, for example, a structure of attaching to the rail 1 via a ring portion 42 of annular shape can be considered (see FIG. 31). A magnet portion 41b is attached to this ring portion 42 of annular shape and arranged such that the magnetic forces of the magnet body 5' are exerted thereon. Materials forming the rail 1 and the moving body 41 can thus be selected as appropriate.

Here, in regard to the roller portion 40a and the tires 41a described above, a structure where these rotate smoothly toward the lower side in the inclination direction of the rail 1 and are deterred in rotation in a reverse direction (rotation in a direction toward the upper side in the inclination direction of the rail 1) can also be adopted from a standpoint of improving efficiency of rotating the rail 1 in the ideal direction. A movement of the moving body 4 where it moves toward the upper side in the inclination direction of the rail 1 and with which a force of rotating the rail 1 in the ideal direction to be described below is unlikely to be generated is thereby made unlikely to occur.

Figure 9A:
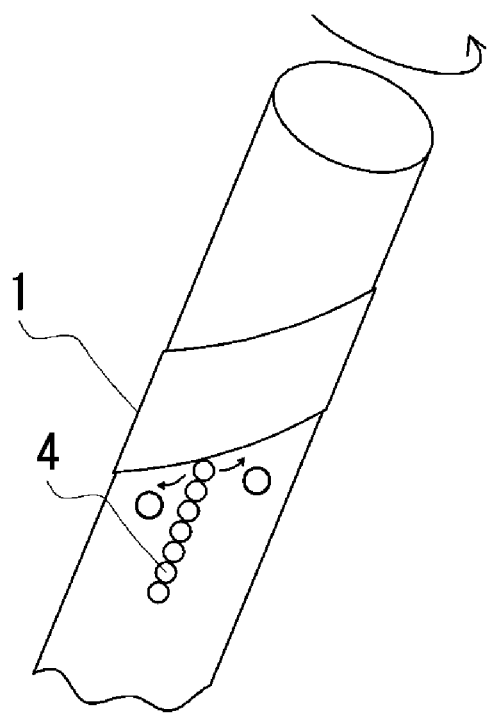
FIG. 9 shows diagrams showing an example of variations of a shape of the rail.
Figure 9B:
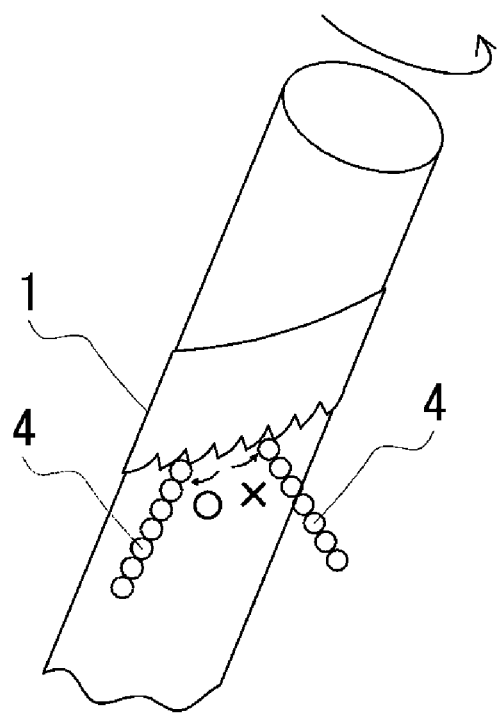

Also, similarly from the standpoint of improving the efficiency of rotating the rail 1 in the ideal direction, it can be considered to provide a shape of corrugations at a portion of the rail 1 as shown in FIG. 9B. With the rail 1 shown in FIG. 9A that is not provided with a shape of corrugations, movement in either of the directions to the upper side and the lower side in the inclination direction of the rail 1 is made easy for the moving body 4.

With the rail 1 shown in FIG. 9B, although the moving body 4 can move easily toward the lower side in the inclination direction along the corrugations of the rail 1, toward the upper side in the inclination direction of the rail 1 on the other hand, a need for the moving body 4 to move upon surmounting projections and recesses between the corrugations arises and movement in this direction is suppressed. Consequently again, movement of the moving body 4 where it moves toward the upper side in the inclination direction of the rail 1 and with which a force of rotating the rail 1 in the ideal direction to be described below is unlikely to be generated is thereby made unlikely to occur.

Further, from the standpoint of improving the efficiency of rotating the rail 1 in the ideal direction, it may be considered to arrange a structure where the rail 1 rotates in the ideal direction but is deterred from rotation in reverse to the ideal direction. The rail 1 can thereby be made easy to rotate in the ideal direction and the efficiency of the rotation can be improved.

Also, although not illustrated, from the standpoint of improving the efficiency of rotating the rail 1 in the ideal direction, a structure may also be considered where an outer peripheral surface of the moving body 4 to be attached to the rail 1 is provided with projections and recesses of gearwheel shape and the rail 1 is also provided with recesses that fit with the projections of gearwheel shape of the moving body 4. This, for example, is a shape where the rail 1 is provided with a structure of bicycle chain shape. Also, the moving body 4 moves along the rail 1 while it itself rotates such that the projections of gearwheel shape and the recesses of the chain-shaped structure of the rail 1 fit together and by the moving body 4 thereby moving along the rail 1 while rotating, it is made possible to rotate the rail 1 in the ideal direction. Such a structure can also be adopted in the present invention.

Also, although in FIG. 1A and FIG. 1B, just one moving body 4 is illustrated with respect to one rail for convenience of description, a mode where a plurality of moving bodies 4 are attached to the rail can be considered. For example, an arrangement where a plurality of moving bodies 4 are attached along the rail 1 with intervals being provided between the moving bodies 4 can also be adopted.

Each one of the moving bodies 4 can thereby receive a force for rotating the rail 1 to rotate the rail 1. For example, if there are a plurality of moving bodies 4, the force of rotating the rail 1 can be improved based on the forces received by the plurality. Consequently, it is made possible for the forces from the respective moving bodies 4 to be transmitted to the rail 1 and the rail 1 to be rotated more powerfully.

Here, it is not necessarily required that each moving body 4 be formed of a single spherical magnet. As mentioned above, in FIG. 1A and FIG. 1B, the moving body 4 is indicated by a single spherical magnet just for convenience and it suffices that the moving body 4 has a region constituted of a magnet at a portion thereof. For example, an arrangement where a single moving body 4 is constituted of a plurality of spherical magnets can also be adopted (see FIG. 8). Also, an arrangement where the moving body 4 is constituted not of a spherical magnet but of a rectangular magnet can also be adopted (see FIG. 7).

Also, it is not necessarily required that the length in the length direction of the magnet body 5 be formed to be of substantially the same length as the length in the length direction of the column member 2 and the magnet body 5 is not limited in length as long as it has a length enabling exertion of the magnetic forces over a range in which the moving body 4 moves and on a desired range over which the force is intended to be exerted to rotate the rail 1. However, from a standpoint of being able to exert the magnetic force on the rail 1 over a wide range in the length direction and being able to stabilize the motion the rail 1 rotating, it is preferable that the length in the length direction of the magnet body 5 be formed to be of substantially the same length as the length in the length direction of the column member 2.

Also, the shape of the magnet body 5 is not necessarily required to be formed to be columnar and, for example, a structure having a gradually curving shape may also be arranged. For example, a shape having a curved plane with a surface opposing the rail 1 being an inner periphery and a surface opposite thereto being an outer periphery may be arranged. An advantage that it is made easy to exert the magnetic force on a desired position thereby arises. Also, further, a magnet body with a gradually curved shape can be disposed, with its angle being tilted as appropriate, at a periphery of the rail 1.

Figure 18A:
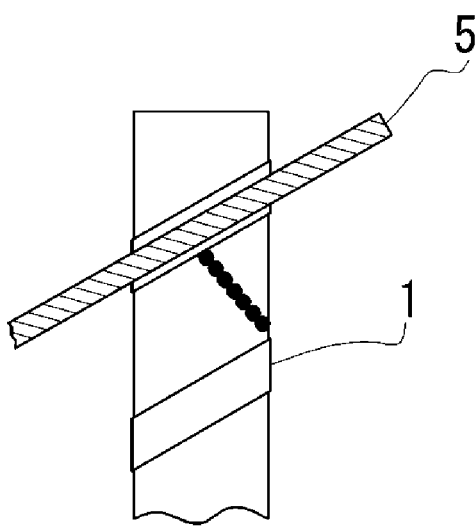
FIG. 18 shows diagrams showing an example of variations of length and disposition of the rail.
Figure 18B:
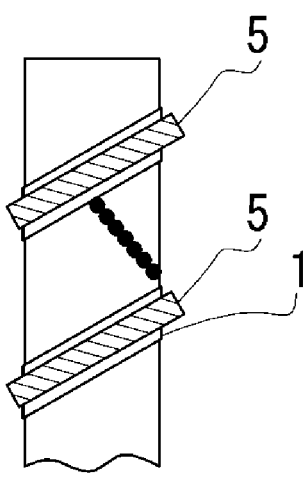

Also, in regard to a length and disposition of the magnet body 5, for example, a mode where a slightly long magnet body 5 is disposed in an orientation substantially parallel to the inclination direction of the rail 1 can also be considered (see FIG. 18A). Also, for example, an arrangement where a plurality of magnet bodies 5 of short length are disposed across the length directions of one rail 1 and one column member 2 can also be adopted (see FIG. 18B). Furthermore, although the magnet bodies 5 shown in FIG. 18A and FIG. 18B are disposed in orientations parallel to the inclination direction of the rail 1, the orientation of each magnet body 5 is not limited thereto. For example, the magnet body 5 may be disposed with its orientation being differed from the inclination direction of the rail 1.

Also, the magnet body 5 is not necessarily required to be disposed such that its length direction is substantially parallel to the length directions of the column member 2 and the rotating shaft 3. For example, the magnet body 5 can also be disposed with its length direction being tilted obliquely to an orientation where its length direction and angle differ with respect to the length directions of the column member 2 and the rotating shaft 3. By disposing the magnet body 5 to be tilted obliquely, ways in which the magnetic forces exerted on the moving body 4 are applied can be changed to control a rotational speed of the rail 1 by improving the efficiency of the rotation of the rail 1 even further or oppositely weakening the speed of rotation. The disposition of the magnet body 5 is thus not limited in particular and can be set as appropriate as long as it is such that a force that rotates the rail 1 is generated.

Also, with the magnet body 5, the magnet constituting it is not required to be formed of a magnet having uniform magnetic forces or a collective body thereof and may instead be arranged such that magnitudes of the magnetic forces differ at portions. The ways in which the magnetic forces exerted on the moving body 4 are applied can thereby be changed to control the rotational speed of the rail 1 by improving the efficiency of the rotation of the rail 1 even further or oppositely weakening the speed of rotation.

Also, it is not necessarily required that the magnet body 5 be disposed at a position slightly separated from the column member 2 and that the position be fixed. From a standpoint of controlling the speed at which the rail 1 rotates and controlling starting and stopping of the rotation of the rail 1, a position adjusting mechanism capable of changing the disposed position of the magnet body 5 or an angle adjusting mechanism capable of changing the orientation of the magnet body 5 may be provided together with the magnet body 5.

Further, an arrangement where a separate member such as a magnet or ferromagnetic substance, etc., that is capable of applying change to the magnetic force is disposed between the magnet body 5 and the rail 1 can also be adopted. By doing so, a strength of the magnetic force that the magnet body 5 exerts on the rail 1 (moving body 4), a direction of the magnetic force, and a range over which the magnetic force is exerted can be changed to control the rotational speed of the rail 1, the starting and stopping of the rotation, etc. By providing this mechanism that controls the rotational speed of the rail 1, the starting and stopping of the rotation, etc., maintenance of the rotating mechanism can be performed easily. Also, it is made possible, for example, in using the rotating mechanism of the present invention as a mechanism that assists another energy generating mechanism to impart a variation in strength to a force of assistance or stop the assistance by the rotating mechanism.

Also, although unillustrated, a structure with which a weight portion is attached to the rail 1 described above can be adopted as a structure that strengthens the rotation of the rotating mechanism. This weight portion is arranged to be integrally rotatable with the rail 1 and when the rail 1 rotates, a centrifugal force applied to the weight portion is added to enable the motion of the rotating mechanism rotating to be strengthened even further.

Also, the magnet body 5 is not necessarily required to be disposed at an outer side of the rail 1 as shown in FIG. 1A and FIG. 6. As long as it is arranged to exert the magnetic force on the rail 1 and be capable of rotating the rail 1, it may be of a structure where it is disposed at an inner side of the rail 1.

[Operation Based on the Rail Rotating Force Imparting Means and the Moving Force Imparting Means]

Next, the rail rotating force imparting means and the moving force imparting means in the first embodiment of the present invention shall be described with reference to FIG. 5, FIG. 6, and FIG. 7.

First, in the present embodiment, two basic operations are performed repeatedly to rotate the rail 1 in the ideal direction. The first basic operation is an operation where the rail 1 and the moving body 4 rotate integrally slightly in the ideal direction (hereinafter referred to as the "ideal rotation operation"). Also, the second basic operation is an operation where the moving body 4 moves slightly along the inclination direction of the rail 1 from the one side toward the other side of the rail 1 (toward the lower side in the rail inclination direction) (hereinafter referred to as the "rail traveling operation").

That is, by the ideal rotation operation and the rail traveling operation being performed repeatedly, the rail 1 rotates in the ideal direction and it is made possible to continue the rotation operation. Also, by this motion of the rail 1 rotating in the ideal direction and the rail traveling operation, the moving body 4 changes in relative position on the rail 1, moves from one side to the other side of the rail 1, and can eventually reach the other end of the rail 1.

Here, that the rail 1 rotates in the ideal direction by the ideal rotation operation and the rail traveling operation being performed repeatedly also includes any of the following contents. (1) An operation where the rail 1 that stands still starts rotating in the ideal direction. (2) An operation where the rotation of the rail 1 that is rotating in the ideal direction is maintained. (3) An operation of rotating with the rotation of the rail 1 that is rotating in the ideal direction being accelerated further. (4) An operation of rotating with the rotation of the rail 1 that is rotating in the ideal direction being decelerated. That is, in the present embodiment, not just an operation of starting the rotation or continuing the rotation of the rail 1 but also an operation of assisting the rotation such that the efficiency of rotation is further improved, for example, from a state where the rail 1 is being rotated via another driving source is also included. Further, an operation of quickening or weakening the rotation by adjusting the disposed position or orientation of the magnet body 5 to change the strength or the orientation of the magnetic force exerted on the rail 1 or the range over which the magnetic force is exerted is also included.

Also, in the present embodiment, the ideal rotation operation is performed by exerting the magnetic forces by the magnet body 5 on the magnet of the moving body 4 to rotate the rail 1 and the moving body 4 integrally slightly in the ideal direction.

[Mode where the Magnet Body 5 Exerts an Attractive Force on the Terminal End of the Moving Body 4]

Here, the ideal rotation operation and the rail traveling operation can be divided largely into two types, that is, a mode where an "attractive force" is exerted and a mode where a "repulsive force" is exerted on the terminal end of the moving body 4. In the following, the ideal rotation operation and the rail traveling operation in the mode where the magnet body 5 exerts an attractive force on the terminal end of the moving body 4 shall be described first.

Furthermore, although, depending on the disposition of the magnet body 5 and the arrangement of providing a plurality of the magnet bodies 5, a case where both an attractive force and a repulsive force act on the terminal end of a single moving body 4 can be considered, an arrangement where a main force of magnetic force acting on the moving body 4 is due to an "attractive force" or a "repulsive force" and a magnetic force besides this is exerted on the terminal end of the moving body 4 is also included in the present embodiment.

Figure 5:
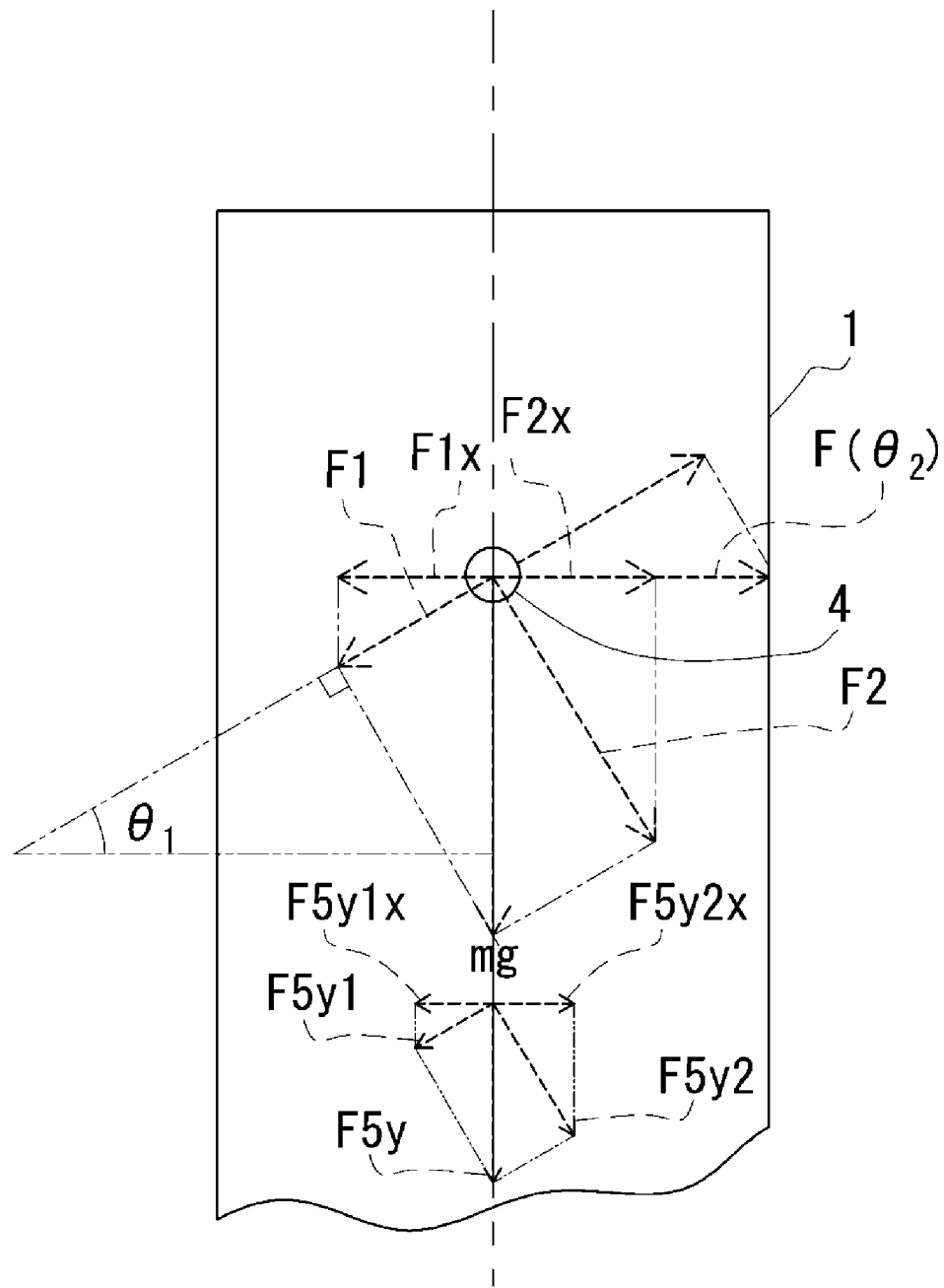
FIG. 5 is a conceptual diagram showing forces acting on the moving body.
Figure 6B:
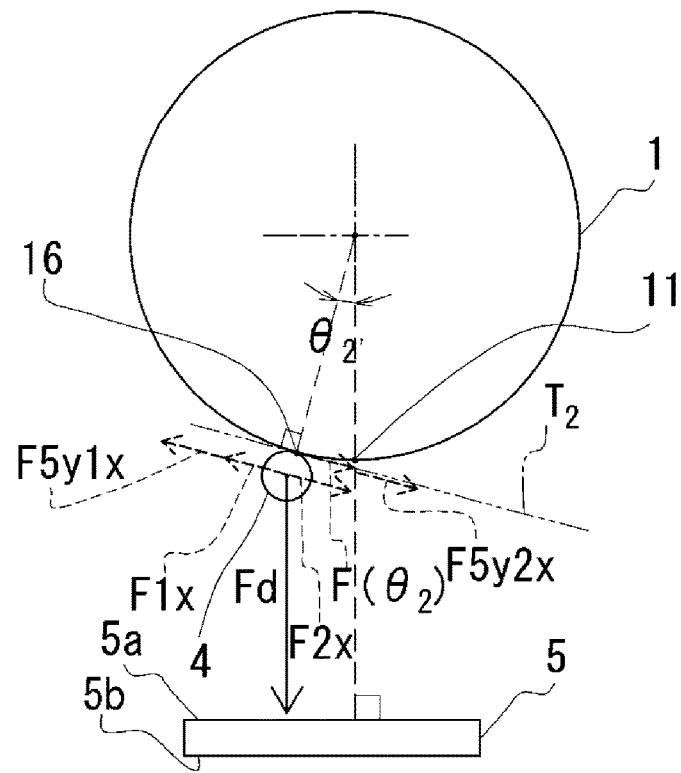

As shown in FIG. 5, a force $F(\theta 2)$ based on a magnetic force received from the magnet body 5 acts on the moving body 4. As shown in FIG. 6A and FIG. 6B, the force $F(\theta 2)$ is a force based on a force Fd that is a force by which the magnet body 5 attracts the terminal end of the moving body 4.

In more detail, the force $F(\theta 2)$ is a force of a component in a tangential direction of the column member 2 (rail 1) of the attractive force Fd acting on the terminal end of the moving body 4 from the magnet body 5. Also, $F(\theta 2)$ is a force with which a magnitude of the force varies with the movement of the moving body 4. Furthermore, the tangential direction of the column member 2 (rail 1) is indicated by a symbol $T_1$ in FIG. 6A and by a symbol $T_2$ in FIG. 6B.

Also, a force mg' based on a gravitational force applied to the moving body 4 itself acts on the moving body 4. The force mg' is an apparently vertical component force in FIG. 5. In the following, horizontal components and vertical components are those that are apparent in FIG. 5 and differ from horizontal and vertical in actuality.

Furthermore, although in FIG. 5, the indication of the force mg' based on the gravitational force applied to the moving body 4 itself is used, the direction of the arrow of the force provided with mg' in FIG. 5 is, to be accurate, not a direction equivalent to a vertically lower side but is direction directed to a lower side along the length direction of the column member 2. As already mentioned, with the present embodiment, the column member 2 and the rotating shaft 3 are disposed to be tilted such that an angle formed with the vertical direction is $\theta 3$ (see FIG. 2).

That is, as shown in FIG. 2, with respect to the actual gravitational force mg applied to the moving body 4 itself, a force in the direction directed toward the lower side along the length direction of the column member 2 is mg cos $\theta 3$. This mg cos $\theta 3$ corresponds to the force mg' in FIG. 5.

Also, this force mg' is decomposed into a force F1 resulting from decomposition in the inclination direction of the rail 1 and a force F2 resulting from decomposition in a direction orthogonal to the inclination direction of the rail 1 (see FIG. 5). Also, a force resulting from decomposing the force F1 in the horizontal direction is indicated as the force F1$x$. Also, a force resulting from decomposing the force F2 in the horizontal direction is indicated as the force F2$x$. Also, an angle formed by the inclination direction of the rail 1 and the horizontal direction is $\theta 1$.

Here, the force F2$x$ is a force of fixed magnitude because it is based on the force mg'. The varying force $F(\theta 2)$ is added to this F2$x$ that is a fixed force to act as a force that rotates the rail 1 in the ideal direction. Also, the force $F(\theta 2)$ and the force F2$x$ have directions in a tangential direction on an arc of the helix of the rail 1 in plan view (see FIG. 6A and FIG. 6B). Furthermore, a force of F5$y$2$x$ to be described below is also included as a force that rotates the rail 1 in the ideal direction.

Also, the force F1 is a force that tends to move the moving body 4 toward the lower side in the rail inclination direction.

Also, the force F2 is a force of the direction substantially orthogonal to the inclination direction of the rail 1 and is therefore a force that pushes the rail 1. That is, the force F2x resulting from decomposing the force F2 acts as a force that rotates the rail 1 in the ideal direction.

Besides the force Fd by which the terminal end of the moving body 4 is pulled by the magnetic force of the magnet body 5, a force (repulsive force) by which a tip end of the moving body 4 is moved away by a magnetic force of the magnet body 5 acts on the moving body 4. In more detail, as shown in FIG. 7A, the N pole at the terminal end side of the moving body 4 is attracted to the S pole of the surface 5a of the magnet body 5 (symbol F4) and the S pole at the tip end side of the moving body 4 receives a repulsive force F3 from the S pole of the surface 5a of the magnet body 5.

By the force F3 and the force F4 based on the magnetic forces of the magnet body 5 acting on the moving body 4, a force is generated in a direction of rotating the moving body 4 as a whole such that the tip end of the moving body 4 is directed downward and the terminal end is directed upward. Furthermore, in FIG. 7A to FIG. 7C, the moving body 4 is illustrated as that constituted of a magnet of rod shape to make the motion of the moving body 4 easy to understand.

Figure 7A:
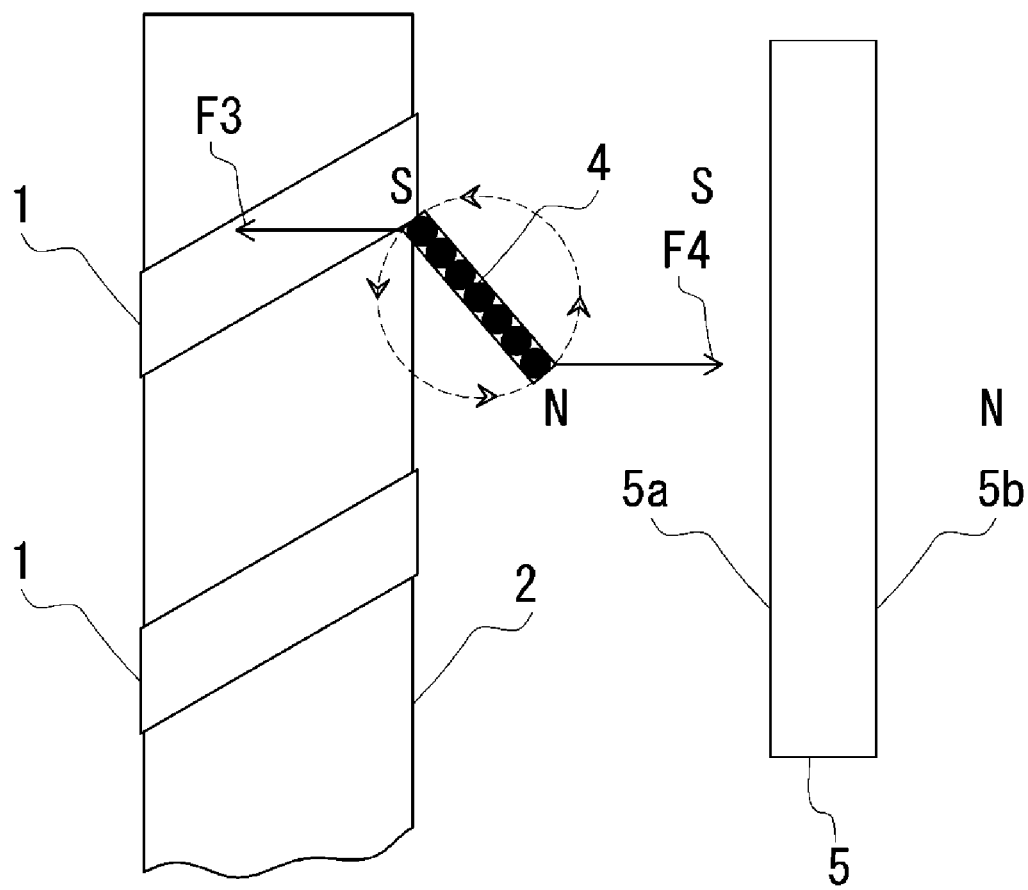
FIG. 7 shows conceptual diagrams showing forces acting on the moving body.

By these magnetic forces of the magnet body 5 that act on the tip end and the terminal end of the moving body 4, the moving body 4 undergoes a motion of tilting in a counter-clockwise direction as viewed in FIG. 7A (a range of rotation is indicated by dotted lines in FIG. 7A). Furthermore, although the symbol of force F4 is attached for convenience in FIG. 7A and FIG. 7B, this force F4 is a force that corresponds to the force Fd described above. That is, the force $F(\theta 2)$ described above is generated based on the force F4 (Fd) by which the terminal end of the moving body 4 is attracted to the magnet body 5.

Also, from the repulsive force F3 that the tip end of the moving body 4 receives from the magnet body 5, a force F5 resulting from decomposition of the force F3 is generated. Further, from the force F5, a force F5y resulting from decomposition in the direction toward the lower side along the length direction of the column member 2 is generated. This force F5y is a force with the same direction as the force mg' shown in FIG. 5 described above. That is, the force F5y generated based on the force that the tip end of the moving body 4 receives from the magnet body 5 is a force that is added to the force mg'.

Figures 7B, 7C:
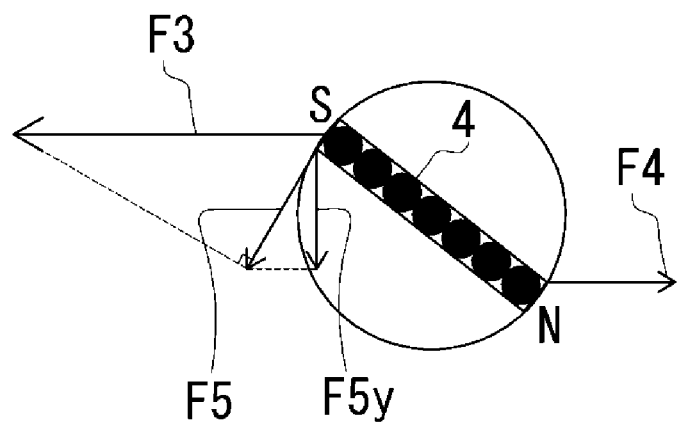

Also, when the moving body 4 is put in a completely horizontal orientation as shown in FIG. 7C by the forces received from the magnet body 5, it is difficult to generate a force for rotating the rail 1. Structures for avoiding the moving body 4 from being put in the completely horizontal orientation shall thus be described using FIG. 32.

With the structure shown in FIG. 32A, a structure is arranged where a presser plate 70 is disposed in a vicinity of the column member 2 and the presser plate 70 contacts a near middle portion of the moving body 4. Thereby, when the moving body 4 receives the magnetic forces from the magnet body 5 (or the magnet body 5'), it will not tilt more than necessary and its orientation can be maintained at a tilt within a fixed range. Thus, the movement of the moving body 4 along the rail 1 is enabled and the rail 1 can be rotated.

Also, as another structure, a structure where the presser plate 70 is disposed near the terminal end of the moving body 4 to control the tilt of the moving body 4 as shown in FIG. 32B can also be adopted. Further, the presser plate 70 can also be disposed at the positions shown in FIG. 32C and FIG. 32D.

By thus using the presser plate 70, the moving body 4 can be prevented from its orientation being set to a completely horizontal orientation by the magnetic forces received from the magnet body 5 (see FIG. 32E) and the rotation of the rail 1 can be ensured. Furthermore, the presser plate 70 as stated here corresponds to an example of pressing means in the claims of the present application.

Here, it is not necessarily required that the presser plate 70 be used for controlling the orientation of the moving body 4 and a structure where the magnetic forces that the magnet body 5 exerts on the moving body 4 is adjusted to control the orientation of the moving body 4 is also allowable. Also, in place of the presser plate 70, for example, a member of string shape may be installed and as long as the tilt of the moving body 4 can be controlled, a material and a shape of the presser plate 70 are not limited.

Also, as long as the movement of the moving body 4 along the rail 1 is enabled and the rail 1 can be rotated, a region of the moving body 4 that is pressed by the presser plate 70 is not limited in particular. For example, it may be a central portion of the moving body 4 (see FIG. 32A) or an end portion of the moving body 4 (see FIG. 32B and FIG. 32D) or a region in a vicinity of the terminal end of the moving body 4 (see FIG. 32C) and is not limited to these.

Next, the force F5y that is added to the abovementioned force mg' shall be described using FIG. 5. This force F5y is decomposed into a force F5y1 resulting from decomposition in the inclination direction of the rail 1 and a force F5y2 resulting from decomposition in the direction orthogonal to the inclination direction of the rail 1. Also, a force resulting from decomposing the force F5y1 in the horizontal direction is indicated as the force F5y1x. Also, a force resulting from decomposing the force F5y2 in the horizontal direction is indicated as the force F5y2x.

Also, the force F5y1 is a force that tends to move the moving body 4 toward the lower side in the rail inclination direction. The force F5y1 is a force that is added to the force F1.

Also, the force F5y2 is a force in a direction substantially orthogonal to the inclination direction of the rail 1 and is thus a force that pushes the rail 1. The force F5y2x resulting from decomposition of the force F5y2 thus acts as a force that rotates the rail 1 in the ideal direction. The force F5y2x is a force that is added to the force F2x.

A flow of the ideal rotation operation and the rail traveling operation shall now be described based on the above contents. First, as shown in FIG. 6A, in the ideal rotation operation of the rail 1 and the moving body 4, at a point 15 on the rail 1, the force $F(\theta 2)$, the force F2x, and the force F5y2x act on the rail 1 in a direction of the other side of the rail 1 along a tangential line $T_1$ (a right obliquely downward direction as viewed in FIG. 6A). An angle indicated by a symbol $\theta 2$ is an angle formed by a line connecting a rotation center 31 of the rail 1 and the moving body 4 and line connecting the rotation center 31 and a minimum distance to the surface 5a of the magnet body 5.

Also in FIG. 6A and FIG. 6B, a force by which the terminal end of the moving body 4 is pulled to the magnet body 5 is indicated by the symbol Fd (corresponding to the force F4) for convenience. That is, the force $F(\theta 2)$ is also expressed as $Fd \sin \theta 2$.

By the force $F(\theta 2)$, the force F2x, and the force F5y2x acting on the rail 1, the rail 1 rotates slightly in the ideal direction (direction indicated by the symbol R). In this process, the moving body 4 moves integrally with the rail 1.

That is, when the rail 1 and the moving body 4 perform the ideal rotation operation, the moving body 4 moves from the point 15 (see FIG. 6A) to a point 16 (see FIG. 6B) with respect to the magnet body 5. Also, the angle θ2 decreases in accompaniment with the rotations of the rail 1 and the moving body 4. A magnitude of force of the force F(θ2) thereby decreases. That is, the force that rotates the rail 1 and the moving body 4 in the ideal direction decreases.

Also, the force F1 and the force F5y1 act on the tip end of the moving body 4 and the moving body 4 moves toward the lower side in the inclination direction of the rail 1. This operation is the rail traveling operation. The moving body 4 performs the operation of rotating in the ideal direction together with the rail 1 while moving to the lower side of the inclination of the rail 1 and by both of these operations occurring, the movement of the moving body 4 and the rotation operation of the rail 1 in the ideal direction are continued.

Thus, in addition to the force mg' that acts on the moving body 4, the force F(θ2), the force F5y1, and the force F5y2x are generated by the magnetic forces that the magnet body 5 exerts on the tip end and the terminal end of the moving body 4. By these forces, the force that presses the rail 1 in the direction in which the rail 1 rotates in the ideal direction and the force by which the moving body 4 moves along the rail 1 to the lower side in the inclination direction of the rail 1 are respectively made stronger. That is, by the action of the magnetic forces that the magnet body 5 exerts on the moving body 4, it is made possible to rotate the rail 1 more strongly.

In the first embodiment of the present invention, the tip end of the moving body 4 corresponds to an example of a first region in the claims of the present application and the terminal end of the moving body 4 corresponds to a second region in the claims of the present application. Depending on the shape of the moving body 4, the shape of the rail 1, the disposition of the magnet portion belonging to the moving body 4, the shape and disposition of the magnet body 5, etc., there are cases where the first region and the second region are portions different from the tip end and the terminal end of the moving body 4 and the present invention also includes these different modes as variations of the invention.

Also, although with the contents described above, the ideal rotation operation and the rail traveling operation in the mode where the magnet body 5 exerts the "attractive force" on the terminal end of the moving body 4 was described, embodiments of the present invention are not limited thereto. That is, the ideal rotation operation and the rail traveling operation can also be performed in a mode where a magnet body 5' exerts a "repulsive force" on the terminal end of the moving body 4 (see FIG. 8A and FIG. 8B).

Differences between the above-described mode where the magnet body 5 exerts the "attractive force" on the terminal end of the moving body 4 and the mode where the magnet body 5' exerts the "repulsive force" on the terminal end of the moving body 4 to be described below mainly lie in the following points.

In this mode where the magnet body 5' exerts the "repulsive force" on the terminal end of the moving body 4, one point is that (1) the force F(θ2) that is a force that rotates the rail 1 and the moving body 4 in the ideal direction is generated based on the repulsive force by which the terminal end of the moving body 4 is moved away by the magnetic force of the magnet body 5'. There is also a point that (2) a force equivalent to the force F5y described above is generated from an attractive force that the tip end of the moving body 4 receives from the magnet body 5'.

Here, the disposed position of the magnet body 5' is not limited in particular as long as it is possible to exert the repulsive force on the terminal end of the moving body 4. For example, the magnet body 5' can be disposed at a position at an opposite side to the magnet body 5 across the moving body 4 to exert a magnetic force Fd' on the moving body 4 (see FIG. 6A).

Figure 8A:
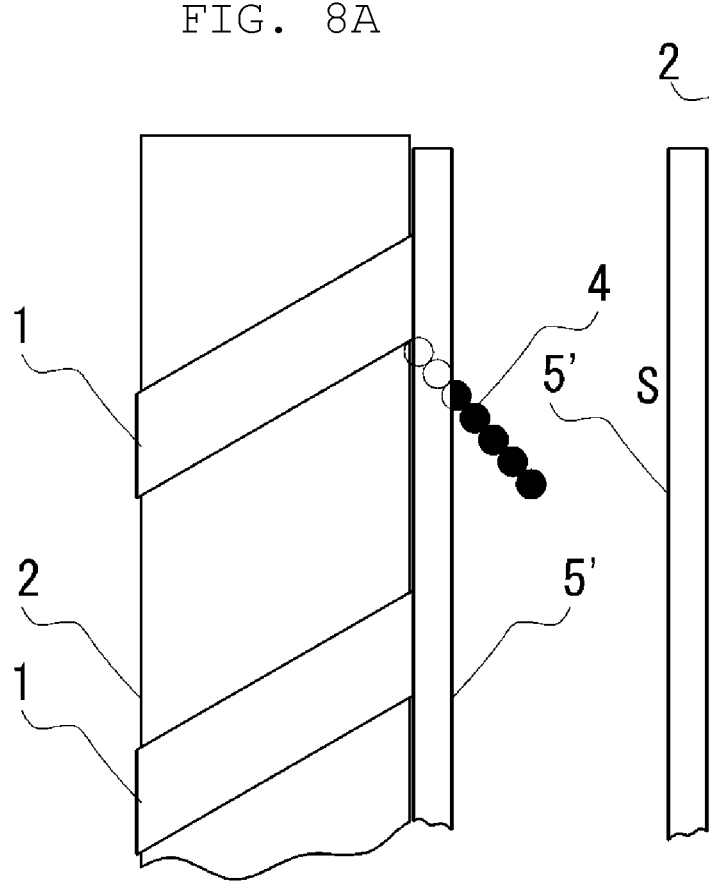
FIG. 8 shows conceptual diagrams showing forces when a repulsive force is applied to a terminal end of the moving body.
Figure 8B:
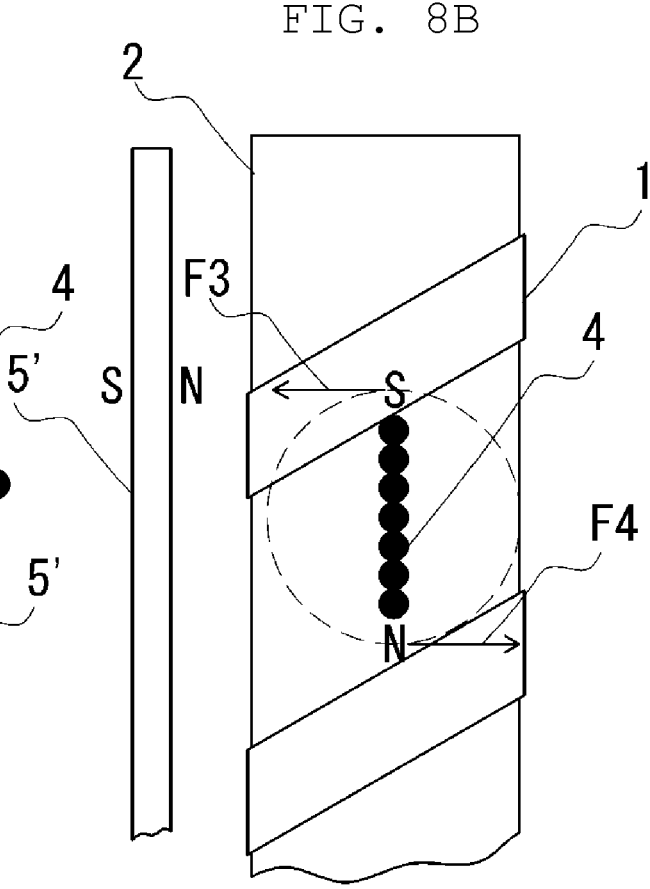

Further, as another example of its disposed position, the magnet body 5' can be disposed at a front and left side of the column member 2 as shown in FIG. 8A and FIG. 8B. In either of the modes, forces equivalent to the force F(θ2), the force F5y1, and the force F5y2x can be generated by exertion of the attractive force on the tip end and the repulsive force on the terminal end of the moving body 4 in accordance with the disposition of the magnet body 5'.

Figure 8C:
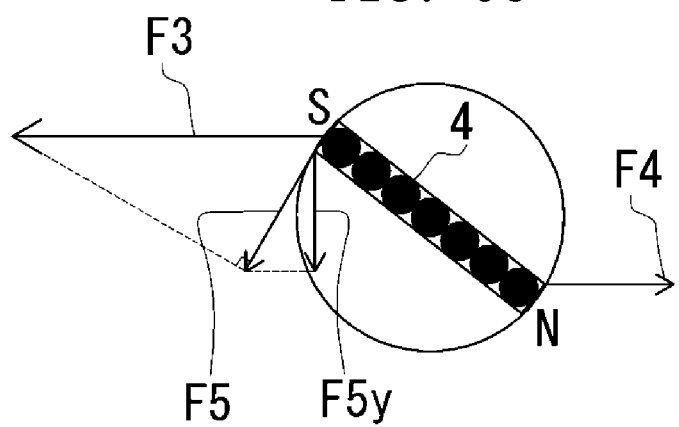

In more detail, as shown in FIG. 8C, by a force F3 and a force F4 based on the magnetic forces of the magnet body 5' acting on the moving body 4, a force is generated in a direction of rotating the moving body 4 as a whole such that the tip end of the moving body 4 is directed downward and the terminal end is directed upward.

By these magnetic forces of the magnet body 5' that act on the tip end and the terminal end of the moving body 4, the moving body 4 undergoes a motion of tilting in a counter-clockwise direction as viewed in FIG. 8C. Furthermore, although the symbol of force F4 is attached for convenience in FIG. 8B and FIG. 8C, this force F4 is a force that is equivalent to the force Fd described above. That is, the force F(θ2) described above is generated based on the repulsive force F4 (Fd) that acts on the terminal end of the moving body 4 from the magnet body 5'.

Also, from the attractive force F3 that the tip end of the moving body 4 receives from the magnet body 5', a force F5 resulting from decomposition of the force F3 is generated. Further, from the force F5, a force F5y resulting from decomposition in the direction toward the lower side along the length direction of the column member 2 is generated. This force F5y is a force with the same direction as the force mg' shown in FIG. 5 described above. That is, the force F5y generated based on the force that the tip end of the moving body 4 receives from the magnet body 5' is a force that is added to the force mg'. Thus, even in the mode where the attractive force is exerted on the tip end and the repulsive force is exerted on the terminal end of the moving body 4, a force that is added to the force mg' is generated.

Thus, the force that presses the rail 1 in the direction in which the rail 1 rotates in the ideal direction and the force by which the moving body 4 moves along the rail 1 to the lower side in the inclination direction of the rail 1 are made stronger, and it is made possible to rotate the rail 1 (or to rotate the rail 1 that stands still) by the action of the magnetic forces.

Second Embodiment

Figure 10A:
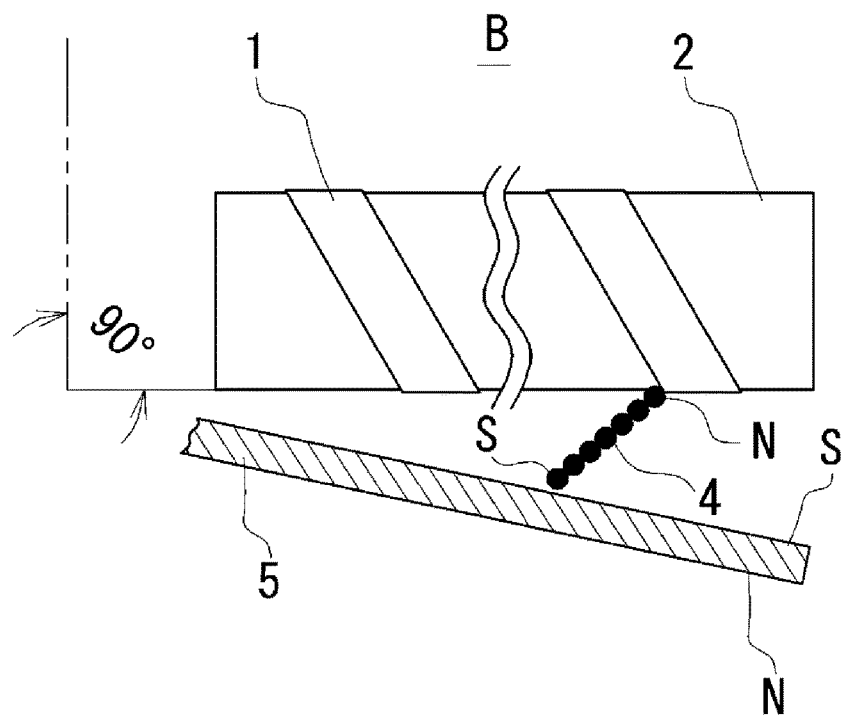
FIG. 10A is a schematic view showing a second embodiment of the present invention and FIG. 10B is a schematic view showing a structure where an angle formed by axial centers of the rail and the column member and the vertical direction is 100 degrees.
Figure 11:
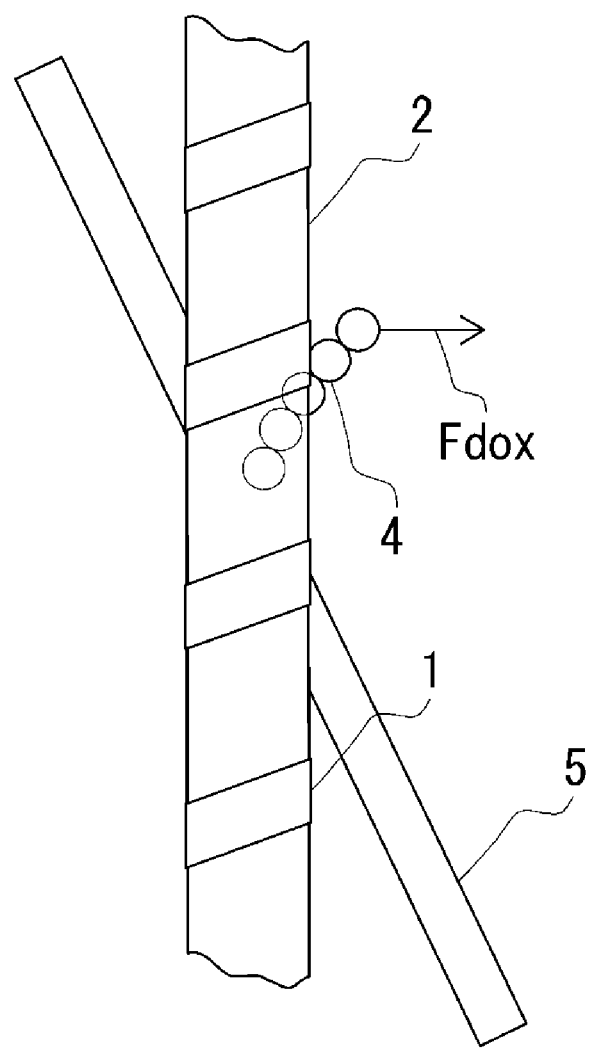
FIG. 11 is a diagram showing a state of the second embodiment of the present invention in plan view.
Figure 12:
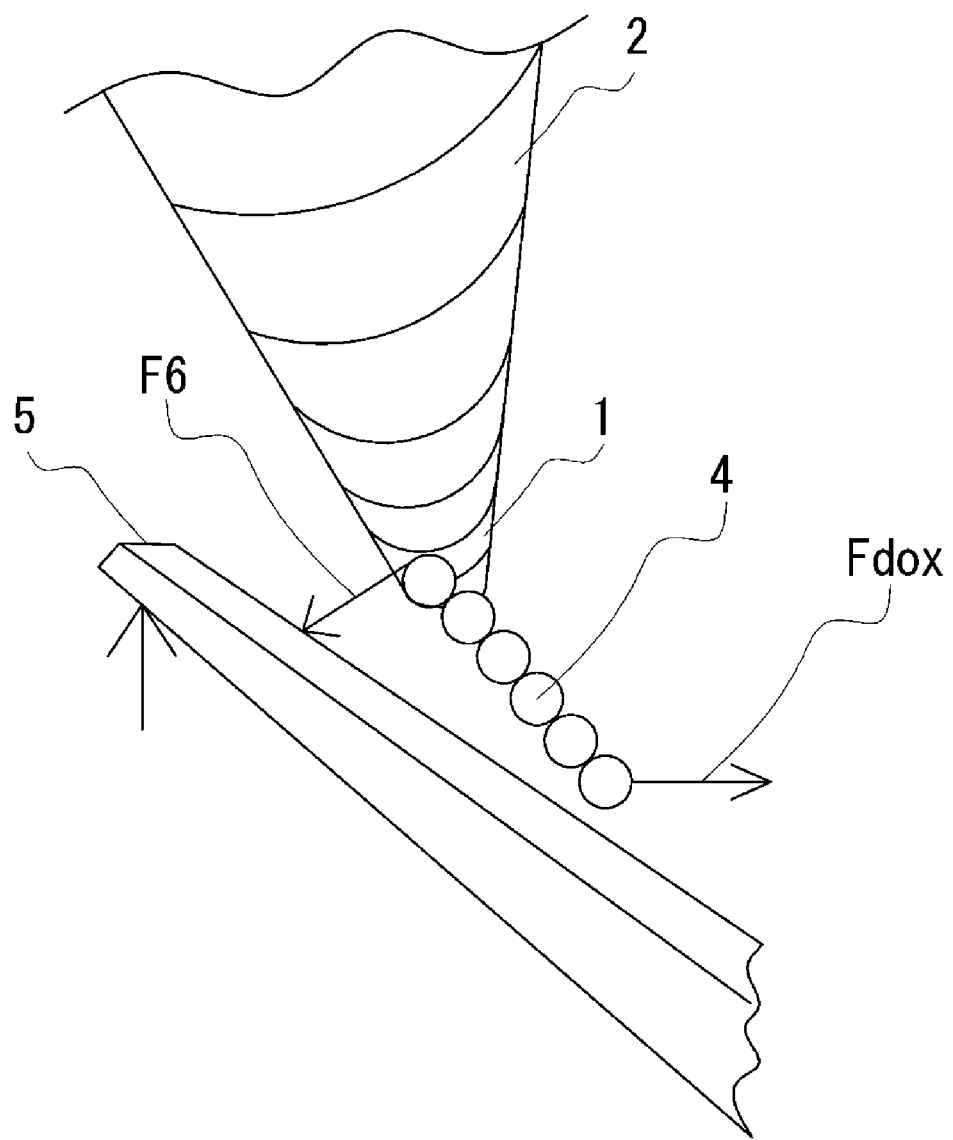
FIG. 12 is a diagram showing a state where the second embodiment of the present invention is viewed obliquely upward from a bottom surface of the column member.
Figure 13:
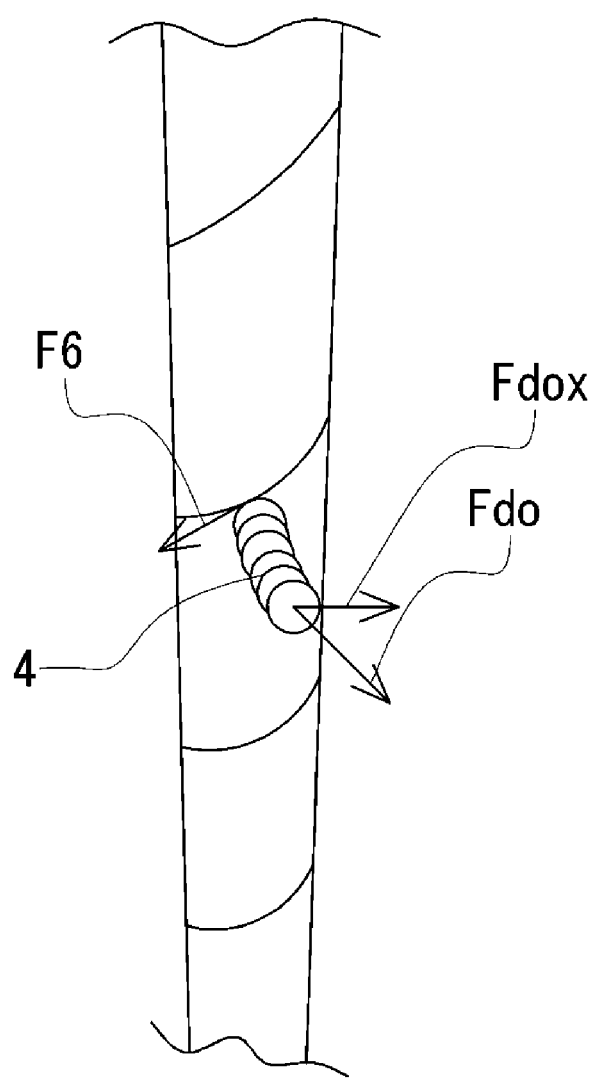
FIG. 13 is a diagram showing a state where the second embodiment of the present invention is viewed upward from a bottom surface of the column member.

Next, a second embodiment of the present invention shall be described. In the description that follows, members redundant with the contents already described with the first embodiment are provided with the same symbols and detailed description thereof shall be omitted except when necessary. FIG. 10A is a schematic view of a rotating mechanism B in side view. Also, FIG. 11 is a schematic view of the rotating mechanism B in plan view. Also, FIG. 12 is a schematic view of viewing an end point side from a start point side at a lower portion of a column member. Further, FIG. 13 is a schematic view of the rotating mechanism B in bottom view.

The rotating mechanism B that is the second embodiment of the present invention has the rail 1 of thin plate shape, the column member 2 of circular columnar shape, and the moving body 4 constituted of a plurality of spherical magnets (see FIG. 10A). Also, the magnet body 5 is disposed at the lower side with respect to the rail 1 and the column member 2. The second embodiment of the present invention is characterized in that the axial center of the rail 1 is disposed substantially parallel to the horizontal direction.

That is, the present invention includes not only an arrangement where the axial center of the rail 1 is tilted slightly from the vertical direction as in the first embodiment described above but also includes an arrangement where the axial center of the rail 1 is disposed substantially parallel to the horizontal direction.

Furthermore, in the description related to the rotating mechanism B, on the basis of FIG. 10A, a right side of the sheet shall be referred to as the "start point" and a left side of the sheet shall be referred to as the "end point." Also, on the basis of FIG. 10A, an upper side of the sheet shall be referred to as the "top or upper side" and a lower side of the sheet shall be referred to as the "bottom or lower side." Also, on the basis of FIG. 11, a right side of the sheet shall be referred to as the "right or right side" and a left side of the sheet shall be referred to as the "left or left side."

Also, an upper side of the sheet in FIG. 11 corresponds to the "end point" shown in FIG. 10A and a lower side of the sheet in FIG. 11 corresponds to the "start point" shown in FIG. 10A. Also, a front side of the sheet in FIG. 11 corresponds to the "top or upper side" shown in FIG. 10A and an inner side of the sheet in FIG. 11 corresponds to the "bottom or lower side" shown in FIG. 10A. Further, respective directions in FIG. 12 and FIG. 13 shall be referred to in accordance with FIG. 10A and FIG. 11.

In the rotating mechanism B, the rail 1 of thin plate shape formed of a ferromagnetic metal is arranged by winding along an outer peripheral surface of the column member 2. Also, the rail 1 and the column member 2 are arranged to be rotatable in one direction or another direction with an unillustrated rotating shaft as an axis.

Also, in regard to the direction in which the rail 1 rotates, the rotation in FIG. 10A of the direction by which the rail 1 moves from the upper side of the sheet to the lower side of the sheet of FIG. 10A (rotation in the one direction) shall be referred to as the "rotation in the ideal direction."

Also, the moving body 4 is constituted of a plurality of spherical magnets and the tip end of the moving body 4, that is, the side attached to the outer peripheral surface of the rail 1 has an N pole. Also, the terminal end of the moving body 4 has an S pole.

In more detail, with each of the individual spherical magnets that constitute the moving body 4, an upper side is an N pole and the lower side is an S pole, and by these being adhered above and below to each other via magnetic forces, the moving body 4 is formed.

Also, the magnet body 5 is formed to a columnar body and an upper surface thereof (surface opposing the rail 1) has an S pole. Also, a lower surface of the magnet body 5 (surface opposite to the surface opposing the rail 1) has an N pole.

Also, the magnet body 5 is disposed with its orientation in the length direction being tilted in an up/down direction and a right/left direction with respect to the axial centers of the rail 1 and the column member 2. In more detail, in the up/down direction, the orientation is such that the end point side of the magnet body 5 moves closer to the rail 1 and the start point side of the magnet body 5 moves away from the rail 1 (see FIG. 10A). Also, in the right/left direction, the magnet body 5 is tilted such as to be in orientation where the end point side of the magnet body 5 is positioned at a left side of the rail 1 and the start point side of the magnet body 5 is positioned at a right side of the rail 1 (see FIG. 11).

Movement of the moving body 4 along the rail 1 and a motion of the rail 1 rotating in the rotating mechanism B shall now be described. The tip end (N pole) of the moving body 4 is attached via a magnetic force to the rail 1 and by an attachment force of this tip end to the rail 1, the moving body 4 is arranged to move from the start point side to the end point side along the inclination direction of the rail 1 that rotates.

Also, a repulsive force Fd0 from the upper surface (S pole) of the magnet body 5 acts on the terminal end (S pole) of the moving body 4 and the terminal end of the moving body 4 is pushed to a right and start point side (see FIG. 13). Also, from this repulsive force Fd0, Fd0$x$ resulting from decomposition in a tangential direction (right side direction) of the rail 1 is generated (see FIG. 12 and FIG. 13).

This Fd0$x$ is a force that rotates the rail 1 in the ideal direction (force by which the moving body 4 rotates in the ideal direction together with the rail 1). The force Fd0$x$ is thus a force that generates the ideal rotation operation described above.

Also, an attractive force F6 from the upper surface (S) pole of the magnet body acts on the tip end (N pole) of the moving body 4 and the tip end of the moving body 4 is attracted to a left and endpoint side (see FIG. 12 and FIG. 13). Also, this attractive force F6 is a force that moves the moving body 4 along the inclination direction of the rail 1. The force F6 is thus a force that generates the rail traveling operation described above.

That is, in the second embodiment, a magnetic force generated from the magnet body 5 drives away the terminal end of the moving body 4 as the repulsive force Fd0, and the force Fd0$x$ resulting from decomposing this Fd0 in the tangential direction of the rail 1 rotates the rail 1 slightly in the ideal direction.

Also, when the rail 1 rotates slightly in the ideal direction, a magnetic force generated from the magnet body 5 attracts the tip end of the moving body 4 by the attractive force F6 and the attractive force F6 moves the moving body 4 slightly along the inclination direction of the rail 1. This rotation of the rail 1 and the movement of the moving body 4 along the inclination direction of the rail 1 are repeated and the rail 1 rotates based on a force received from the moving body 4.

Thus, in the second embodiment, the rail 1 can be rotated by a magnetic force of the magnet body 5 being exerted on the moving body 4 attached such as to be movable along the rail 1. In this second embodiment, unlike in the first embodiment, a magnetic force of the magnet body 5 is mainly responsible for the rail traveling operation of moving the moving body 4 along the inclination direction of the rail 1.

Even with a mode like the second embodiment such as described above where the axial center of the rail 1 is disposed substantially parallel to the horizontal direction, the rail 1 can be rotated to obtain a rotational kinetic energy from the rail 1 by the magnetic forces of the magnet body 5 being exerted on the rail 1 and the moving body 4. Also, the moving body 4 moves toward the end point side of the rail 1 along the inclination direction of the rail 1 that rotates.

Here, even in the second embodiment, as long as it is possible to rotate the rail 1, the magnetic forces, shape, disposed position, and orientation of the magnet that constitutes the magnet body 5 are not limited in particular.

Also, for example, from a standpoint of improving the efficiency of the rotation of the rail 1, it is also possible to provide a plurality of magnet bodies 5 to adjust the strengths of the magnetic forces exerted on the tip end and the terminal end of the moving body 4. For example, in the second embodiment described above, by providing, apart from the magnet body 5, a magnet body that exerts an attractive force on the terminal end of the moving body 4 to attract it, a force that further assists the force Fd0$x$ that rotates the rail 1 in the ideal direction can also be applied. Such a mode where a plurality of magnet bodies are disposed such that magnetic forces act effectively on the tip end or the terminal end of the moving body 4 can also be adopted.

Furthermore, even in a mode where the axial centers of the rail 1 and the column member 2 are tilted further (for example, with the end point side being directed upward and the start point side downward), the rail 1 can be rotated by the magnetic forces of the magnet body 5 being exerted on the rail 1 and the moving body 4 to repeat the ideal rotation operation and the rail traveling operation as in the second embodiment. An example is a structure where an angle formed by the axial centers of the rail 1 and the column member 2 and the vertical direction is 100 degrees as shown in FIG. 10B.

Figure 10B:
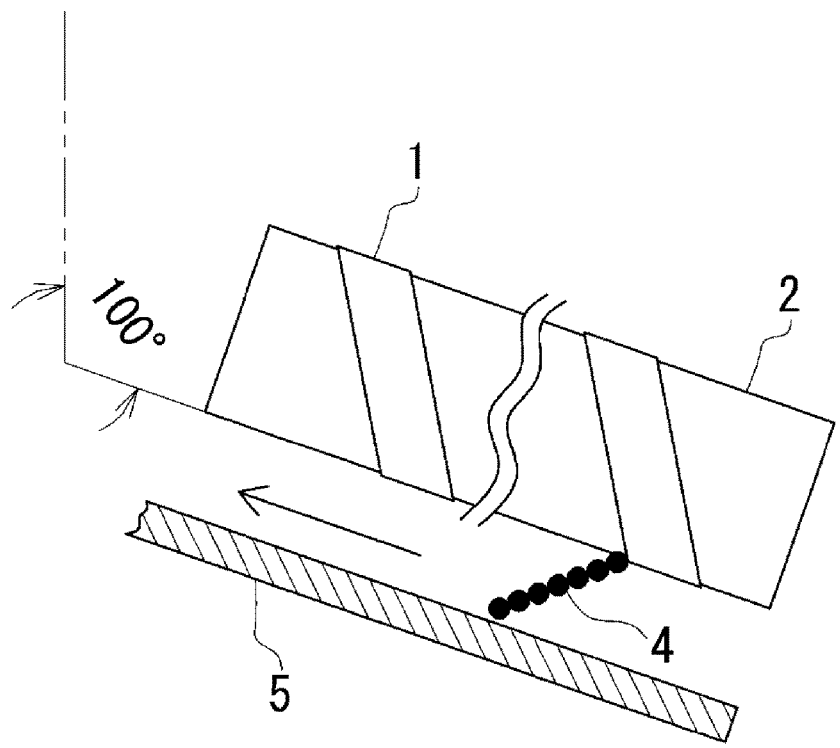

Even with the rail 1 shown in FIG. 10B, as in the second embodiment, the magnetic forces of the magnet body 5 are exerted on the tip end and the terminal end of the moving body 4 to make the moving body 4 climb and move to the end point side along the inclination direction of the rail 1 while the rail 1 is rotated.

Figure 14A:
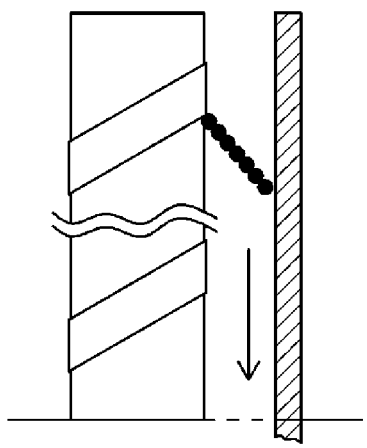
FIG. 14 shows diagrams showing an example of variations of inclination of the rail and the column member.
Figure 14B:
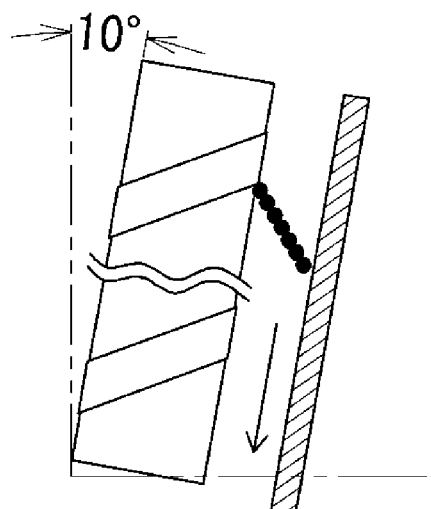
Figure 14C:
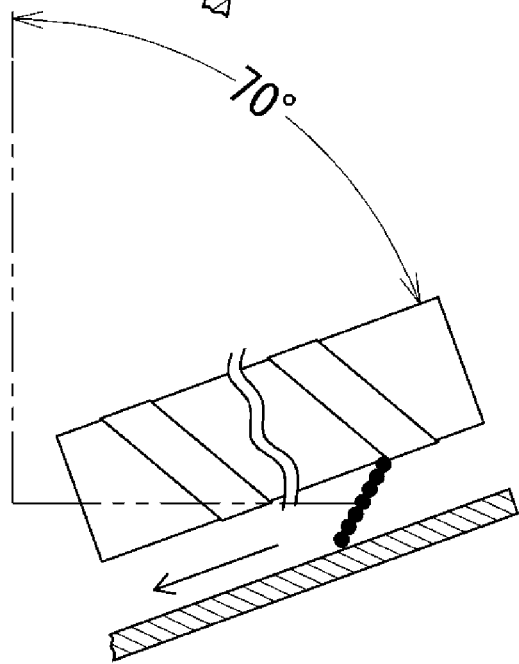

The first embodiment and the second embodiment described up to now are each but an example of the present invention. With the angle formed by the axial centers of the rail 1 and the column member 2 and the vertical direction, various ranges such as 0 degree (FIG. 14A), 10 degrees (FIG. 14B), and 70 degrees (FIG. 14C) can be set.

Also, for example, with a structure where the angle formed by the axial centers of the rail 1 and the column member 2 and the vertical direction is 90 degrees, a structure can be arranged where two rotating mechanisms each with the rail 1 and the column member 2 are juxtaposed and end portions of the rails 1 are connected to each other to perform a reciprocation between the two rotating mechanisms. Further, a structure can be arranged where rotating mechanisms are disposed in a rectangular shape with four sides being constituted thereof and a moving body is made to circulate among the four rotating mechanisms. Even further, it is also possible to dispose a necessary number of rotating mechanisms to arrange various shapes in plan view (including, for example, polygonal, circular, and elliptical shapes). That is, it suffices that it is possible for the moving body 4 to cycle to rotate the rail 1 via the plurality of rotating mechanisms.

Third Embodiment

Although with the description up to now, the motion of rotating the rail 1 with magnetic forces being exerted on the moving body 4 was described with the structure body with one rail 1 and one column member 2, in the following description, a mode where the rotational motion of the rail 1 is performed continuously by making the moving body 4 cycle shall be described. Also, since the basic motion of rotating the rail 1 is the same, points related to the cycling of the moving body 4 shall mainly be described below.

Figure 15:
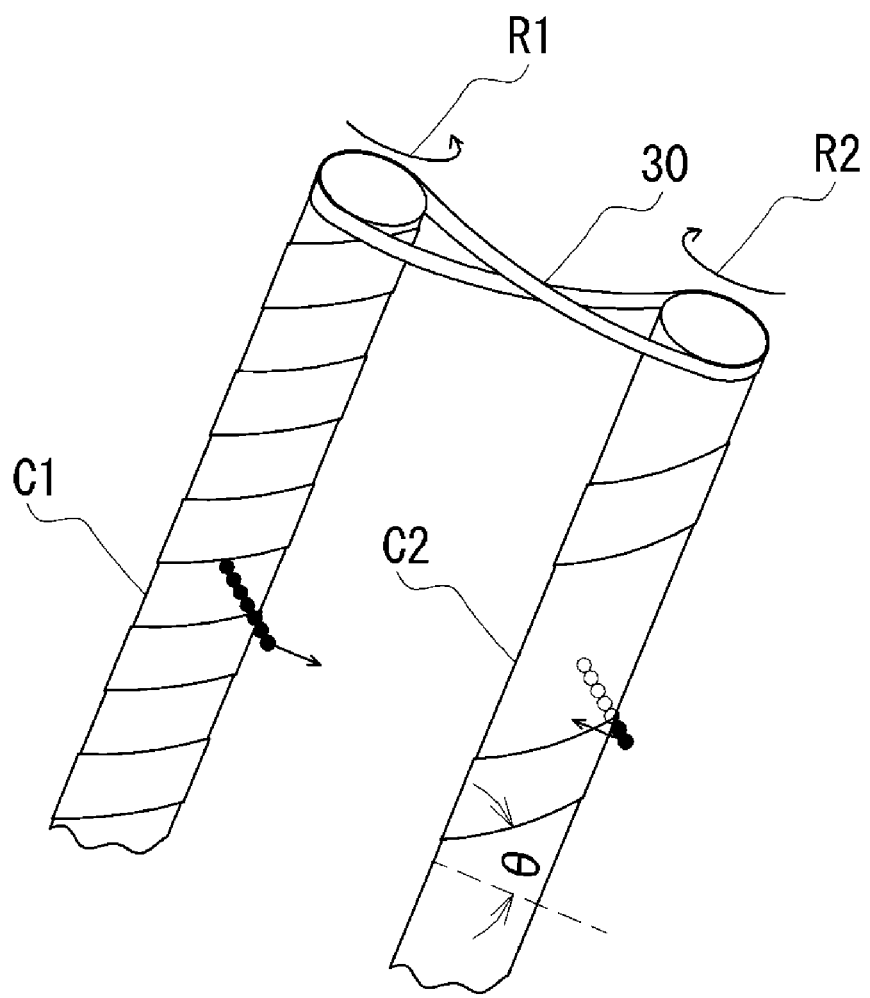
FIG. 15 is a schematic view showing a third embodiment of the present invention.

As a structure that makes the moving body 4 cycle, a third embodiment is indicated. As shown in FIG. 15, the third embodiment is arranged from the two rotating mechanisms of a rotating mechanism C1 for descending in which the moving body 4 moves from an upper side to a lower side and a rotating mechanism C2 for ascending in which the moving body 4, upon moving from the rotating mechanism C1, moves from a lower side to an upper side (see FIG. 15).

The rotating mechanism C1 is made based on the first embodiment (rotating mechanism A) described above and, also, the rotating mechanism C2 is made based on the second embodiment (rotating mechanism B) and each is arranged such that by a magnet body (not shown) exerting magnetic forces on the moving body 4, each rail 1 rotates while the moving body 4 moves along the rail 1.

That is, in the rotating mechanism C1, by using the magnetic forces exerted on the moving body 4 from the magnet body and the gravitational force applied to the moving body 4, the moving body 4 moves to the lower side while the rail 1 is rotated. Also, in the rotating mechanism. C2, by using the magnetic forces exerted on the moving body 4 from the magnet body, the moving body 4 moves to the upper side while the rail 1 is rotated.

Furthermore, regions in the rotating mechanism C2 at which the moving body 4 receives the magnetic forces from the magnet body as stated here correspond to an example of a third region and a fourth region in the claims of the present application. Also, depending on the magnetic forces of the magnet body, for example, there is a case where the third region is the tip end of the moving body 4 and the fourth region is the terminal end of the moving body 4 as well as a case where the third region is the terminal end of the moving body 4 and the fourth region is the tip end of the moving body 4. Further, depending on the shape of the moving body 4, the shape of the rail 1, the disposition of the magnet portion belonging to the moving body 4, the shape and disposition of the magnet body, etc., there are cases where the third region and the fourth region are portions different from the tip end and the terminal end of the moving body 4 and the present invention also includes these different modes as variations of the invention.

Also, the rail 1 of the rotating mechanism C1 rotates with a direction indicated by a symbol R1 as the ideal direction. Also, the rail 1 of the rotating mechanism C2 rotates with a direction indicated by a symbol R2 as the ideal direction. Also, the rotation of the rail 1 of the rotating mechanism C1 is transmitted via a timing belt 30 to the rotating mechanism C2 and the motion of rotating the rail 1 in the ideal direction with the magnetic forces of the magnet body being received by the moving body 4 is assisted.

Here, it is not required for the structure to be one where the rotations of the rotating mechanism C1 and the rotating mechanism C2 are linked via the timing belt 30. The rotations of the rotating mechanism C1 and the rotating mechanism C2 can be linked, for example, by combining members such as known gears and gearwheels, etc., that are capable of transmitting a rotating force.

Also, it is not necessarily required for the rotations of the rotating mechanism C1 and the rotating mechanism C2 to be linked and as long as an arrangement is made to enable the moving body 4 to move between the two, the rotations of the rotating mechanism C1 and the rotating mechanism C2 may be arranged to rotate respectively independently. However, by linking the rotations of the two rotating mechanisms, a rotational kinetic energy is obtained efficiently and the cycling of the moving body 4 is also made smooth, and therefore it is preferable for the rotations of the rotating mechanism C1 and the rotating mechanism C2 to be linked.

Also, the rail 1 of the rotating mechanism C1 and the rail 1 of the rotating mechanism C2 are arranged to enable movement of the moving body 4 by the upper ends being connected to each other and the lower ends being connected to each other.

For example, an inclination from the lower end of the rail 1 of the rotating mechanism C1 to the lower end of the rail 1 of the rotating mechanism C2 is provided and the moving body 4 that reaches the lower end of the rotating mechanism C1 uses the kinetic energy generated up to then to move down the inclination and move to the lower end of the rail 1 of the rotating mechanism C2.

Similarly, an inclination from the upper end of the rail 1 of the rotating mechanism C2 to the upper end of the rail 1 of the rotating mechanism C1 is provided and the moving body 4 that reaches the upper end of the rotating mechanism C2 uses the kinetic energy generated up to then to move down the inclination and move to the upper end of the rail 1 of the rotating mechanism C1. By arranging such a structure, the moving body 4 is enabled to move between the rails of the rotating mechanism C1 and the rotating mechanism C2.

Here, it is not necessarily required to connect the end portions of the two rotating mechanisms to each other by providing inclinations, and it suffices that the moving body 4 is enabled to move to an adjacent rotating mechanism by some means. For example, a structure with which the moving body 4 is conveyed by another driving force is also allowable.

Also, with the movement of the moving body 4 between the rotating mechanism C1 and the rotating mechanism C2 described above, a time during which a rotating force is not imparted to a rail arises when the moving body 4 passes a region between the rotating mechanisms. Therefore, by using a plurality of moving bodies 4 that are made to circulate among the rotating mechanisms, even when a state is entered where a force that a rail receives from one moving body 4 is missing, it is made possible to make a rotating mechanism rotate continuously using a force exerted on the rail from another moving body 4.

Figure 16A:
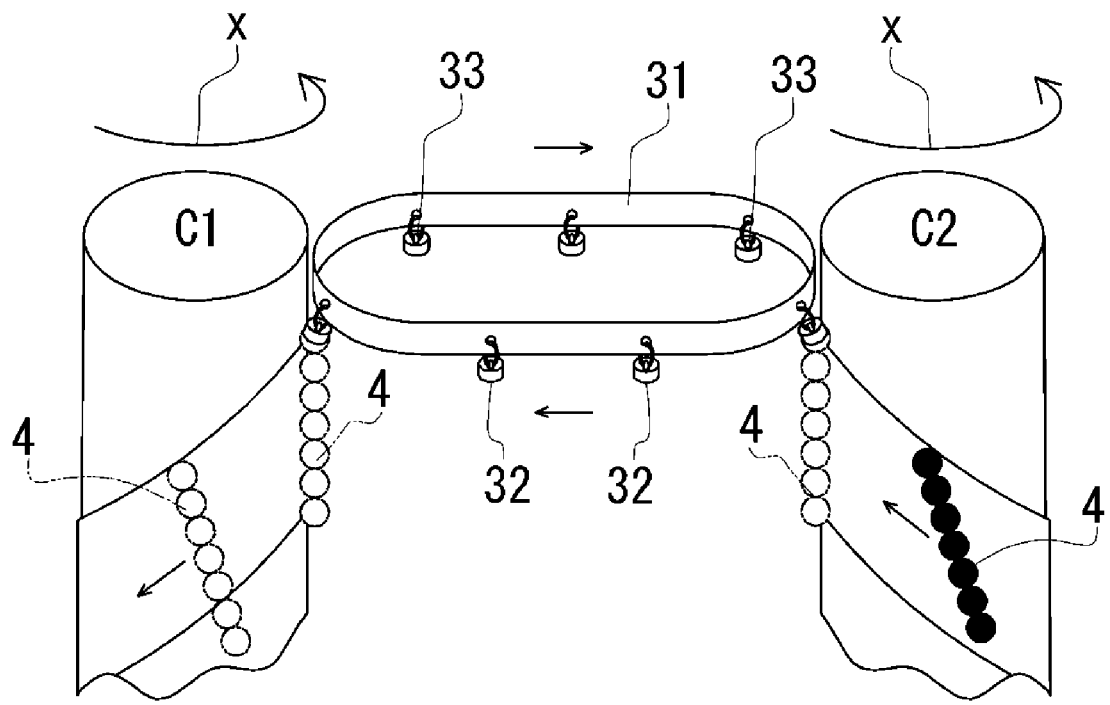
FIG. 16 shows diagrams of an example of a mechanism that moves the moving body between two rails.

Further, another example of a mechanism in which the moving body moves between the rails of two rotating mechanisms shall be described. The rotating mechanisms described here are rotating mechanisms different from the rotating mechanism C1 and the rotating mechanism C2 described above. For example, as shown in FIG. 16A, a conveying belt 31 that cycles between the rotating mechanism C1 and the rotating mechanism C2 is provided and conveying portions 33 each having a magnet body 32 are disposed at fixed intervals. The rotating mechanisms C1 and C2 rotate in a direction indicated by a symbol X.

The conveying belt 31 obtains power from a separate driving source and rotates in directions of arrows in the figure. Also, each conveying portion 33 provided on the conveying belt 31 holds the moving body 4 that has ascended along the rail 1 of the rotating mechanism C2 and conveys it to the rail 1 of the rotating mechanism C1. The moving body 4 conveyed to the rotating mechanism C1 is delivered to the rail 1 of the rotating mechanism C1 and made to enter the path of the rail 1.

In the present structure, by forming an upper portion side of the rail 1 of the rotating mechanism C2 from a thinner metal and forming an upper portion side of the rail 1 of the rotating mechanism C1 from a rather thick metal, etc., to provide differences in magnetic force, receiving and delivering of the moving body 4 at respective positions are enabled.

Figure 16B:
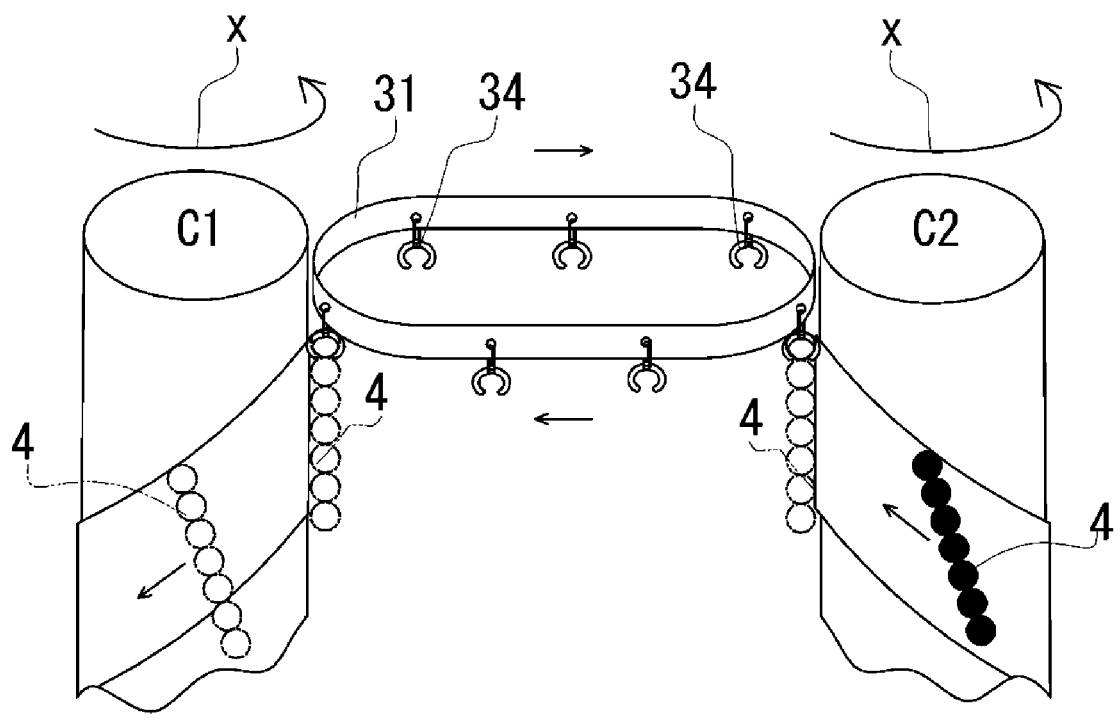

Also, as yet another example, a moving means for the moving body 4 at the upper ends of the respective rotating mechanisms may be of the structure shown in FIG. 16B. The structure shown in FIG. 16B differs in a method for holding the moving body 4 and holding arms 34 hold the moving body 4.

The moving body 4 that reaches the upper portion side of the rail 1 of the rotating mechanism C2 is held by a holding arm 34 being inserted in a constriction between magnets constituting the moving body 4. The holding arm 34 then conveys the moving body 4 to the rotating mechanism C1 in accompaniment with a movement of the conveying belt 31. The moving body 4 is again delivered to the rail 1 of the rotating mechanism C1 at the upper portion side of the rail 1 and made to enter the path of the rail 1. The moving body 4 can thus be moved by providing the conveying belt 31.

Also, besides the structure shown in FIG. 16A and FIG. 16B described above, for example, a structure where a height difference is provided between an upper portion of the rail 1 of the rotating mechanism C2 to which the moving body 4 ascends and an upper portion of the rail 1 of the rotating mechanism C1 and the two rails 1 are connected to each other by a rail can be adopted. With the present structure, by using the height difference, the moving body can descend the rail connecting the two rails to each other and the moving body 4 can be made to enter the upper portion side of the rail 1 of the rotating mechanism C1. The moving body 4 can thus be moved between two rotating mechanisms by various structures.

With this third embodiment, the rail 1 of each of the rotating mechanism C1 and the rotating mechanism C2 rotates in the ideal direction via the magnetic forces of the magnet body that are received by the moving body 4. Also, the moving body 4 moves from the upper side to the lower side in the rotating mechanism C1 and from the lower side to the upper side in the rotating mechanism C2 and moves between each of the rotating mechanisms. The respective rotating mechanisms can thus be made to rotate continuously.

Also, although with the third embodiment described above, a mode of using the magnetic forces in the "ascending" of the moving body was described, it is not necessarily required for the magnetic forces to be exerted on the moving body in the rotating mechanism responsible for the "ascending" of the moving body. For example, if in the rotating mechanism C1 described above, the force of rotation of its rail is strong, the moving body is enabled to move along the rotating mechanism C2 rotating in linkage thereto while ascending its rail without using a magnetic force.

Also, if in this case, the inclination angle of the rail of the rotating mechanism C2 is steep, there is a possibility that, on the rail of the rotating mechanism C2, the moving body will move down the rail due to the gravitational force applied to itself and it can thus be considered to provide a catching member for stopping this. The catching member is, for example, an elongate plate member, etc., disposed at a position in a vicinity of the rail but at which the rotation of the rotating mechanism C2 is not impaired. Further, if the inclination angle of the rail of the rotating mechanism C2 is gradual, the moving body can be made to move by ascending the rail of the rotating mechanism C2 without the catching member being provided and without a magnetic force being exerted thereon. Thus, a structure where a magnetic force is not used in the "ascending" of the moving body can also be adopted.

Fourth Embodiment

Figure 17A:
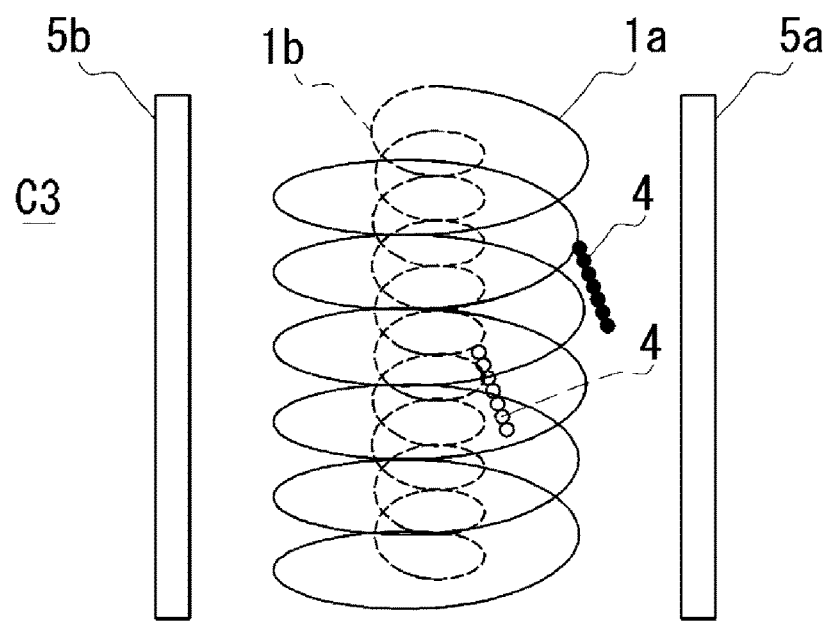
FIG. 17A is a schematic view showing a fourth embodiment of the present invention and FIG. 17B is a schematic view showing a fifth embodiment of the present invention.

As a structure that makes the moving body 4 cycle, a fourth embodiment is indicated. As shown in FIG. 17A, the fourth embodiment is a rotating mechanism C3 arranged from a rail 1a of large outer peripheral diameter and a rail 1b of small outer peripheral diameter disposed at an inner side thereof.

Also, the rail inclination direction of the rail 1a and the rail inclination direction of the rail 1b are arranged to be opposite directions. In more detail, as viewed in FIG. 17A, the rail 1a has the rail inclination direction that descends from an upper right side to a lower left side and the rail 1b has the rail inclination direction that descends from an upper left side to a lower right side.

The rotating mechanism C3 has a structure where the rail 1a and the rail 1b have the lower ends thereof connected to each other and the upper ends thereof connected to each other and rotate in the same ideal direction as a whole. Also, the moving body 4 moves from an upper side to a lower side via the rail 1a. Also, the moving body moves from the lower side to the upper side via the rail 1b.

Also, the rotating mechanism C3 has a magnet body 5a that exerts magnetic forces on the moving body positioned on the rail 1a and a magnet body 5b that exerts magnetic forces on the moving body positioned on the rail 1b. The respective magnet bodies exert the magnetic forces on the moving body and the rails 1 rotate in the ideal direction and the moving body moves along the rails 1 based on these magnetic forces.

A rail for descending and a rail for ascending can thus be arranged as an integral structure as in this fourth embodiment. Further, although with the fourth embodiment, description of the moving body is omitted, it is possible for a plurality of moving bodies to be disposed and cycled as in the embodiments up to now. With such a fourth embodiment, the rails can be arranged integrally and the structure can be made compact.

Also, it is not necessarily required to provide the two magnet bodies of the magnet body 5a and magnet body 5b as in the rotating mechanism C3 and as long as the rotating forces of the rail 1a and the rail 1b are strong and the moving body can cycle among the respective rails, it is also possible to omit one of either of the magnet bodies.

Fifth Embodiment

Figure 17B:
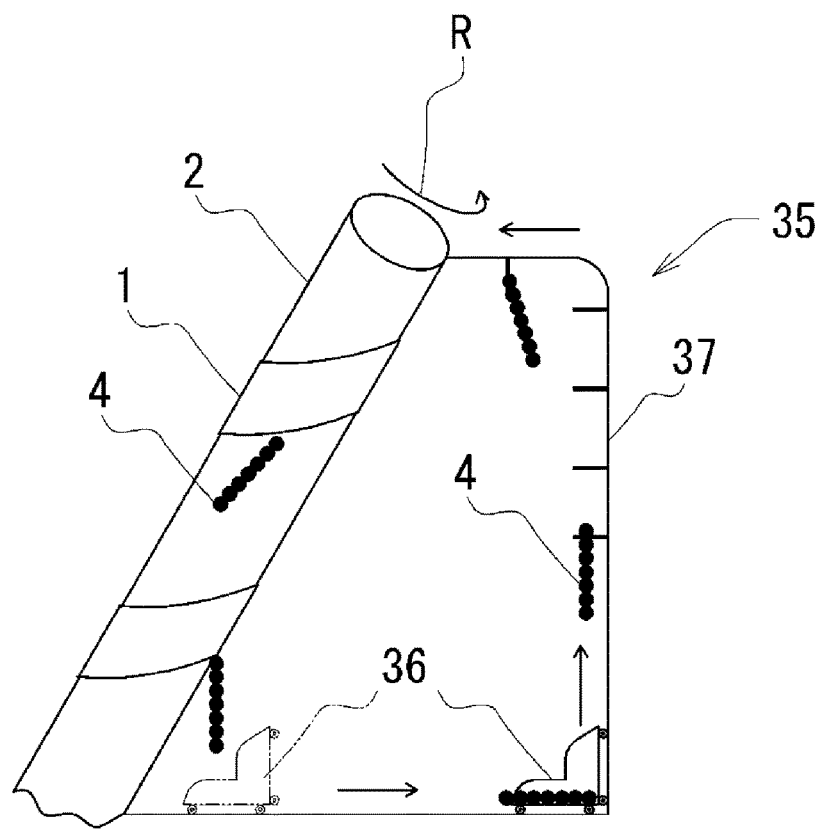

Further, as a structure that makes the moving body 4 cycle, a fifth embodiment is indicated. As shown in FIG. 17B, the fifth embodiment has a conveying mechanism 35 provided at a side of the column member 2 with the rail 1 wound around it. The moving bodies 4 receive magnetic forces of a magnet body (not shown) to rotate the rail 1 in the ideal direction R.

The conveying mechanism 35 has conveying bodies 36 and an ascending crane 37. The conveying bodies 36 and the ascending crane 37 convey the moving bodies 4 from the lower end of the rail 1 again to the upper end of the rail 1 both via an unillustrated driving force. A mode with which the moving bodies 4 are made to enter the upper end of the rail 1 again via a separate driving force can thus be considered as well.

Although this fifth embodiment is arranged as the mode where the moving bodies 4 are cycled via the separate driving source, even with such a structure, a rotational kinetic energy of the rail 1 can be extracted. Also, by forming the moving bodies 4 from light members, an energy consumed by the conveying mechanism 35 can be lessened to improve an overall energy efficiency.

Also, in regard to the fifth embodiment, a structure with which the plurality of moving bodies 4 are coupled by a rope shaped member in place of the conveying mechanism 35 can also be considered. By thus coupling the plurality of moving bodies 4 with the rope shaped member, a moving body descending along the rail 1 can be made responsible for a motion of making a moving body 4 that has arrived at the lower end of the rail 1 ascend. Thus, the moving bodies 4 can be cycled without using the conveying mechanism 35.

Sixth Embodiment

Next, a sixth embodiment of the present invention shall be described. Unlike the structures described up to now, the sixth embodiment differs largely in the point that the rail 1 is formed not to a helical shape but to an annular shape. The details shall now be described.

Figure 19A:
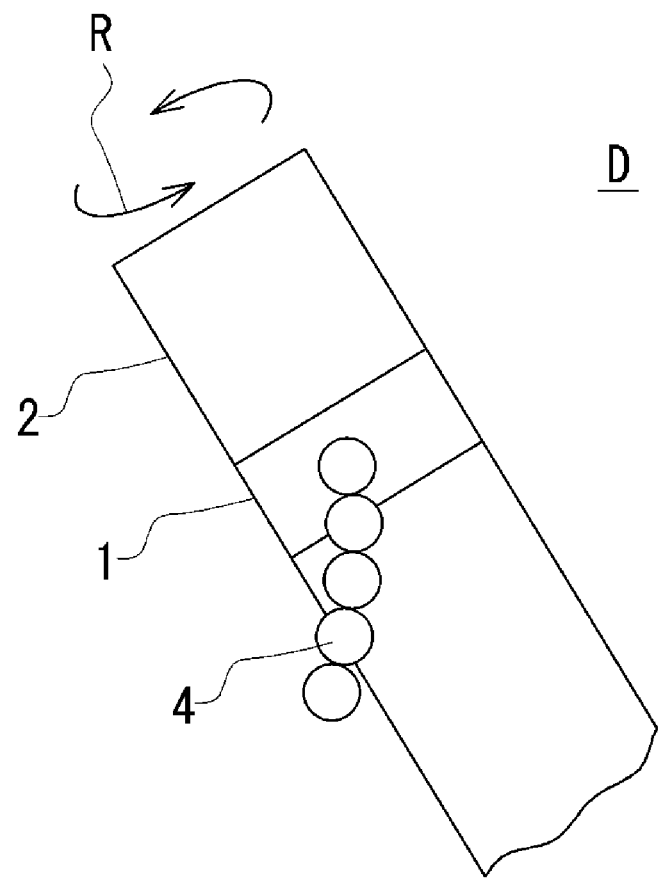
FIG. 19 shows diagrams showing a sixth embodiment of the present invention.

As shown in FIG. 19A, a rotating mechanism D that is the sixth embodiment of the present invention is arranged with the rail 1 that is a thin plate of annular shape being wound around the column member 2 of circular columnar shape. The rail 1 is formed of a metal and the moving body 4 that is constituted of a magnet can be attached thereto.

Also, the rail 1 and the column member 2 are arranged to be rotatable in just the ideal direction R and rotation in a direction reverse to the ideal direction is restricted. Also, a magnet body that exerts magnetic forces on the moving body 4 attached to the column member 2 is disposed (see FIG. 20).

That is, with the rotating mechanism D, although the moving body 4 receives the magnetic forces from the magnet body to rotate the rail 1 in the ideal direction, since the rail 1 does not rotate in the reverse direction, the movement of the moving body 4 along the rail 1 (movement from the upper right toward the lower left as viewed in FIG. 19A) and the rotation of the rail 1 in the ideal direction can be performed repeatedly.

Here, it is not necessarily required for the structure to be one where the rotation of the rail 1 and the column member 2 in the direction reverse to the ideal direction is restricted. It suffices that arrangements are made such that the moving body 4 can move easily toward the lower side in the inclination direction of the rail 1 and the rail 1 and the moving body 4 move integrally when the moving body 4 rotates in the ideal direction of the rail 1.

Figure 19B:
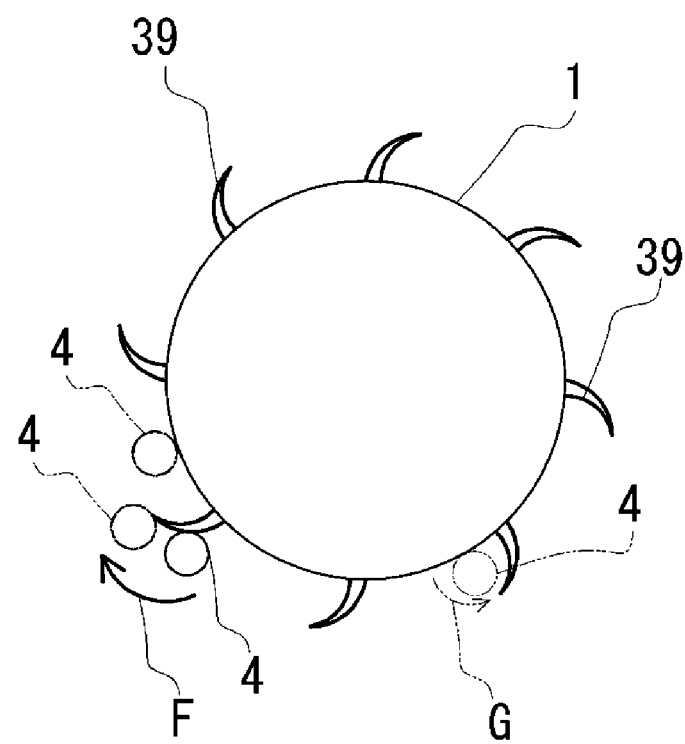

For example, a structure where wave shaped portions 39 that are inclined in one direction are provided on the rail 1 as shown in FIG. 19B can also be considered. With this rail 1, the moving bodies 4 are enabled to surmount the wave shaped portions 39 and move smoothly in a direction indicated by a symbol F. On the other hand, when the moving bodies 4 are about to move in a direction indicated by a symbol G, the movement is hindered by curved surfaces of the wave shaped portions 39. Consequently, the moving bodies 4 are arranged such that, in the direction indicated by the symbol G, movement by just the moving bodies 4 cannot be performed and integral movement (rotation) with the rail 1 is performed when magnetic forces are exerted on the moving bodies 4.

Also, in a case where the moving body is the car type moving body 41 described above (see FIG. 4A), a structure where the tires 41a thereof do not rotate in the ideal direction but rotate in the direction reverse to the ideal direction can also be considered. By arranging thus, the moving body 41 is made to move just in the inclination direction of the rail 1 and to easily move integrally with the rail 1 without the tires 41a rotating when the motion of rotating the rail 1 in the ideal direction is performed. Structures such as the above can be considered and a plurality of the above contents can be combined to improve the efficiency of the rotation of the rail 1 even further. Yet further, in a case where the car type moving body 41 is arranged to rotate just in the direction reverse to the ideal direction, an arrangement where the rail 1 rotates freely in both the ideal direction and the direction reverse thereto may be adopted.

Ways in which forces are applied in the sixth embodiment shall now be described further.

Figure 20A:
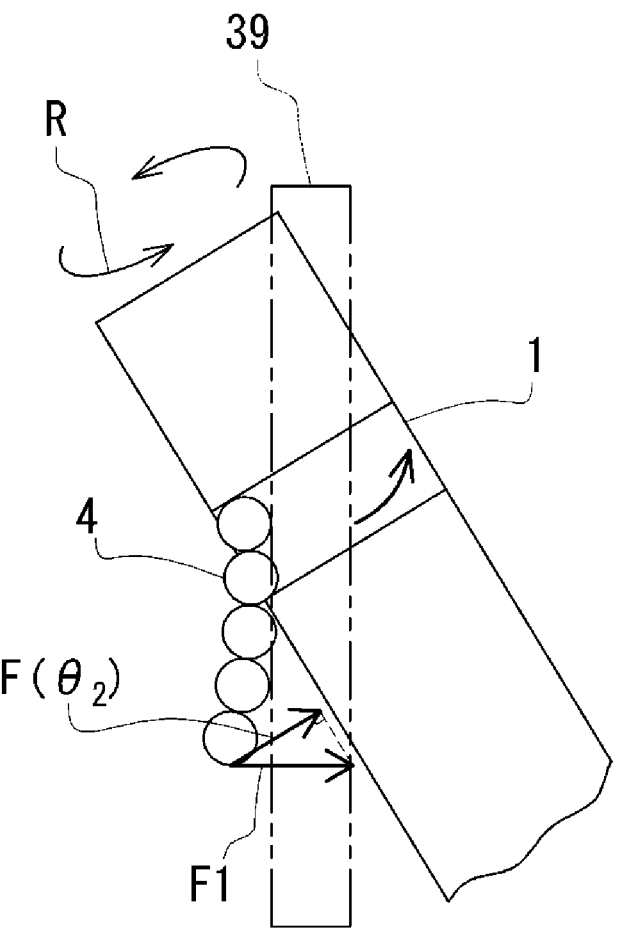
FIG. 20 shows conceptual diagrams showing forces acting on a terminal end of a moving body in the sixth embodiment.

The magnet body 5 is disposed slightly separated from the column member 2 (see FIG. 20A). An attractive force Fd from the magnet body 5 is exerted on the terminal end of the moving body 4 and a force F1 is generated based on this attractive force Fd.

Figure 20B:
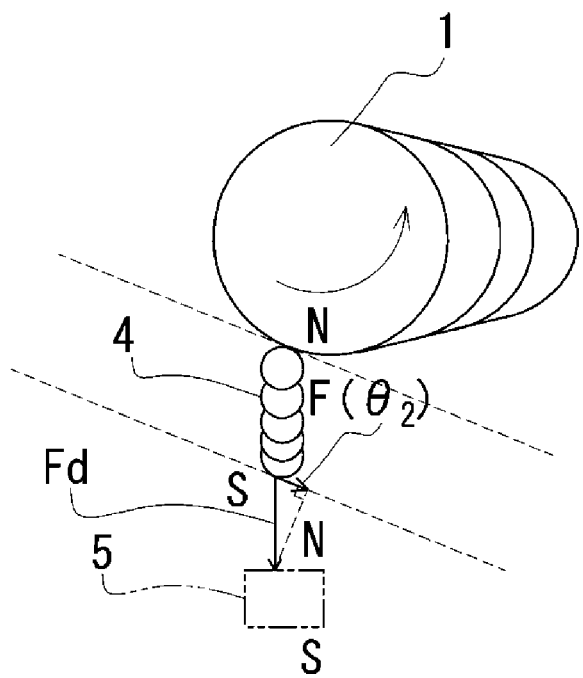

Also, a force $F(\theta 2)$ along the inclination direction of the rail 1 is generated from the force F1 applied to the terminal end of the moving body 4 and this acts as the force that rotates the rail 1 in the ideal direction (see FIG. 20A and FIG. 20B).

Figure 21:
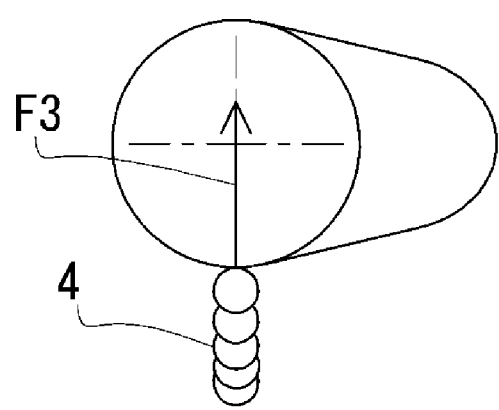
FIG. 21 is a conceptual diagram showing a force acting on a tip end of the moving body in the sixth embodiment.
Figure 22A:
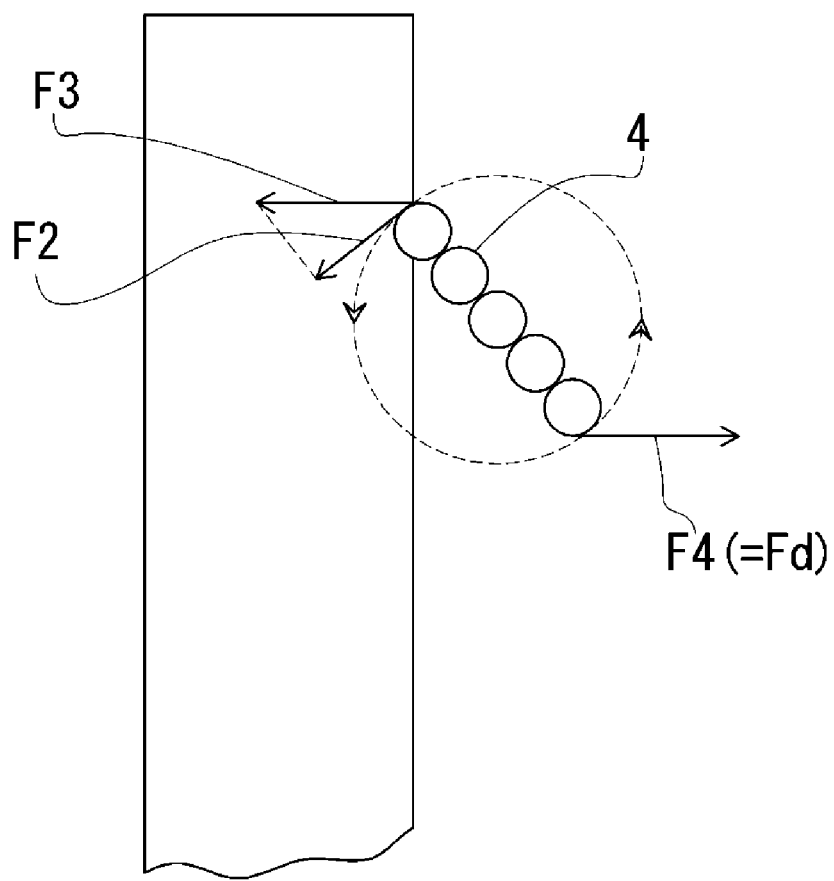
FIG. 22 shows conceptual diagrams showing forces acting on the tip end and the terminal end of the moving body in the sixth embodiment.

Also, a repulsive force F3 from the magnet body 5 acts on the tip end of the moving body 4 (see FIG. 21 and FIG. 22A) and an attractive force F4 (Fd) acts on the terminal end of the moving body 4. Also, a force F2 along the inclination direction of the rail 1 is generated from the repulsive force F3 acting on the tip end of the moving body 4 (see FIG. 22A).

Figure 22B:
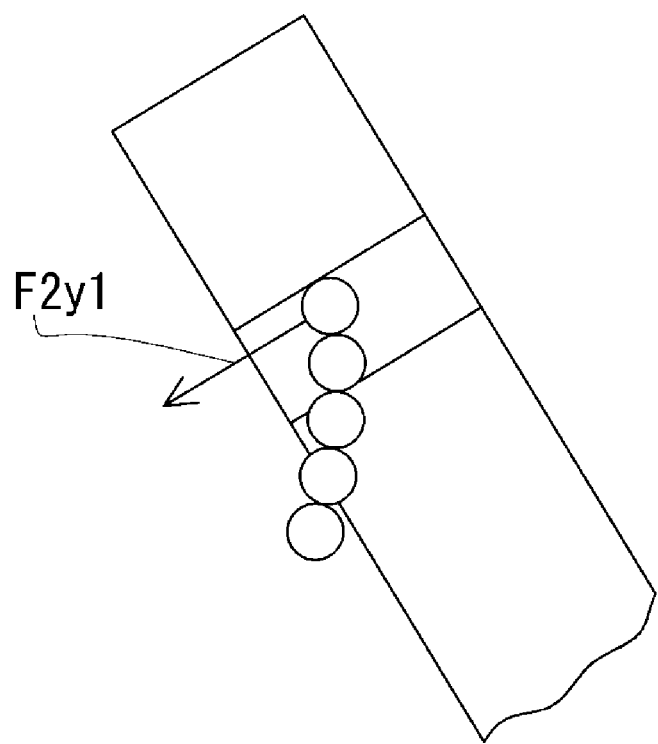

A component force $F2y1$ of this force F2 (see FIG. 22B) is a force that tends to move the moving body 4 toward the lower side in the inclination direction of the rail 1. The moving body 4 moves slightly to the lower side in the inclination direction of the rail 1 with the acting of the force $F2y1$. Thereafter, the abovementioned force $F(\theta 2)$ becomes strong again and the rail 1 and the moving body 4 rotate integrally in the ideal direction. By repetition of these motions, the rail 1 of annular shape rotates and a rotational kinetic energy can be obtained therefrom.

Figure 23A:
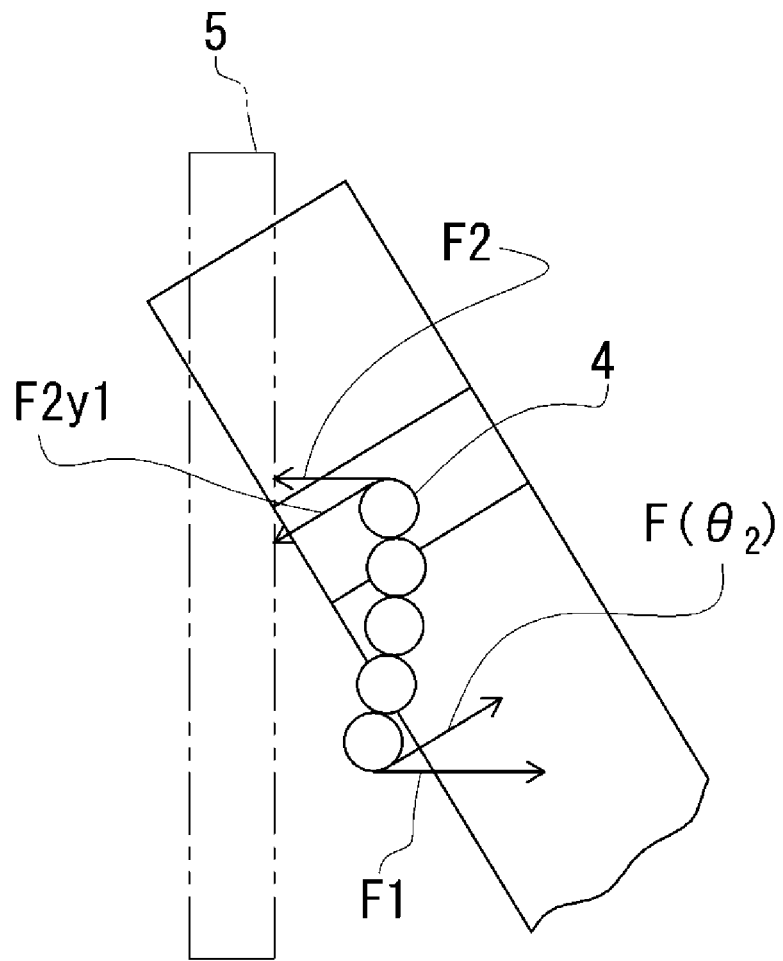
FIG. 23 shows conceptual diagrams showing forces when a repulsive force is applied to the terminal end of the moving body.
Figure 23B:
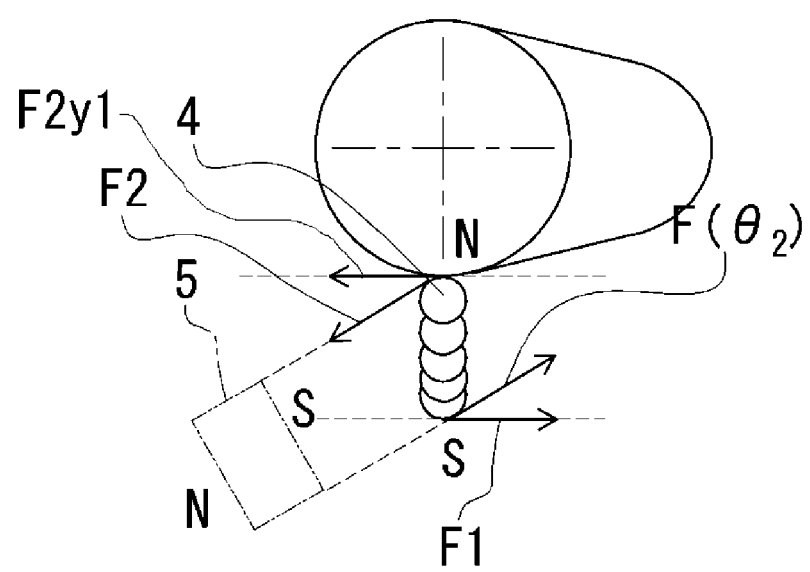

Also, even in the sixth embodiment, the rail 1 can be rotated by exertion of a repulsive force on the terminal end of the moving body 4. The magnet body 5 is disposed as shown in FIG. 23 to apply a repulsive force F1 to the terminal end of the moving body 4. A component force $F(\theta 2)$ is generated from this repulsive force F1 and this force $F(\theta 2)$ acts as a force that rotates the rail 1 in the ideal direction.

Also, an attractive force F2 of the magnet body 5 acts on the tip end of the moving body 4. A force $F2y1$ that tends to move the moving body 4 toward the lower side in the inclination direction of the rail 1 is generated from the force F2. The rail 1 of annular shape can thus be rotated even with the arrangement in which the magnet body 5 exerts a repulsive force on the terminal end of the moving body 4.

Here, although with the sixth embodiment described above, a structure with which magnetic forces are exerted on the moving body 4 to rotate the rail 1 was described, a structure with which, in place of magnetic forces, elastic forces are imparted on the moving body 4 to rotate the rail 1 can also be adopted.

In this case, the terminal end of the moving body 4 is pulled by an elastic member such as a spring member, etc., to exert a tensile force Fd. A force $F(\theta 2)$ is generated based on this tensile force Fd (see FIG. 20B). Also, the tip end of the moving body 4 is pulled by an elastic member such as a spring member, etc., as well, and from a tensile force F3 thereof, a force F2 along the inclination direction of the rail 1 is generated (see FIG. 22A).

A component force $F2y1$ of this force F2 (see FIG. 22B) is a force that tends to move the moving body 4 toward the lower side in the inclination direction of the rail 1. The moving body 4 moves slightly to the lower side in the inclination direction of the rail 1 with the acting of the force $F2y1$. Thereafter, the abovementioned force $F(\theta 2)$ becomes strong again and the rail 1 and the moving body 4 rotate integrally in the ideal direction. By repetition of these motions, the rail 1 of annular shape rotates and a rotational kinetic energy can be obtained therefrom.

Thus, it is also possible in the sixth embodiment to impart elastic forces in place of magnetic forces on the moving body 4 to rotate the rail 1. Also, a structure where, in addition to the magnetic forces in the sixth embodiment, elastic forces of spring members, etc., are added further to rotate the rail 1 even more powerfully can also be adopted.

Seventh Embodiment

A seventh embodiment of the present invention shall now be described. The seventh embodiment of the present invention is of a structure where, in regard to the column member 2 on which the rail 1 of annular shape indicated in the sixth embodiment is provided, the axial centers of the rail 1 and the column member 2 are disposed in substantially horizontal orientations.

Figure 24A:
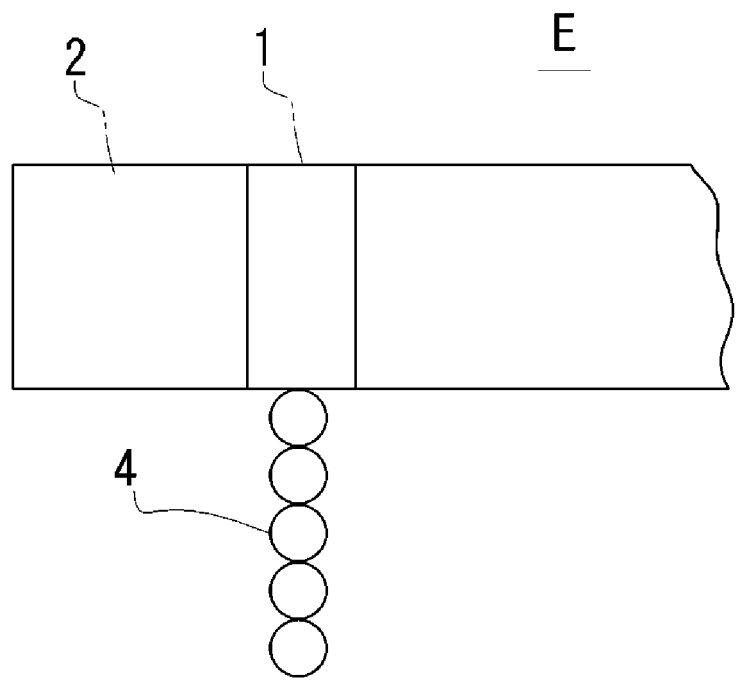
FIG. 24 shows diagrams showing a seventh embodiment of the present invention.

In a rotating mechanism E that is the seventh embodiment, the moving body 4 is in a state of being hung down via a magnetic force at a lower portion of the rail 1 of annular shape (see FIG. 24A). Also, the rail 1 rotates in the ideal direction and rotation thereof in the reverse direction is restricted.

Also, the magnet body 5 is disposed at a lower portion with respect to the column member 2. The magnet body 5 exerts an attractive force Fd to the terminal end of the moving body 4 and exerts a repulsive force Fd' to the tip end of the moving body 4 (see FIG. 24B).

Figure 25:
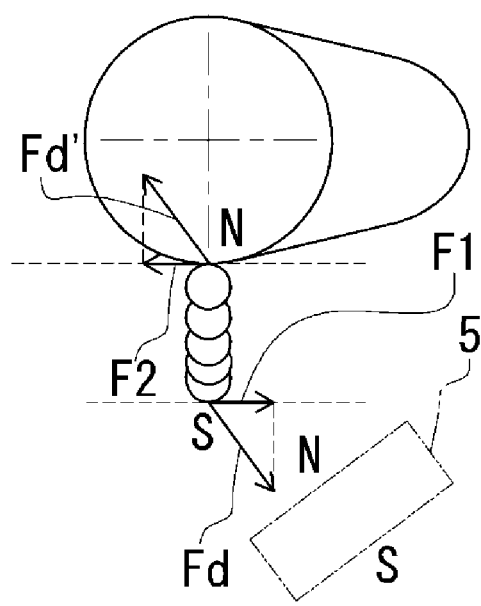
FIG. 25 is a conceptual diagram showing forces acting on a tip end and a terminal end of a moving body in the seventh embodiment.

Also, the force Fd generates a force F1 directed in a tangential direction of the rail 1 and the force F1 is a force that rotates the rail 1, together with the moving body 4, in the ideal direction (counterclockwise) (see FIG. 25). Also, a force F2 is generated from the force Fd'. This force F2 is a force that moves the moving body 4 in a clockwise direction along the rail 1 (see FIG. 25). Thus, even in the rotating mechanism E, the magnetic forces of the magnet body 5 are exerted on the tip end and the terminal end of the moving body 4 to enable the rail 1 to be rotated.

Figure 26A:
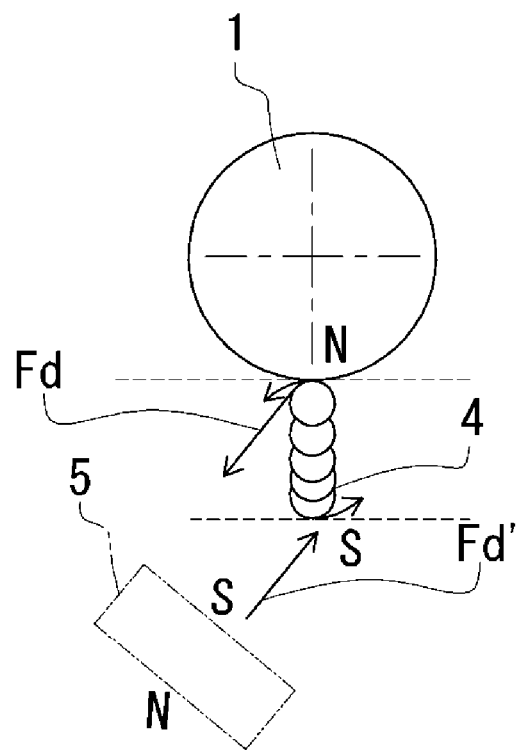
FIG. 26 shows conceptual diagrams showing forces when a repulsive force is applied to the terminal end of the moving body.
Figure 26B:
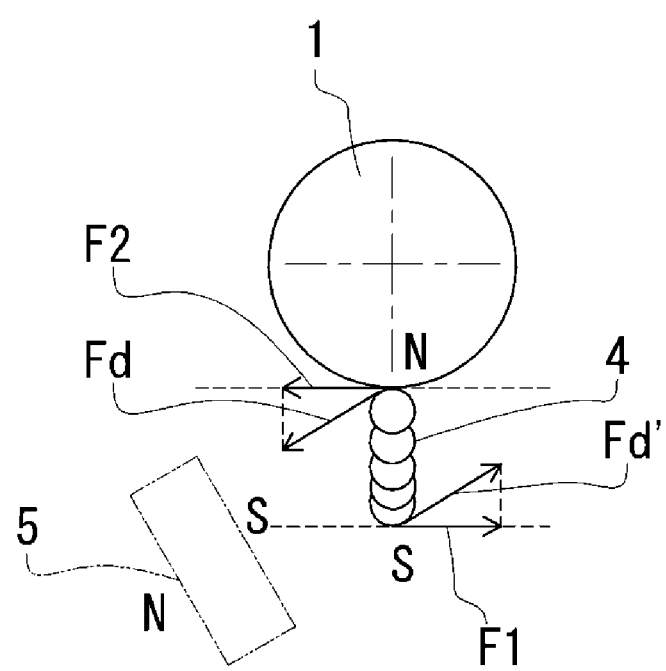

Also, even in the seventh embodiment, the rail 1 can be rotated by exertion of a repulsive force on the terminal end of the moving body 4. As shown in FIG. 26A and FIG. 26B, the magnet body 5 exerts a repulsive force Fd' on the terminal end of the moving body 4 and an attractive force Fd on the tip end of the moving body 4. Based on these, a force F1 that rotates the rail 1 in the ideal direction and a force F2 that moves the moving body 4 along the rail 1 in the clockwise direction are generated.

Here, even with the seventh embodiment described above, in a case where the moving body is the car type moving body 41 described above (see FIG. 4A), a structure where the tires 41a thereof do not rotate in the ideal direction but rotate in the direction reverse to the ideal direction can also be considered. By arranging thus, the moving body 41 is made to move just in the direction reverse to the ideal direction of the rail 1 and to easily move integrally with the rail 1 without the tires 41a rotating when the motion of rotating the rail 1 in the ideal direction is performed. Yet further, in a case where the car type moving body 41 is arranged to rotate just in the direction reverse to the ideal direction, an arrangement where the rail 1 rotates freely in both the ideal direction and the direction reverse thereto may be adopted.

Here, although with the seventh embodiment described above, a structure with which magnetic forces are exerted on the moving body 4 to rotate the rail 1 was described, a structure with which, in place of magnetic forces, elastic forces are imparted on the moving body 4 to rotate the rail 1 can also be adopted.

Figure 24B:
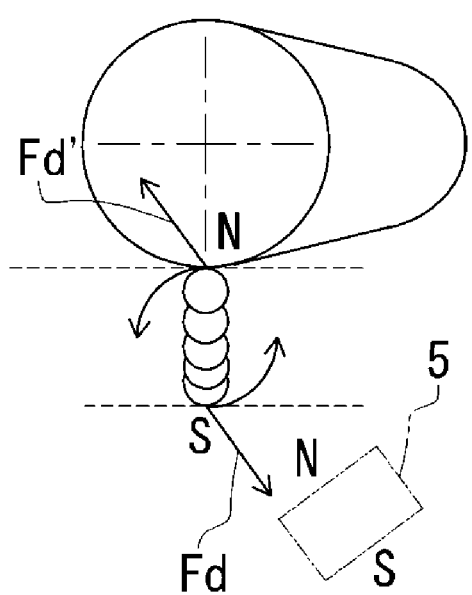

In this case, the terminal end of the moving body 4 is pulled by an elastic member such as a spring member, etc., to exert a tensile force Fd and also, the tip end of the moving body 4 is pulled by an elastic member such as a spring member, etc., as well such that a tensile force Fd' is exerted (see FIG. 24B).

Also, the force Fd generates a force F1 directed in the tangential direction of the rail 1 and the force F1 is a force that rotates the rail 1, together with the moving body 4, in the ideal direction (counterclockwise) (see FIG. 25). Also, a force F2 is generated from the force Fd'. This force F2 is a force that moves the moving body 4 in a clockwise direction along the rail 1 (see FIG. 25).

Thus, with the seventh embodiment, it is also possible to impart elastic forces in place of magnetic forces on the moving body 4 to rotate the rail 1. Also, a structure where, in addition to the magnetic forces in the seventh embodiment, elastic forces of spring members, etc., are added further to rotate the rail 1 even more powerfully can also be adopted.

Eighth Embodiment

Figure 27A:
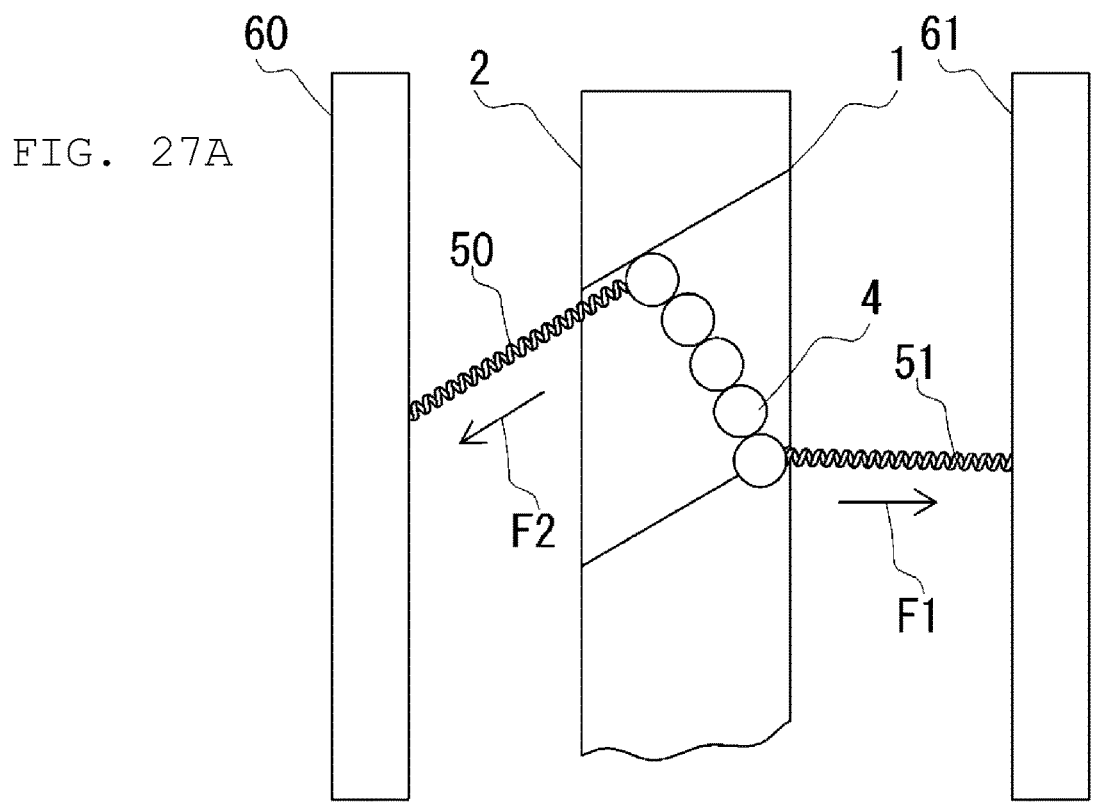
FIG. 27 shows diagrams showing an eighth embodiment of the present invention.

Next, a structure where elastic forces are exerted on the moving body 4 to rotate the rail 1 shall be described. With the eighth embodiment of the present invention, the moving body 4 is attached to the rail 1 as shown in FIG. 27A. Here, the moving body 4 may be attached to the rail 1 via a magnetic force and as long as it is movable along the rail 1, an attaching structure thereof is not limited.

One end of a spring 50 is attached to the tip end of the moving body 4 and another end of the moving body 4 is movably attached to a fitting portion 60. Also, one end of a spring 51 is attached to the terminal end of the spring 50 and another end of the spring 51 is movably attached to a fitting portion 61.

The other ends of the spring 50 and the spring 51 are arranged such that, in the respective fitting portions, the respective other ends move in accordance with the motion of the moving body 4 moving along the rail 1.

Here, it is not necessarily required for the members imparting the elastic forces on the moving body 4 to be limited to springs. For example, rubber members having flexibility can also be used in place of the springs.

A tensile force F1 that the spring 51 exerts on the terminal end of the moving body 4 acts as a force that rotates the moving body 4 and the rail 1 in the ideal direction. Also, a tensile force F2 that the spring 50 exerts on the tip end of the moving body 4 acts as a force that moves the moving body 4 along the rail 1 to the lower side in the rail inclination direction.

The rail 1 can be rotated in the ideal direction by the spring 50 and the spring 51 imparting the elastic forces repeatedly on the tip end and the terminal end of the moving body 4. Also, the moving body 4 can move along the rail 1 to the lower side. Also, in accordance with this motion of the moving body 4, the spring 50 and the spring 51 also move to the lower side in the respective fitting portions.

Figure 27B:
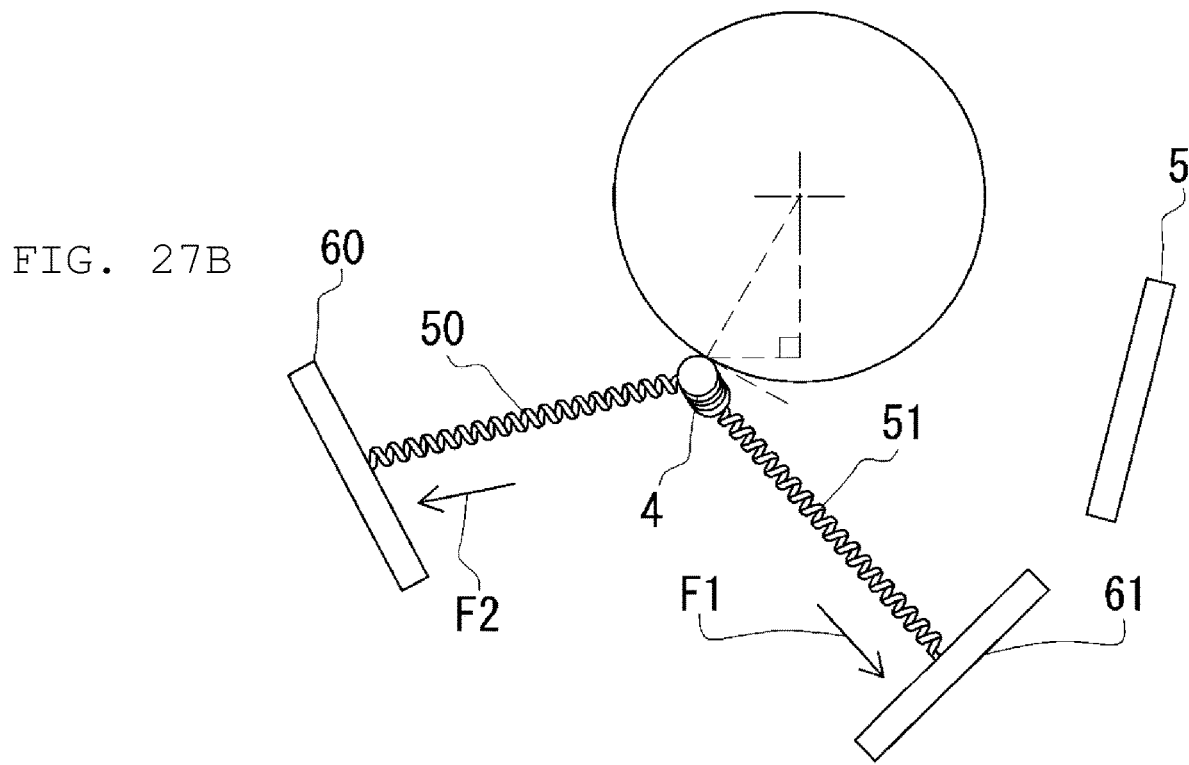

Also, as shown in FIG. 27B, it is also possible to provide an arrangement where, in addition to the spring members, the magnet body 5 is provided such that magnetic forces are exerted on the moving body 4 and the elastic forces and the magnetic forces are combined. The efficiency of the rotation of the rail 1 in the ideal direction can thereby be improved as well.

Figure 28A:
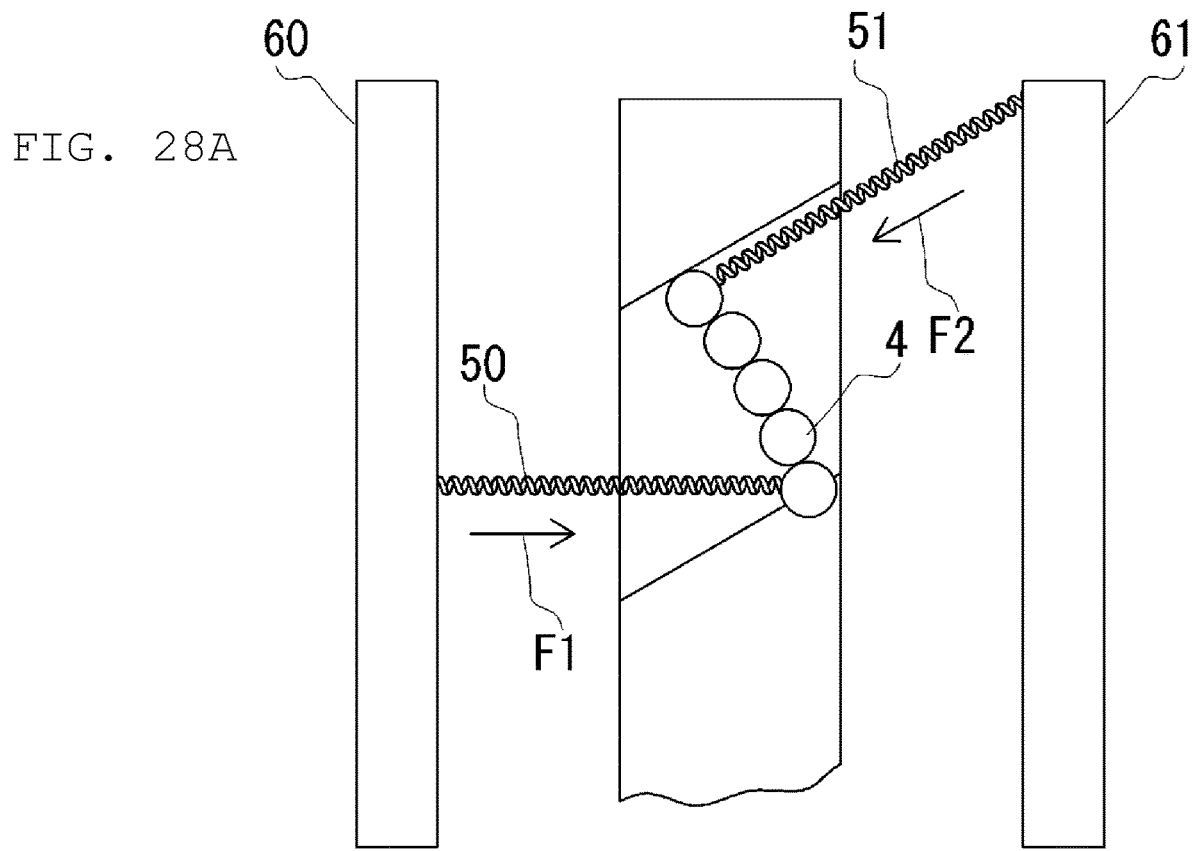
FIG. 28 shows diagrams of an example of different variations of the eighth embodiment.
Figure 28B:
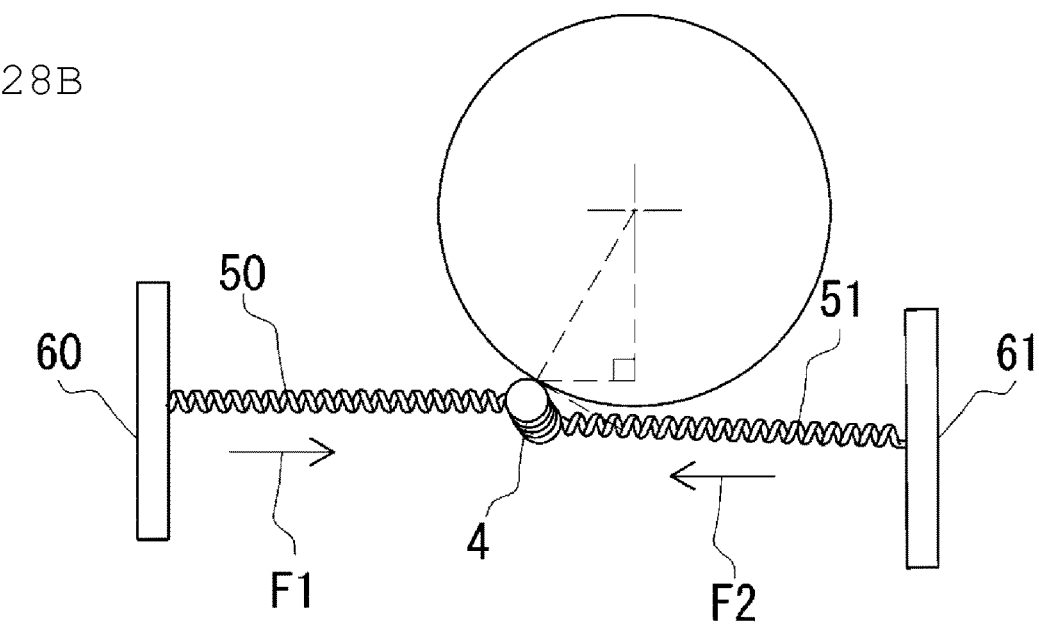

Also, with the eighth embodiment of the present invention, the elastic forces of the springs can be used as forces that press the moving body 4 to rotate the rail 1. As shown in FIG. 28A and FIG. 28B, the terminal end of the moving body 4 is connected to the one end of the spring 50 and pressed in the direction of the force F1. Also, the tip end of the moving body 4 is connected to the one end of the spring 51 and pressed in the direction of the force F2.

The force F1 in the direction of rotating the rail 1 in the ideal direction and the force F2 that moves the moving body 4 to the lower side in the inclination direction of the rail 1 can thus also be generated using the forces of the respective strings that tend to push out the moving body 4.

Figure 29A:
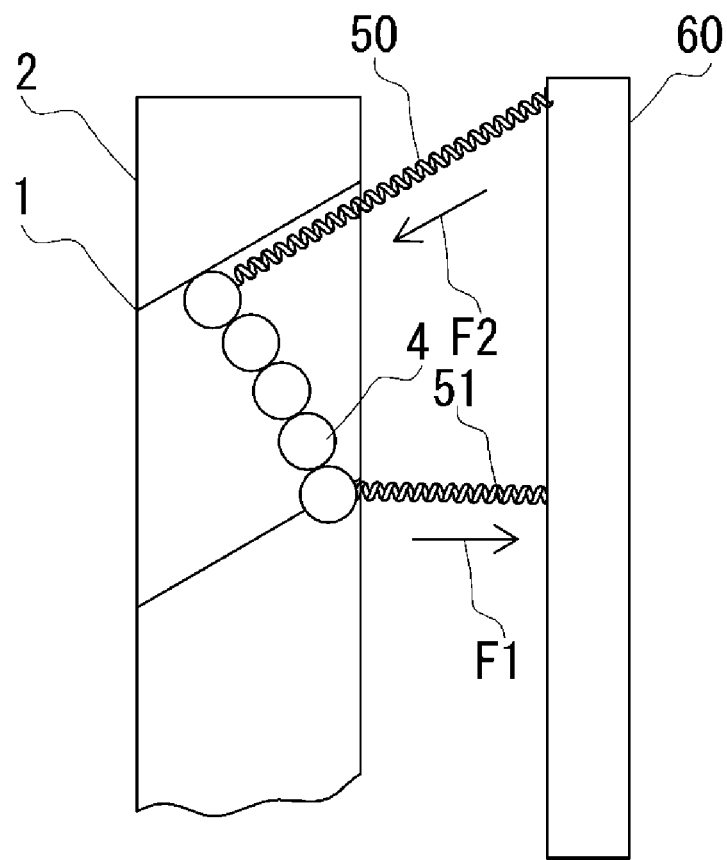
FIG. 29 shows diagrams of an example of further different variations of the eighth embodiment.
Figure 29B:
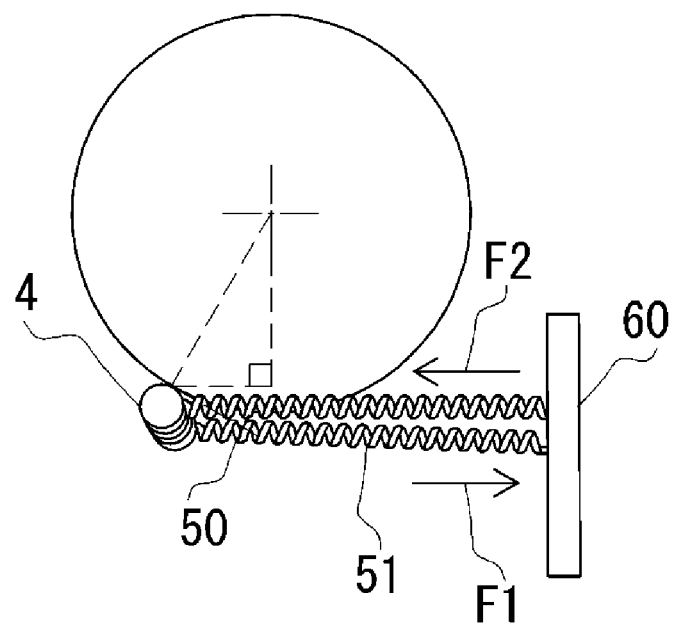

Further, as shown in FIG. 29, an arrangement where the two spring members 50 and 51 are attached from a right side of the column member 2 can also be adopted. Also, similarly, the two springs may be attached from a left side of the column member 2.

Figure 30:
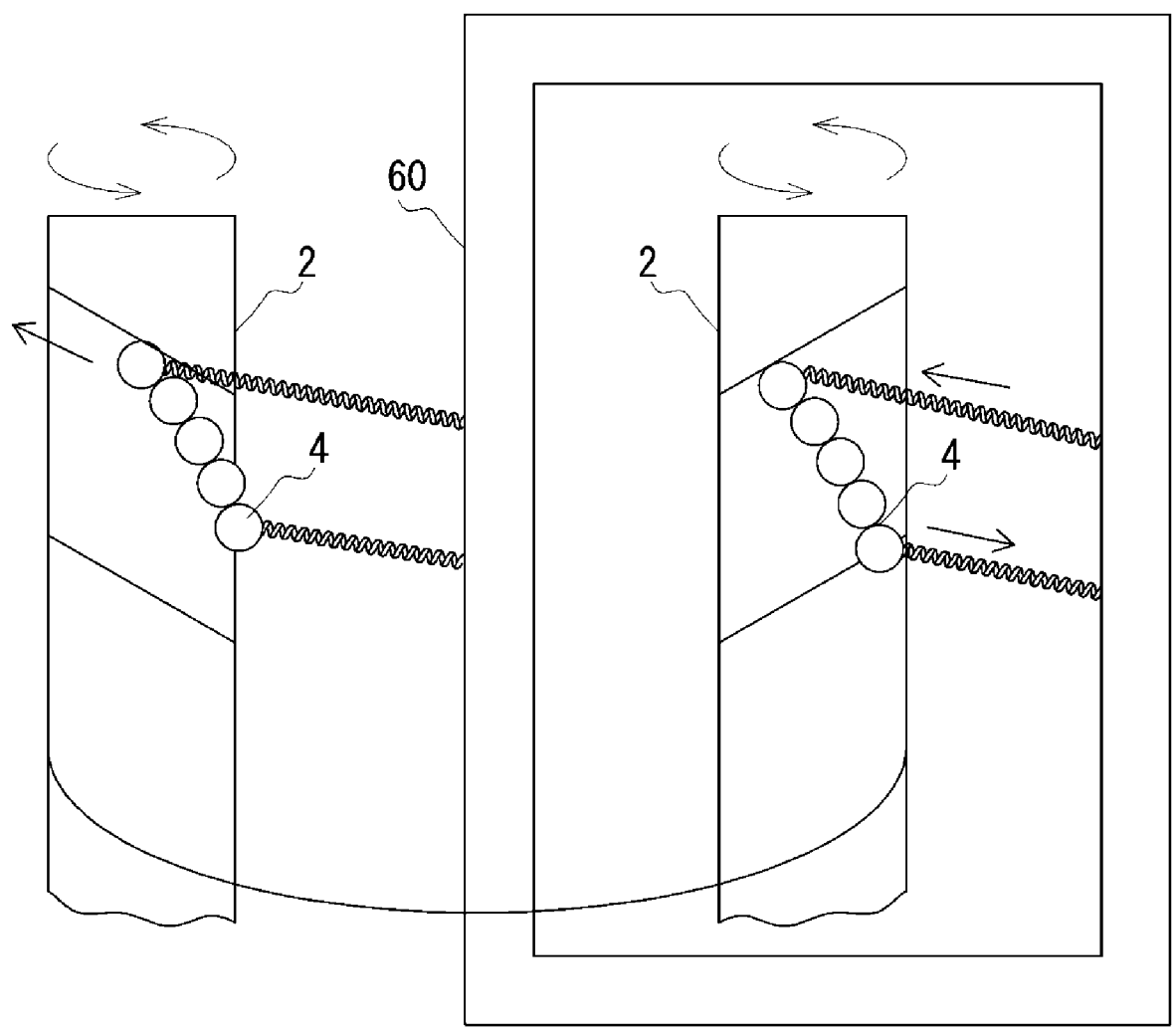
FIG. 30 is a diagram showing an example of a structure that cycles a moving body in the eighth embodiment.

Also, with the eighth embodiment of the present invention, a structure where the fitting portion 60 is used with moving bodies 4 being connected with springs to make the moving bodies cycle with respect to two of the column members 2 can also be adopted (see FIG. 30). As described above, with the present invention, elastic forces can be exerted on the moving body 4 to rotate the rail 1 in the ideal direction.

The terms and the expressions used in the present specification and the claims are used solely for description and are not limiting in anyway and are not intended to exclude features described in the present specification and the claims and terms and expressions equivalent to portions thereof. Also, it is needless to say that various modified modes are possible within the scope of the technical concept of the present invention.

As described above, the rotating mechanism according to the present invention is simple in arrangement, low in energy loss, and capable of generating rotational kinetic energy efficiently.

REFERENCE SIGNS 1 rail
2 column member
3 rotating shaft
4 moving body
5 magnet body
10 rail
10a groove portion
11 rail
30 timing belt
31 conveying belt
32 magnet body
33 conveying portion 34 holding arm
35 conveying mechanism
36 conveying body
37 ascending crane
39 wave shaped portions
40 moving body
40a roller portion
41 moving body
41a tire
42 ring portion
50 spring
51 spring
61 fitting portion
70 presser plate

The invention claimed is:

1. A rotating mechanism comprising:
a first rail portion that is formed in a helical shape and is rotatable around an axial center;
a moving portion that is attachable to the first rail portion and is movable along the first rail portion;
a rail rotating force imparting means for imparting, to a first region of the moving portion, a first force that rotates the first rail portion in a first direction; and
a moving force imparting means for imparting, to a second region of the moving portion, a second force that moves the moving portion from one side of the first rail portion towards another side of the first rail portion,
wherein a movement of the moving portion relative to the first rail portion and a rotation of the first rail portion in the first direction are repeated by the first force and the second force to move the moving portion to the other side of the first rail portion.

2. The rotating mechanism according to claim 1, wherein the moving portion, at least at a portion thereof, includes a region receiving magnetic force,
wherein the first force is generated from a magnetic force acting on the region receiving magnetic force, and
wherein the second force is generated from at least one of either a gravitational force acting on the moving portion or a magnetic force acting on the region receiving magnetic force.

3. The rotating mechanism according to claim 2, wherein the rail rotating force imparting means and the moving force imparting means are magnetic force means for exerting a magnetic force on the region receiving magnetic force, and
wherein at least a portion magnetic forces generated by the magnetic force means of the rail rotating force imparting means and the magnetic force means of the moving force imparting means is a magnet body in common.

4. The rotating mechanism according to claim 2, wherein the rail rotating force imparting means is a columnar magnet body that is a substantially columnar, and is formed with a first surface and a second surface that are substantially parallel in a length direction, and
wherein the columnar magnet body has different magnetic poles at the first surface and the second surface.

5. The rotating mechanism according to claim 4, wherein the columnar magnet body is a plurality of columnar magnet bodies.

6. The rotating mechanism according to claim 2, wherein the rail rotating force imparting means is a magnet body that is substantially curved.

7. The rotating mechanism according to claim 2, wherein the rail rotating force imparting means is a columnar magnet body that is a substantially columnar, and is formed with a first surface and a second surface that are substantially parallel in a length direction,
wherein the columnar magnet body has different magnetic poles at the first surface and the second surface,
wherein the magnetic pole of the first surface or the magnetic pole of the second surface mutually attracts, within the region receiving magnetic force of the moving portion, a magnetic pole thereof that is contacting the first rail portion or a magnetic pole thereof, at a side proximate to the first rail portion, that is disposed in an orientation that opposes the first rail portion,
wherein the length direction is tilted in accordance with a direction of an incline of the helical shape, and
wherein an end portion at the one side positioned in a direction of the end portion at the other side of the first rail portion is tilted in a direction that approaches the first rail portion.

8. The rotating mechanism according to claim 2, wherein the rail rotating force imparting means is a columnar magnet body that is substantially columnar, and is formed with a first surface and a second surface that are substantially parallel in a length direction,
wherein the columnar magnet body has different magnetic poles at the first surface and the second surface,
the magnetic pole of the first surface or the magnetic pole of the second surface repels, within the region receiving magnetic force of the moving portion, a magnetic pole thereof that is contacting the first rail portion or a magnetic pole thereof, at a side proximate to the first rail portion, that is disposed in an orientation that opposes the first rail portion,
wherein the length direction is tilted in accordance with a direction of an incline of the helical shape, and
wherein an end portion at the one side positioned in a direction of the end portion at the other side of the first rail portion is tilted in a direction that approaches the first rail portion.

9. The rotating mechanism according to claim 2, wherein:
the moving portion is a magnet and the first rail portion is formed of a magnetic substance to which the magnet is attachable, or
the first rail portion includes a magnet, and the moving portion is formed of a magnetic substance to which the magnet is attachable, or
the moving portion is a magnet and the first rail portion includes a magnet.

10. The rotating mechanism according to claim 2, wherein the moving portion is an attaching portion that is capable of being fitted to the first rail portion, and
wherein the magnet portion coupled to the attaching portion.

11. The rotating mechanism according to claim 1, wherein the first force is generated from an elastic force acting on the moving portion, and
wherein the second force is generated from at least one of either a gravitational force acting on the moving portion or an elastic force acting on the moving portion.

12. The rotating mechanism according to claim 1, wherein the moving portion, at least at a portion thereof, includes a region receiving magnetic force,
wherein the first force is generated from at least one of either a magnetic force acting on the region receiving magnetic force or an elastic force acting on the moving portion, and wherein the second force is generated from at least one of a gravitational force acting on the moving portion, a magnetic force acting on the region receiving magnetic force, and an elastic force acting on the moving portion.

13. The rotating mechanism according to claim 1, wherein the moving portion is a plurality of moving portions.

14. The rotating mechanism according to claim 1, wherein the moving portion includes a wheel portion that is rotatingly movable along the first rail portion.

15. The rotating mechanism according to claim 1, further comprising:
a first movement restricting means for restricting a movement of the moving portion from the other side of the first rail portion toward the one side of the first rail portion.

16. The rotating mechanism according to claim 1, wherein the first rail portion is restricted in rotation in a second direction, and
wherein the second direction is a direction opposite to the first direction.

17. The rotating mechanism according to claim 1, further comprising:
a weight portion that is fixed to the first rail portion and is rotatable together with the first rail portion.

18. The rotating mechanism according to claim 1, wherein an angle formed by the axial center of the first rail portion and a vertical direction is within a range of greater than or equal to 0 degrees but less than 90 degrees.

19. The rotating mechanism according to claim 1, wherein an angle formed by the axial center of the first rail portion and the vertical direction is not less than 90 degrees.

20. The rotating mechanism according to claim 1, further comprising:
a second rail portion disposed at an inner side of the first rail portion,
wherein the second rail portion is formed in a helical shape and is disposed in an opposite direction as the helical shape of the first rail portion,
wherein the second rail portion is arranged such that the moving portion is movable between an end portion at one side of the second rail portion and the end portion at the other side of the first rail portion and between an end portion at another side of the second rail portion and the end portion at the one side of the first rail portion,
wherein the second rail portion is rotatable around an axial center together with and in the same direction as the first rail portion,
wherein the moving portion is attachable to the second rail portion and is movable along the second rail portion, and
wherein, by a motion of rotating the first rail portion in the first direction, the second rail portion is rotated, and the moving portion is moved towards to the end portion at the other side of the second rail portion.

21. The rotating mechanism according to claim 20, further comprising:
a cycling rail rotating force imparting means for imparting, to a third region of the moving portion, a third force in a direction of rotating the second rail portion in the first direction; and
a cycling moving force imparting means for imparting, to a fourth region of the moving portion, a fourth force to move the moving portion from the one side of the second rail portion towards the other side of the second rail portion; and
wherein a movement of the moving portion relative to the second rail portion and a motion of rotating the second rail portion in the first direction are repeated by the third force and the fourth force to move the moving portion to the end portion at the other side of the second rail portion.

22. The rotating mechanism according to claim 1, further comprising:
a second rail portion that is disposed at a predetermined interval from the first rail portion, formed to a predetermined helical shape, is rotatable around an axial center, and is arranged such that the moving portion is movable between an end portion at one side of the second rail portion and the end portion at the other side of the first rail portion and between an end portion at another side of the second rail portion and the end portion at the one side of the first rail portion; and
a rotating force transmitting means for transmitting a rotation of the first rail portion to the second rail portion to rotate the second rail portion; and
wherein the moving portion is attachable to the second rail portion and is movable along the second rail portion, and the second rail portion is rotatable in the same direction as the first rail portion when the predetermined helical shape is formed in an opposite direction as the helical shape of the first rail portion, or
wherein the second rail portion is rotatable in an opposite direction to the first rail portion when the predetermined helical shape is formed in a same direction as the helical shape of the first rail portion, and the second rail portion is rotated and the moving portion is moved to the end portion at the other side of the second rail portion by a motion of rotating the first rail portion in the first direction.

23. The rotating mechanism according to claim 22, further comprising:
a cycling rail rotating force imparting means for imparting, to a third region of the moving portion, a third force in a direction of rotating the second rail portion in the first direction or a second direction, wherein the second direction is opposite to the first direction; and
a cycling moving force imparting means for imparting, to a fourth region of the moving portion, a fourth force to move the moving portion from the one side of the second rail portion towards the other side of the second rail portion; and
wherein a movement of the moving portion relative to the second rail portion and a motion of rotating the second rail portion in the first direction, or in the second direction, are repeated by the third force and the fourth force to move the moving portion to the end portion at the other side of the second rail portion.

24. The rotating mechanism according to claim 1, further comprising:
a presser plate that defines an attaching angle of the moving portion to the first rail portion.

25. The rotating mechanism according to claim 1, further comprising:
a power conversion portion that is connected directly or indirectly to the first rail portion,
wherein the power conversion portion converts the motion from rotation of the first rail portion to power.

26. The rotating mechanism according to claim 1, further comprising:
an electric power conversion portion that is connected directly or indirectly to the first rail portion, wherein the electric power conversion converts the motion from rotation of the first rail portion to electric power.

27. A rotating mechanism comprising:
a first rail portion that is substantially annular and is rotatable around an axial center;
a moving portion that is attachable to the first rail portion and is movable along the first rail portion;
a rail rotating force imparting means for imparting, to a first region of the moving portion, a first force that rotates the first rail portion to a first direction; and
a moving force imparting means for imparting, to a second region of the moving portion, a second force that moves the moving portion in a direction opposite to one side along the first rail portion,
wherein the first rail portion is restricted in rotation in a second direction that is a direction opposite to the first direction and/or the moving portion is restricted in movement toward the one side along the first rail portion, and
wherein a movement of the moving portion relative to the first rail portion and a motion of rotating the first rail portion in the first direction are repeatable by the first force and the second force.

28. The rotating mechanism according to claim 27, wherein the moving portion, at least at a portion thereof, includes a region receiving magnetic force,
wherein the first force is generated from a magnetic force acting on the region receiving magnetic force, and
wherein the second force is generated from at least one of either a gravitational force acting on the moving portion or a magnetic force acting on the region receiving magnetic force.

29. The rotating mechanism according to claim 27, wherein the moving portion, at least at a portion thereof, includes a region receiving magnetic force,
wherein the first force is generated from a magnetic force acting on the region receiving magnetic force, and
wherein the second force is generated from at least one of either a gravitational force acting on the moving portion or a magnetic force acting on the region receiving magnetic force.

30. The rotating mechanism according to claim 27, wherein the moving portion, at least at a portion thereof, includes a region receiving magnetic force,
wherein the first force is generated from at least one of either a magnetic force acting on the region receiving magnetic force or an elastic force acting on the moving portion, and
wherein the second force is generated from at least one of a gravitational force acting on the moving portion, a magnetic force acting on the region receiving magnetic force, and an elastic force acting on the moving portion.

* * * * *